(12) United States Patent
Perry

(10) Patent No.: US 7,409,587 B2
(45) Date of Patent: Aug. 5, 2008

(54) RECOVERING FROM STORAGE TRANSACTION FAILURES USING CHECKPOINTS

(75) Inventor: Robert Perry, Leominster, MA (US)

(73) Assignee: Symantec Operating Corporation, Cupertino, CA (US)

( * ) Notice: Subject to any disclaimer, the term of this patent is extended or adjusted under 35 U.S.C. 154(b) by 277 days.

(21) Appl. No.: 10/924,560

(22) Filed: Aug. 24, 2004

(65) Prior Publication Data

US 2006/0047925 A1  Mar. 2, 2006

(51) Int. Cl.
*G06F 11/00* (2006.01)
(52) U.S. Cl. .......................................... 714/15; 714/16
(58) Field of Classification Search .................. None
See application file for complete search history.

(56) References Cited

U.S. PATENT DOCUMENTS

| | | | |
|---|---|---|---|
| 3,444,528 A | 5/1969 | Lovell et al. | |
| 3,533,082 A | 10/1970 | Schnabel et al. | |
| 3,715,729 A | 2/1973 | Mercy | |
| 4,141,066 A | 2/1979 | Keiles | |
| 4,156,907 A | 5/1979 | Rawlings et al. | |
| 4,164,017 A | 8/1979 | Randell et al. | |
| 4,191,996 A | 3/1980 | Chesley | |
| 4,351,023 A | 9/1982 | Richer | |
| 4,378,588 A | 3/1983 | Katzmann et al. | |
| 4,403,303 A | 9/1983 | Howes et al. | |
| 4,453,215 A | 6/1984 | Reid | |
| 4,459,658 A | 7/1984 | Gabbe et al. | |
| 4,479,214 A | 10/1984 | Ryan | |

(Continued)

FOREIGN PATENT DOCUMENTS

EP   1 091 229 A2   4/2001

(Continued)

OTHER PUBLICATIONS

Vyant Technologies, Inc. *RealTime*™ [homepage online], (Sep. 25, 2002) [retrieved on Nov. 22, 2004]. Retrieved from the Internet:<URL: http://www.archive.org/web/20020925205451/http://vyanttech.com>.

(Continued)

*Primary Examiner*—Gabriel L Chu
(74) *Attorney, Agent, or Firm*—Hunton & Williams LLP

(57) ABSTRACT

The disclosed technology facilitates recovery from storage-related failures by checkpointing copy-on-write operation sequences. An operation sequence incorporating such checkpoints into a copy-on-write can include the following: receive a write request that identifies payload data to be written to a first data store, read original data associated with the first data store, copy the original data to a second data store, record transactional information associated with the write request, generate a first checkpoint to confirm the successful recordation of the transactional information and the successful copying of the original data to the second data store, write the payload data to the first data store, acknowledge a successful completion of the copy-on-write operation sequence, and generate a second checkpoint that confirms the successful completion of such operation sequence. The first and second checkpoints are used to form a pre-failure representation of one or more storage units (or parts thereof). The checkpoints can be stored with other transactional information, to facilitate recovery in the event of a failure, and can be used to facilitate the use of optimizations to process I/O operations.

18 Claims, 44 Drawing Sheets

U.S. PATENT DOCUMENTS

| | | | |
|---|---|---|---|
| 4,483,001 A | 11/1984 | Ryan | |
| 4,484,275 A | 11/1984 | Katzman et al. | |
| 4,486,826 A | 12/1984 | Wolff et al. | |
| 4,498,145 A | 2/1985 | Baker et al. | |
| 4,507,751 A | 3/1985 | Gawlick et al. | |
| 4,521,847 A | 6/1985 | Ziehm et al. | |
| 4,581,701 A | 4/1986 | Hess et al. | |
| 4,607,365 A | 8/1986 | Greig et al. | |
| 4,608,688 A | 8/1986 | Hansen et al. | |
| 4,639,856 A | 1/1987 | Hrustich et al. | |
| 4,648,031 A | 3/1987 | Jenner | |
| 4,652,940 A | 3/1987 | Sumiyoshi | |
| 4,654,819 A | 3/1987 | Stiffler et al. | |
| 4,654,857 A | 3/1987 | Samson et al. | |
| 4,674,038 A | 6/1987 | Brelsford et al. | |
| 4,703,421 A | 10/1987 | Abrant et al. | |
| 4,703,481 A | 10/1987 | Fremont | |
| 4,713,811 A | 12/1987 | Frey | |
| 4,727,516 A | 2/1988 | Yoshida et al. | |
| 4,736,339 A | 4/1988 | Crabbe, Jr. | |
| 4,750,177 A | 6/1988 | Hendrie et al. | |
| 4,754,397 A | 6/1988 | Varaiya et al. | |
| 4,814,971 A | 3/1989 | Thatte | |
| 4,819,154 A | 4/1989 | Stiffler et al. | |
| 4,878,167 A | 10/1989 | Kapulka et al. | |
| 4,959,774 A | 9/1990 | Davis | |
| 5,089,958 A | 2/1992 | Horton et al. | |
| 5,201,044 A | 4/1993 | Frey, Jr. et al. | |
| 5,212,784 A | 5/1993 | Sparks | |
| 5,235,601 A | 8/1993 | Stallmo et al. | |
| 5,241,670 A | 8/1993 | Eastridge et al. | |
| 5,255,270 A | 10/1993 | Yanai et al. | |
| 5,269,022 A | 12/1993 | Shinjo et al. | |
| 5,280,611 A | 1/1994 | Mohan et al. | |
| 5,287,501 A | 2/1994 | Lomet | |
| 5,297,258 A | 3/1994 | Hale et al. | |
| 5,325,519 A | 6/1994 | Long et al. | |
| 5,331,646 A | 7/1994 | Krueger et al. | |
| 5,339,406 A | 8/1994 | Carney et al. | |
| 5,357,509 A | 10/1994 | Ohizumi | |
| 5,381,545 A | 1/1995 | Baker et al. | |
| 5,404,361 A | 4/1995 | Casoro et al. | |
| 5,404,508 A | 4/1995 | Konrad et al. | |
| 5,414,840 A * | 5/1995 | Rengarajan et al. | 707/201 |
| 5,437,026 A * | 7/1995 | Borman et al. | 707/202 |
| 5,450,546 A | 9/1995 | Krakirian | |
| 5,469,573 A | 11/1995 | McGill, III et al. | |
| 5,479,654 A | 12/1995 | Squibb | |
| 5,483,468 A | 1/1996 | Chen et al. | |
| 5,487,160 A | 1/1996 | Bemis | |
| 5,524,205 A | 6/1996 | Lomet et al. | |
| 5,530,846 A | 6/1996 | Strong | |
| 5,535,188 A | 7/1996 | Dang et al. | |
| 5,557,770 A | 9/1996 | Bhide et al. | |
| 5,572,659 A | 11/1996 | Iwasa et al. | |
| 5,592,648 A | 1/1997 | Schultz et al. | |
| 5,598,528 A | 1/1997 | Larson et al. | |
| 5,604,853 A | 2/1997 | Nagashima | |
| 5,604,862 A | 2/1997 | Midgely et al. | |
| 5,623,598 A | 4/1997 | Voigt et al. | |
| 5,634,096 A | 5/1997 | Baylor et al. | |
| 5,638,509 A | 6/1997 | Dunphy et al. | |
| 5,640,561 A | 6/1997 | Satoh et al. | |
| 5,649,152 A | 7/1997 | Ohran et al. | |
| 5,659,747 A | 8/1997 | Nakajima | |
| 5,677,952 A | 10/1997 | Blakley, III et al. | |
| 5,715,438 A | 2/1998 | Silha | |
| 5,717,849 A | 2/1998 | Brady | |
| 5,724,501 A | 3/1998 | Dewey et al. | |
| 5,729,719 A | 3/1998 | Gates | |
| 5,729,743 A | 3/1998 | Squibb | |
| 5,740,397 A | 4/1998 | Levy | |
| 5,740,433 A | 4/1998 | Carr et al. | |
| 5,742,792 A | 4/1998 | Yanai et al. | |
| 5,745,906 A | 4/1998 | Squibb | |
| 5,751,936 A | 5/1998 | Larson et al. | |
| 5,751,939 A | 5/1998 | Stiffler | |
| 5,758,057 A | 5/1998 | Baba et al. | |
| 5,761,680 A | 6/1998 | Cohen et al. | |
| 5,764,877 A | 6/1998 | Lomet et al. | |
| 5,777,874 A | 7/1998 | Flood et al. | |
| 5,778,392 A | 7/1998 | Stockman et al. | |
| 5,787,243 A | 7/1998 | Stiffler | |
| 5,790,773 A | 8/1998 | DeKoning et al. | |
| 5,794,252 A * | 8/1998 | Bailey et al. | 707/202 |
| 5,799,141 A | 8/1998 | Galipeau et al. | |
| 5,802,264 A | 9/1998 | Chen et al. | |
| 5,809,340 A | 9/1998 | Bertone et al. | |
| 5,813,017 A | 9/1998 | Morris | |
| 5,829,045 A | 10/1998 | Motoyama | |
| 5,829,046 A | 10/1998 | Tzelnic et al. | |
| 5,835,915 A | 11/1998 | Carr et al. | |
| 5,835,953 A | 11/1998 | Ohran | |
| 5,845,292 A * | 12/1998 | Bohannon et al. | 707/202 |
| 5,857,208 A | 1/1999 | Ofek | |
| 5,864,657 A | 1/1999 | Stiffler | |
| 5,893,119 A | 4/1999 | Squibb | |
| 5,893,140 A | 4/1999 | Vahalia et al. | |
| 5,907,685 A | 5/1999 | Douceur | |
| 5,933,368 A | 8/1999 | Ma et al. | |
| 5,948,110 A | 9/1999 | Hitz et al. | |
| 5,961,613 A | 10/1999 | DeNicola | |
| 5,982,886 A | 11/1999 | Itami et al. | |
| 5,996,088 A | 11/1999 | Frank et al. | |
| 6,000,020 A | 12/1999 | Chin et al. | |
| 6,012,145 A | 1/2000 | Mathers et al. | |
| 6,014,690 A | 1/2000 | Van Doren et al. | |
| 6,016,553 A | 1/2000 | Schneider et al. | |
| 6,018,746 A | 1/2000 | Hill et al. | |
| 6,035,306 A | 3/2000 | Lowenthal et al. | |
| 6,041,420 A | 3/2000 | Skarpelos et al. | |
| 6,044,444 A | 3/2000 | Ofek | |
| 6,054,987 A | 4/2000 | Richardson | |
| 6,061,769 A | 5/2000 | Kapulka et al. | |
| 6,061,770 A | 5/2000 | Franklin | |
| 6,064,247 A | 5/2000 | Krakirian | |
| 6,065,018 A | 5/2000 | Beier et al. | |
| 6,078,990 A | 6/2000 | Frazier | |
| 6,079,000 A | 6/2000 | Cooper et al. | |
| 6,081,875 A | 6/2000 | Clifton et al. | |
| 6,081,877 A | 6/2000 | Taki | |
| 6,085,200 A | 7/2000 | Hill et al. | |
| 6,122,664 A | 9/2000 | Boukobza et al. | |
| 6,125,404 A | 9/2000 | Vaglica et al. | |
| 6,131,148 A | 10/2000 | West et al. | |
| 6,138,243 A | 10/2000 | Mealey et al. | |
| 6,148,416 A | 11/2000 | Masubuchi | |
| 6,158,019 A | 12/2000 | Squibb | |
| 6,173,377 B1 | 1/2001 | Yanai et al. | |
| 6,199,178 B1 | 3/2001 | Schneider et al. | |
| 6,205,527 B1 | 3/2001 | Goshey et al. | |
| 6,230,282 B1 | 5/2001 | Zhang | |
| 6,240,527 B1 | 5/2001 | Schneider et al. | |
| 6,243,105 B1 | 6/2001 | Hoyer et al. | |
| 6,289,357 B1 | 9/2001 | Parker | |
| 6,301,677 B1 | 10/2001 | Squibb | |
| 6,324,548 B1 | 11/2001 | Sorenson | |
| 6,345,346 B1 | 2/2002 | Biessener et al. | |
| 6,347,365 B1 | 2/2002 | Leshem et al. | |
| 6,357,015 B1 | 3/2002 | Yamakawa et al. | |
| 6,363,487 B1 | 3/2002 | Schneider | |
| 6,366,987 B1 | 4/2002 | Tzelnic et al. | |
| 6,369,820 B1 | 4/2002 | Bertram et al. | |
| 6,374,363 B1 | 4/2002 | Wu et al. | |

| | | |
|---|---|---|
| 6,381,635 B1 | 4/2002 | Hoyer et al. |
| 6,385,707 B1 | 5/2002 | Maffezoni |
| 6,430,577 B1 | 8/2002 | Hart |
| 6,434,681 B1 | 8/2002 | Armangau |
| 6,434,710 B1 | 8/2002 | Sato et al. |
| 6,446,090 B1 | 9/2002 | Hart |
| 6,477,629 B1 | 11/2002 | Goshey et al. |
| 6,499,034 B1 | 12/2002 | Mackinlay |
| 6,505,248 B1 | 1/2003 | Casper et al. |
| 6,532,535 B1 | 3/2003 | Maffezoni et al. |
| 6,535,967 B1 | 3/2003 | Milillo et al. |
| 6,539,402 B1 | 3/2003 | Sorenson et al. |
| 6,542,975 B1 | 4/2003 | Evers et al. |
| 6,549,992 B1 | 4/2003 | Armangau et al. |
| 6,553,392 B1 | 4/2003 | Mosher, Jr. et al. |
| 6,557,089 B1 | 4/2003 | Reed et al. |
| 6,560,614 B1 | 5/2003 | Barboy et al. |
| 6,581,185 B1 | 6/2003 | Hughes |
| 6,587,962 B1 * | 7/2003 | Hepner et al. ............... 714/19 |
| 6,594,744 B1 | 7/2003 | Humlicek et al. |
| 6,618,794 B1 | 9/2003 | Sicola et al. |
| 6,622,263 B1 | 9/2003 | Stiffler et al. |
| 6,643,671 B2 | 11/2003 | Milillo et al. |
| 6,651,075 B1 | 11/2003 | Kusters et al. |
| 6,658,434 B1 * | 12/2003 | Watanabe et al. ............ 707/202 |
| 6,664,964 B1 | 12/2003 | Levin-Michael et al. |
| 6,665,779 B1 | 12/2003 | Polfer et al. |
| 6,667,743 B2 | 12/2003 | Bertram et al. |
| 6,684,229 B1 | 1/2004 | Luong et al. |
| 6,687,322 B1 | 2/2004 | Zhang et al. |
| 6,691,245 B1 | 2/2004 | DeKoning |
| 6,694,413 B1 | 2/2004 | Mimatsu et al. |
| 6,701,456 B1 | 3/2004 | Biessener |
| 6,704,730 B2 | 3/2004 | Moulton et al. |
| 6,711,572 B2 | 3/2004 | Zakharov et al. |
| 6,711,693 B1 | 3/2004 | Golden et al. |
| 6,732,125 B1 | 5/2004 | Autrey et al. |
| 6,732,171 B2 | 5/2004 | Hayden |
| 6,732,293 B1 | 5/2004 | Schneider |
| 6,871,271 B2 * | 3/2005 | Ohran et al. ............... 711/162 |
| 6,981,004 B2 * | 12/2005 | Ganesh et al. ............. 707/202 |
| 7,000,145 B2 * | 2/2006 | Werner et al. ............... 714/20 |
| 7,174,479 B2 * | 2/2007 | Kutan et al. ............... 714/15 |
| 2001/0013100 A1 | 8/2001 | Doblar et al. |
| 2001/0056438 A1 | 12/2001 | Ito |
| 2002/0010872 A1 | 1/2002 | Van Doren et al. |
| 2002/0023199 A1 | 2/2002 | Biessener et al. |
| 2002/0049883 A1 | 4/2002 | Schneider et al. |
| 2002/0049950 A1 | 4/2002 | Loaiza et al. |
| 2002/0103982 A1 | 8/2002 | Ballard et al. |
| 2002/0133512 A1 | 9/2002 | Milillo et al. |
| 2002/0144044 A1 | 10/2002 | Moon et al. |
| 2002/0156971 A1 | 10/2002 | Jones et al. |
| 2002/0199073 A1 | 12/2002 | Tamura et al. |
| 2003/0006988 A1 | 1/2003 | Alford, Jr. et al. |
| 2003/0014605 A1 | 1/2003 | Slater et al. |
| 2003/0018657 A1 | 1/2003 | Monday |
| 2003/0028726 A1 | 2/2003 | Gaertner et al. |
| 2003/0051109 A1 | 3/2003 | Cochran |
| 2003/0056136 A1 | 3/2003 | Aweya et al. |
| 2003/0061331 A1 | 3/2003 | Nakamura et al. |
| 2003/0061456 A1 | 3/2003 | Ofek et al. |
| 2003/0088807 A1 | 5/2003 | Mathiske et al. |
| 2003/0093444 A1 | 5/2003 | Huxoll |
| 2003/0115432 A1 | 6/2003 | Biessener et al. |
| 2003/0126387 A1 | 7/2003 | Watanabe |
| 2003/0140070 A1 | 7/2003 | Kaczmarski et al. |
| 2003/0140209 A1 | 7/2003 | Testardi |
| 2003/0167380 A1 | 9/2003 | Green et al. |
| 2003/0177321 A1 | 9/2003 | Watanabe |
| 2003/0191829 A1 | 10/2003 | Masters et al. |
| 2003/0204700 A1 | 10/2003 | Biessener et al. |
| 2003/0225884 A1 | 12/2003 | Hayden |
| 2004/0030951 A1 | 2/2004 | Armangau |
| 2004/0117572 A1 | 6/2004 | Welsh et al. |
| 2004/0139128 A1 | 7/2004 | Becker et al. |
| 2005/0251540 A1 | 11/2005 | Sim-Tang |
| 2005/0262097 A1 | 11/2005 | Sim-Tang et al. |
| 2005/0262377 A1 | 11/2005 | Sim-Tang |
| 2006/0101384 A1 | 5/2006 | Sim-Tang et al. |

FOREIGN PATENT DOCUMENTS

| | | |
|---|---|---|
| EP | 0 751 462 B1 | 7/2002 |
| WO | WO 91/01026 | 1/1991 |
| WO | WO 96/12232 | 4/1996 |
| WO | WO 99/12101 | 3/1999 |
| WO | WO 00/65447 | 11/2000 |
| WO | WO 01/04801 A1 | 1/2001 |
| WO | WO 01/33357 A1 | 5/2001 |
| WO | WO 03/007148 A1 | 1/2003 |

OTHER PUBLICATIONS

Vyant Technologies, Inc. *RealTime*™ [white paper online], (2002) [retrieved on Nov. 22, 2004]. Retrieved from the Internet: <URL: http://web.archive.org/web/20030315044353/www.vyanttech.com/assets/documents/realtime_white_paper.pdf.

Castelletto et al., "DB2 for VSE & VM Archiving and Recovery," IBM VSE/ESA, pp. 1, 3-9, 11-18 (1996).

Castelletto et al., "DB2 for VSE & VM Archiving and Recovery" [formerly online], (1996) [retrieved on Oct. 26, 2004]. Retrieved from the Internet:<URL: http://web.archive.org/web/19990222065151/http://www.s390.ibm.com/vse/vsehtmls/vse8arc.htm>.

"Commands for Optical Memory Block Devices." in T10, *Information Technology—SCSI-3 Block Commands* (Nov. 13, 1997) (pp. 72-73).

Flaviu, C. and Fetzer, C. *Probabilistic Internal Clock Synchronization*, California (May 1, 2003), pp. 1-33.

Green, R.J. et al., "Designing a Fast, On-line Backup System for a Log-Structured File System," Digital Technical Journal, vol. 8, No. 2, 1996, pp. 32-45.

Hultgren, C.D., "Fault-tolerant Personal Computers Safeguard Critical Applications," I&CS Instruments and Control Systems, vol. 65, No. 9, Radnor, PA, US, pp. 23-28 (Sep. 1992).

International Search Report of PCT/US98/18863; completed Feb. 2, 1999.

International Search Report of PCT/US00/10999; completed Aug. 25, 2000.

*Proven Technology and Industry Leadership* [online], (2004) [retrieved on Aug. 23, 2004]. Retrieved from the Internet:< URL: http://www.mendocinosoft.com/pages.company.html>.

*RealTime—Near-Instant Recovery to Any Point in Time* [online], (2004) [retrieved on Aug. 23, 2004]. Retrieved from the Internet:< URL: http://www.mendocinosoft.com/pages.products.htm>.

Robinson, J.T., Analysis of Steady-State Segment Storage Utilizations in a Log-Structured File System with Least-Utilized Segment Cleaning, IBM Research Division, T.J. Watson Research Center, Oct. 1996, pp. 29-32.

Rodriguez-Rivera et al., "A Non-Fragmenting Non-Moving, Garbage Collector," from Proceedings of the International Symposium on Memory Management, Vancouver, Canada, Oct. 17-19, 1998, pp. 79-85, especially Figure 3 and pp. 82-83.

Shread, P. *The Big Blackout, a Year Later*, [online], (Aug. 13, 2004) [retrieved on Aug. 23, 2004]. Retrieved from the Internet:< URL: http://www.internetnews.com/storage/article.php/3394821>.

*Time-Slider Technology Blends Recovery Point and Time Objective* [online], (2004) [retrieved on Aug. 23, 2004]. Retrieved from the Internet:< URL: http://www.mendocinosoft.com/pages/Time%Slider.htm>.

Topio, Inc., *Business Solutions: Enterprise Backup Consolidation* [pdf online], (2003) [retrieved on Aug. 23, 2004]. Retrieved from the Internet:< URL: http://www.topio.com/product/pdf/EBC.pdf>.

Topio, Inc., *Business Solutions: Heterogeneous Disaster Recovery* [pdf online], (2003) [retrieved on Aug. 23, 2004]. Retrieved from the Internet:< URL: http://www.topio.com/product/pdf/HDR.pdf>.

Topio, Inc., *Business Solutions: Replicated Storage Services* [pdf online], (2003) [retrieved on Aug. 23, 2004]. Retrieved from the Internet:< URL: http://www.topio.com/product/pdf/RSS.pdf>.

Topio, Inc., *Enterprise Data Recoverability* [pdf online], (Nov. 2003) [retrieved on Aug. 23, 2004]. Retrieved from the Internet:< URL: http://www.topio.com/product/pdf/EDR.pdf>.

Topio, Inc., *Topio Corporate Summary* [pdf online], (2003) [retrieved on Aug. 23, 2004]. Retrieved from the Internet:< URL: http://www.topio.com/product/pdf/TCS.pdf>.

Topio, Inc., *Topio Data Protection Suite: Enterprise Data Recoverability* [pdf data sheet online], (Nov. 2003) [retrieved on Aug. 23, 2004]. Retrieved from the Internet:< URL: http://www.topio.com/product/pdf/TDPS.pdf>.

Topio, Inc., *Topio Data Protection Suite: Enterprise Data Recoverability* [pdf online], (Nov. 2003) [retrieved on Aug. 23, 2004]. Retrieved from the Internet:< URL: http://www.topio.com/product/pdf/BWP1.pdf>.

Topio, Inc., *Topio Data Protection Suite: Technical Overview* [pdf online], (Nov. 2003) [retrieved on Aug. 23, 2004]. Retrieved from the Internet:< URL: http://www.topio.com/product/pdf/TTO.pdf>.

*Topio™ Delivers New Advances in Continuous Data Protection Solutions for Enterprise Disaster Recovery* [online press release], (Apr. 5, 2004) [retrieved on Aug. 23, 2004]. Retrieved from the Internet:< URL: http://www.topio.com/news/pr_04.05.04.html>.

*Topio™ to Demo Continuous Data Protection Solutions at International DB2 Users Group Show*, [online press release], (May 10, 2004) [retrieved on Aug. 23, 2004). Retrieved from the Internet:< URL: http://www.topio.com/news/pr_05.10.04.html>.

Wild File, Inc. *User's Guide: GoBack™ by Wild File, Version 2.1*. Minnesota. 1998.

Wild File, Inc. *User's Guide Addendum: GoBack™ by Wild File, Version 2.1d*. Minnesota. 1999.

XOSoft, Inc., *Company Overview* [online], (2003) [retrieved on Aug. 23, 2004]. Retrieved from the Internet:< URL: http://www.xosoft.com/company/index.shtml>.

XOSoft, Inc., *Data Rewinder™ Product Suite* [online], (2003) [retrieved on Aug 23, 2004]. Retrieved from the Internet:< URL: http://www.xosoft.com/products/f_Rewinder.shtml>.

XOSoft, Inc., *WANSync Product Suite* [online], (2003) [retrieved on Aug. 23, 2004]. Retrieved from the Internet:<URL: http://www.xosoft.com/products/f_WANSync.shtml>.

XOSoft, Inc., WANSync$^{HA}$ Product Suite [online], (2003) [retrieved on Aug. 23, 2004]. Retrieved from the Internet:<URL: http://www.xosoft.com/products/f_WANSyncHA.shtml>.

\* cited by examiner

HISTORY OF DATA STORE A

| UNIT OF STORAGE / WRITE TIME | BLOCK 100 | BLOCK 200 | BLOCK 300 | BLOCK 400 | BLOCK 500 |
|---|---|---|---|---|---|
| T-60 | X | | | | |
| T-48 | | | X | | |
| T-33 | | X | | | |
| T-29 | | X | | | |
| T-15 | | | | X | |

PAST ――――|―――――→ PRESENT
          T-35

X = DATA WRITE

FIG. 3

| BYTE/BIT | 7 | 6 | 5 | 4 | 3 | 2 | 1 | 0 |
|---|---|---|---|---|---|---|---|---|
| 0 | OPERATION CODE (C1h) ||||||||
| 1 | RESERVED |||| SERVICE ACTION (IF REQUIRED) ||||
| 2 | LOGICAL BLOCK ADDRESS ||||||||
| 9 | ||||||||
| 10 | LENGTH ||||||||
| 13 | ||||||||
| 14 | RESERVED ||||||||
| 15 | CONTROL ||||||||

FIG. 15

| BYTE/BIT | 7 | 6 | 5 | 4 | 3 | 2 | 1 | 0 |
|---|---|---|---|---|---|---|---|---|
| 0 | RESERVED ||||||||
| 1 | ||||||||
| 2 | INDICATOR ||||||||
| 9 | ||||||||
| 10 | LOGICAL BLOCK ADDRESS ||||||||
| 13 | ||||||||
| 14 | LENGTH ||||||||
| 21 | ||||||||
| 22 | DETERMINED TIME OF CHANGE ||||||||
| 29 | ||||||||
| 30...n | <REPEAT OF TUPLES> ||||||||

FIG. 16

| BYTE/BIT | 7 | 6 | 5 | 4 | 3 | 2 | 1 | 0 |
|---|---|---|---|---|---|---|---|---|
| 0 | \multicolumn{8}{c}{RESERVED} ||||||||
| 1 | RESERVED ||||||||
| 2 | INDICATOR (4) ||||||||
| 9 | | | | | | | | |
| 10 | LOGICAL BLOCK ADDRESS (0) ||||||||
| 13 | | | | | | | | |
| 14 | LENGTH (8) ||||||||
| 21 | | | | | | | | |
| 22 | DETERMINED TIME OF CHANGE (T1) ||||||||
| 29 | | | | | | | | |
| 30 | LOGICAL BLOCK ADDRESS (62) ||||||||
| 33 | | | | | | | | |
| 34 | LENGTH (16) ||||||||
| 41 | | | | | | | | |
| 42 | DETERMINED TIME OF CHANGE (T2) ||||||||
| 49 | | | | | | | | |
| 50 | LOGICAL BLOCK ADDRESS (0) ||||||||
| 53 | | | | | | | | |
| 54 | LENGTH (64) ||||||||
| 61 | | | | | | | | |
| 62 | DETERMINED TIME OF CHANGE (T4) ||||||||
| 69 | | | | | | | | |
| 70 | LOGICAL BLOCK ADDRESS (0) ||||||||
| 73 | | | | | | | | |
| 74 | LENGTH (128) ||||||||
| 81 | | | | | | | | |
| 82 | DETERMINED TIME OF CHANGE (T5) ||||||||
| 89 | | | | | | | | |

| WRITE-REQUEST ID | ID OF TARGET LUN (LUN ID) | UNITS OF STORAGE ON TARGET LUN (LBA, LENGTH) (LOCATION OF NEW DATA ON TARGET LUN) | LOCATION OF PAST DATA (LUN ID, LBA, LENGTH) | TIME |
|---|---|---|---|---|
| 1287 | 2502 | (0, 17) | (2500, 64, 17) | 6100 |
| 1288 | 2502 | (16, 5) | (2500, 85, 5) | 6117 |
| 1290 | 2502 | (6, 4) | (2501, 37, 4) | 6120 |
| 1291 | 2502 | (7, 4) | (2500, 46, 4) | 6130 |

FIG. 27

| TIME | I/O REQUEST ID | TARGET LUN # | LOGICAL BLOCK ADDRESSES EFFECTED BY REQUEST (BYTES) | I/O REQUEST TYPE | SET OF OPERATIONS | | | | |
|---|---|---|---|---|---|---|---|---|---|
| | | | | | 1 | 2 | 3 | 4 | 5 |
| 6100 | 1286 | 2502 | 0-15 | WRITE | READ DATA PRESENT IN TARGET UNITS OF STORAGE | WRITE DATA READ IN OPERATION 1 | INDEX THE RESULT OF OPERATION 2 | WRITE NEW DATA | RELEASE |
| 6114 | 1287 | 2502 | 21-23 | WRITE | READ DATA PRESENT IN TARGET UNITS OF STORAGE | WRITE DATA READ IN OPERATION 1 | INDEX THE RESULT OF OPERATION 2 | WRITE NEW DATA | RELEASE |
| 6117 | 1288 | 2502 | 16-20 | WRITE | READ DATA PRESENT IN TARGET UNITS OF STORAGE | WRITE DATA READ IN OPERATION 1 | INDEX THE RESULT OF OPERATION 2 | WRITE NEW DATA | RELEASE |
| 6120 | 1289 | 2502 | 24-29 | WRITE | READ DATA PRESENT IN TARGET UNITS OF STORAGE | WRITE DATA READ IN OPERATION 1 | INDEX THE RESULT OF OPERATION 2 | WRITE NEW DATA | RELEASE |
| 6121 | 1290 | 2502 | 26-38 | READ | READ DATA PRESENT IN TARGET UNITS OF STORAGE | RELEASE | — | — | — |
| 6125 | 1291 | 2503 | 6-9 | WRITE | READ DATA PRESENT IN TARGET UNITS OF STORAGE | WRITE DATA READ IN OPERATION 1 | INDEX THE RESULT OF OPERATION 2 | WRITE NEW DATA | RELEASE |

RECOVERING FROM STORAGE TRANSACTION FAILURES USING CHECKPOINTS

TECHNICAL FIELD

The disclosed technology relates to the field of data storage and, in particular, to time-dependent data storage and recovery.

BACKGROUND

Business enterprises rely increasingly on computer systems that allow the sharing of data across a business enterprise. The data storage systems that have evolved to store large amounts of data typically are critically important to an enterprise. As a result, the disruption or failure of the data storage system can cripple operation of the entire enterprise.

Data used by applications running on computer systems are typically stored on primary storage devices (e.g., disks) and secondary storage devices (e.g., tape and cheaper disk drives) for protection. As these applications run, the data changes as a result of business operations. Information technology departments typically deal with a number of problems concerning data storage systems. Generally, however, these fall into two broad categories: hardware failure and data corruption.

The business significance of data storage systems and the importance of the integrity of the data that they store and maintain has generated a correspondingly high interest in systems that provide data protection and data recovery. At present, mirroring and snapshot technology are the two primary approaches available to enterprises interested in data recovery. In the event of a system failure, data recovery allows an enterprise to recover data from a prior point in time and to resume operations with uncorrupted data. Once the timing of the hardware failure or corrupting event, or events, is identified, recovery may be achieved by going back to a point in time when the stored data is known to be uncorrupted.

Typically, data storage devices include individual units of storage, such as cells, blocks, sectors, etc. Read commands generated by a host system (used generally to mean one or more host systems) direct the information system to provide the host with the data specified in the request. Traditionally, the information is specified based on its location within the data storage device, e.g., one or more specific blocks. Write commands are executed in a similar fashion. For example, data is written to a specific unit of storage in response to an I/O request generated by a host system. A location identifier provides direct association between the data and the unit of storage in which it is stored. Thereafter, the location identifier is employed to read and update the data.

On the hardware failure side of the data protection problem, vendors provide a few different mechanisms to help prevent hardware failure from affecting application availability and performance, for example, disk mirroring. This is a mechanism where multiple disks are grouped together to store the same information, allowing a disk to fail without preventing the application from retrieving the data. In a typical setup, the user will allocate 1-4 mirror disks for each application data disk. Each write request that is sent to the application primary disk is also sent to the mirror copies, so that the user actually has N (where N is between 2 and 5 typically) disks with the exact same data on it. As a result, the mirroring approach provides at least one complete backup of the then current data. Thus, if a disk failure occurs, the user still has application data residing on the other mirror disks. A redundant array of independent disks ("RAID") provides one example of a mirroring system.

However, mirroring is ineffective when data corruption occurs. Data corruption comes in many forms, but it generally is recognized when the user's application stops functioning properly as a result of data being written to the disk. There are many possible sources of data corruption such as a failed attempt to upgrade the application, a user accidentally deleting key information, a rogue user purposely damaging the application data, computer viruses, and the like. Regardless of the cause, mirroring actually works against the user who has experienced data corruption because mirroring replicates the bad data to all the mirrors simultaneously. Thus, all copies of the data are corrupted.

Additionally, because the disks are continuously updated, a backup of historical data, i.e., a snapshot of the data present in the data storage device at a past time T, can only be created if the system is instructed to save the backup at or prior to time T. Thus, at time T+1 the system is unable to provide a backup of the data current at time T. Further, each unit of storage is saved regardless of whether the data stored in it is unchanged since the time that the previous backup was made. Such an approach is inefficient and costly because it increases the storage capacity required to backup the data storage device at multiple points in time. Also, the mirroring approach becomes less efficient and more error prone when employed with larger data storage systems because large systems span hundreds of disks and the systems cannot assure that each disk is backed up at the same point in time. Consequently, complex and error prone processes are employed in an attempt to create a concurrent backup for the entire data storage system.

As described above, snapshots, also referred to as single point in time images, are frequently created in conjunction with a mirroring system. Alternatively, a snapshot approach may be employed as an independent data storage and recovery method. In the snapshot approach, the user selects periodic points in time when the current contents of the disk will be copied and written to either a different storage device or an allocated set of storage units within the same storage device. This approach suffers, however, from the same shortcomings as mirroring, that is, all snapshots are created at the then current point in time either in conjunction with the users request or as a result of a previously scheduled instruction to create a snapshot of the stored data. Whether alone or in combination, neither data mirrors or data snapshots allow the user to employ hindsight to recreate a data set that was current at some past time. Because the data stored in each of the storage units is not associated with an individual time identifier, a user is unable to go back to view data from a particular point in time unless coincidentally a historical backup was previously created for that time. There is no way to restore the data at an intermediate time, for example time (T−1), between the current time (T) and the time that the last backup disk was saved (for example T−2). Also, generation of single point in time images generally is a lengthy process. Image generation time has become even more significant as the storage capacity and data set sizes have increased.

The storage industry, as a result, has focused on providing both faster and more frequent image generation. Suppliers of data recovery systems that employ tapes have attempted to provide larger, more scalable tape libraries by increasing system capacities and the quantity of tape heads in order to allow parallel operation. Suppliers of disk based systems have focused on how to use disk drives to provide more single point in time images with improved response times. In one approach, one of a quantity N mirror disks is brought offline at a specified time in order to create a single point in time image at that time. The approach may allow for an increased number of images provided that the quantity of mirror disks is increased sufficiently. However, this approach significantly increases the required storage capacity with each point in time, for example, for a 5 terabyte application, 30 terabytes of storage are required to support 2 standard mirror disks and 4 point in time images. Because these solutions are only attempts at fixing existing approaches they do not provide a solution that is workable as the capacity of data storage systems continues to increase.

SUMMARY OF THE INVENTION

The disclosed technology addresses the shortcomings of current systems by facilitating the recovery of data at substantially any prior point in time, even when the request is made at a time following the recovery time.

In one embodiment, the disclosed technology can be used to checkpoint copy-on-write operation sequences that may be useful in recovering from subsequent storage transaction failures. For example, in a redundant system, there may be one primary processor for processing I/O operations, and one or more secondary processors that can complete processing of any in-process I/O operations of the primary processor upon detection of an error or failure in the primary processor. Embodiments of the disclosed checkpoints gives a secondary processor, upon a direction to take-over for the primary processor, information useful for successfully processing uncompleted I/O operations. At the same time, embodiments of the disclosed technology facilitate use of these checkpoints in a manner that is integrated with the storage of other transactional information. Moreover, embodiments of the disclosed technology facilitate the use of processing optimizations by the primary processor, because the secondary processor need not be aware of any optimizations attempted by the primary system to successfully step in for the primary processor, and can use the disclosed checkpointing information to determine what processing the secondary processor needs to complete for any outstanding I/O operations. This is particularly beneficial in a high-speed system in which there can be thousands, tens of thousands, or more, I/O transactions outstanding at any given time.

An illustrative copy-on-write operation sequence incorporating one or more checkpoints may, for example, include the following sequence of operations: a first write request that identifies payload data to be written beginning at a first address of a first data store is received, original data associated with the first address of the first data store is read, the original data is copied to a second data store beginning at a second address, transactional information (e.g., indicia associated with the first address, second address, and/or a time that the first write request was received) associated with the first write request is recorded (in, for example, one or more data structures), a first checkpoint is generated confirming the successful recordation of the transactional information and the successful copying of the original data to the second data store, the payload data is written to the first data store beginning at the first address, a successful completion of the copy-on-write operation sequence is acknowledged, and a second checkpoint that confirms the successful completion of such operation sequence is generated.

The first and second checkpoints, separately or in combination, may serve as the basis for forming a representation of one or more storage units (or parts thereof), as they existed prior to a storage transaction failure (e.g., a hardware failure, a power failure, etc). A first checkpoint, which may be stored as part of the transactional information, may serve as a basis for loading information associated with the first write request into one or more queues of a processor module. A second checkpoint, which may also be stored as part of the transactional information, may serve as a basis for removing information associated with a second write request from one or more queues of the processor module.

In one embodiment, the disclosed technology can be used to develop systems and perform methods to recover from a failure (e.g., a hardware/power failure of a processor module) associated with a copy-on-write operation sequence. One or more write requests that were queued prior to a failure and which correspond to operations within a copy-on-write operation sequence can be identified. A determination can be made whether a first checkpoint was formed in response to completing a first portion of the copy-on-write sequence. The first portion of the copy-on-write operation sequence can include one or more operations associated with copying original data stored at a location (identified by the queued write request) within a first data store to a second data store. Another determination can also be made as to whether a second checkpoint was formed in response to completing at least a second portion of the copy-on-write operation sequence. The second portion of the copy-on-write operation sequence can include one or more operations associated with writing payload data specified by the queued write request to a location within a first data store.

Based on the first and/or second checkpoints, one or more of the queued write requests can be processed to at least partially recover from the failure. For example and upon failing to locate the first checkpoint, the processing of the queued write request can include queuing substantially all of the operations associated with the copy-on-write operation sequence for execution. Alternatively and upon locating the first checkpoint and failing to locate the second checkpoint, the processing of the queued write request can include queuing a subset of the operations for execution, where such queued subset of operations includes operations associated with the second portion, but not the first portion, of the copy-on-write operation sequence. In yet another alternative and upon locating the first and second checkpoints, the processing of the queued write request can include removing the operations in the copy-on-write operation sequence from one or more operation queues.

In one embodiment, the disclosed technology can be used to develop systems and perform methods to facilitate recovery from a storage transaction failure (i.e., errors occurring when writing to and/or otherwise manipulating a unit of storage, such as may be encountered during a power failure, hardware failure, or data corruption event). A write request identifying payload data to be written beginning at a first address of a first data store can be received by a storage management device prior to effectuating the write request. The original data associated with the first address of the first data store is then copied to a second data store beginning at a second address. Transactional information associated with the write request can be recorded and may include, for example, the first and second addresses along with a time that the write request was received. A first indicator (i.e., a first checkpoint) can also be generated to confirm the successful recordation of the transactional information so as to optimize future recovery efforts. The first indicator may further confirm that the original data associated with the first address of the first data store has been successfully copied to the second data store.

Once the original data beginning at the first address of the first data store has been successfully copied to a second address of the same or different data store, the payload data identified by the write request can be written to the first data store beginning at the first address—effectively overwriting the original data, but not the copy now stored at the second address. Further, a second indicator (e.g., a second checkpoint) can be generated to confirm that the payload data was properly written to the first data store and this second indicator can be detected during future recovery efforts to indicate that a second write request, which may have occurred after the time that the earlier write request was received, should be re-executed. The first indicator, second indicator, and/or at least some of the transactional information can be subsequently used to, at least partially, recover from a storage transaction failure. For example, a representation of at least one storage unit, as it existed prior to the storage transaction failure, can be formed based on at least some of the copied original data in the second store and on the time that the write request was received. The transactional information can also be searched to identify the time that the write request was received based on a selected time that is substantially coincident therewith. Further, information associated with a second write request can be removed from one or more queues of a standby processor module based on finding the second indicator in the transactional information, where such standby processor module assumes the tasks of a primary processor module in response to a storage transaction failure (e.g., a power and/or other hardware failure that disables the primary processor module). One of more of the queues of the standby processor module can also be loaded with information associated with a third write request based on finding a first indicator in the transactional information.

In one embodiment, the disclosed technology detects a storage transaction failure (e.g., a hardware or power failure of a primary processor module) occurring at a time T1. One or more first indicators associated with a first write request that was received prior to time T1 can be identified, thereby confirming that data originally stored beginning at a first address specified by the write request has been successfully copied to a second address and such first indicators can serve as a basis for loading information associated with the first write request into one or more queues of a standby processor module. At least some of the copied data can serve as a basis for forming a representation of at least one storage unit, as it existed prior to the storage transaction failure. A second indicator that confirms that payload data specified by the first write request has been successfully written to a data store beginning at the first address can also be identified and such second indicator can, for example, serve as a basis for removing information associated with a second write request from one or more queues of a standby processor module, which may assume the tasks of a primary processor module in response to a storage transaction failure.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 3 is a table depicting a series of write commands directed to a data store in an embodiment of the invention.

FIG. 7A depicts the current store. FIG. 7B depicts the time store.

FIG. 15 is a diagram depicting an embodiment of an I/O request sent by a host to a storage management device.

FIG. 16 is a diagram depicting an embodiment of an I/O response sent by a storage management device to a host.

FIG. 20 is a diagram depicting an embodiment of an I/O response sent by a storage management device to a host.

FIG. 27 is a table depicting an index of records for a set of write commands in accordance with an embodiment of the invention.

FIG. 31 is a table corresponding to I/O requests in accordance with an embodiment of the invention.

FIG. 32 depicts queues used to process I/O requests according to an embodiment of the invention.

DETAILED DESCRIPTION

Figure 1:
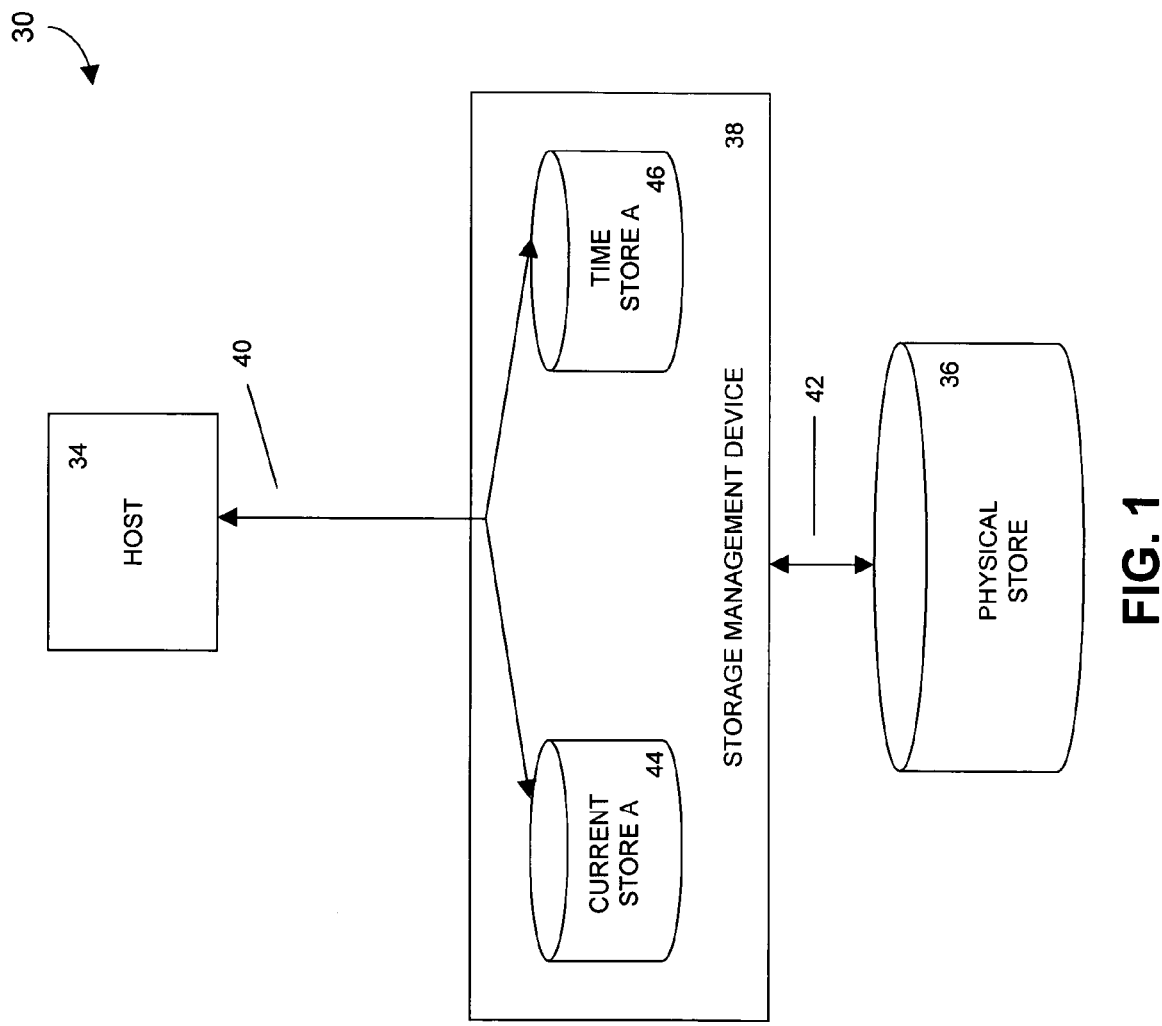
FIG. 1 is a block diagram of a storage system including a current store and a time store according to an embodiment of the invention.

FIG. 1 provides a general overview of a storage system 30 that allows for the on of images of a data store from points in time that are prior to a request time. A host 34 communicates with a physical store 36 via a storage management device 38. In one embodiment, the physical store 36 stores digital data. In a version of this embodiment, the physical store 36 is one or more disk drives. For example, the disk drives can be magnetic disk drives, optical disk drives, or a combination of both types of disk drives. In another version of this embodiment, the physical store 36 includes one or more tape drives. The physical store 36 can be one or a combination of drives, or a storage area network. The physical store 36 can itself be a virtual drive presented by any of a variety of storage networks, appliances, or controllers. The physical store 36 can be, for example, a mirrored disk or RAID system, or other storage appliance.

The host can be any type of network or system(s) that accesses physical store 36 and/or any other form of data storage. In one embodiment, the host 34 includes a number of computers on a computer network. The host can include a storage network that is accessed by one or more users via a plurality of workstations, personal computers, or a combination of the two.

In one embodiment, the storage management device 38 itself can be a "storage appliance." It can be, for example, a separate device with processors and memory. The storage management device 38 functionality described here can also be integrated into an existing enterprise system storage area network. In one embodiment, the storage management device 38 is implemented as a firmware layer of a storage system. In one embodiment, the storage management device 38 uses both a current store A 44 and a time store A 46 data for a disk volume A. Although, the figure shows current store A 44 and time store A 46 as located within the storage management device 38, preferably, the data associated with one or both of current store A 44 and time store A 46 is stored in the physical store 36. In such case, the storage management device 38 keeps track of the data in the current store A and the time store A in its memory, for example in the form of indexes and pointers, and reads and writes data to and from the physical store 36. The current store A 44 and the time store A 46 can be allocated separate groups units of storage in the physical store 36, for example, or their data can be intermixed on the physical store.

The current store A 44 and the time store A 46 could also be implemented in random access memory ("RAM") or other storage located in the storage management device 38. In a version of this embodiment, the current store A 44 and the time store A 46 are in different memories. Further, the media type that stores the current store A 44 can be different than the media that stores the time store A 46, e.g., the current store A 46 can be on a disk drive while the time store A 44 is on RAM. In another version, the current store A 44 and the time store A 46 comprise different sections of the same memory. In another embodiment, the current store A 44 and the time store A 46 comprise physical disks, which may be the physical store 36 or otherwise. The current store A 44 and the time store A 46 can be stored on the same physical disk, or they can both be stored in portions of many different physical disks.

The current store A 44 stores current data and the time store A 46 stores older data from the current store A 44 that has since been replaced (i.e., overwritten) by newer data. The storage management device 38 employs information from either or both of the current store A 44 and the time store A 46 to generate and present to the host 34 current and past images of disk volume A. In one embodiment, each pair of current store A 44 and time store A 46 implements one or more logical devices. In a version of this embodiment, the storage management device 38 does not include a disk drive, but uses the physical store 36 to store the data on such virtual drives.

The storage management device 38 communicates with the host 34 over a first communication link 40. The first communication link 40 can be any sort of data communications link, such as a LAN, storage network or bus including a Fibre Channel and Small Computer Systems Interface ("SCSI"). Ethernet (e.g., Gigabit ethernet) and wireless communication are other possibilities for the first communication link 40. In one embodiment, the storage management device communicates SCSI protocol at the logical layer, and is able to communicate using one or more of a variety of physical layers, including SCSI bus, Fibre Channel, Fibre Channel 2, or iSCSI over ethernet. In response to the host 34 I/O requests, over the communication link 40, the storage management device 38 acts as if it was the physical store 36. The host's 34 I/O requests can include both read and write commands to units of storage.

The storage management device 38 communicates with the physical store 36 over a second communication link 42. The second communication link 42 can also be any sort of data communications link, such as a LAN, storage network or bus including (without limitation) Fibre Channel, Small Computer Systems Interface ("SCSI"), Integrated Drive Electronics ("IDE"), FCon, and FiCon. Ethernet (e.g., Gigabit ethernet) and wireless communication are other possibilities for the second communication link 42. In one embodiment, the physical store 36 and the second communication link 42 are implemented in a storage area network.

With primary storage systems to date, the data which is stored on the devices is indexed by an address which is made up of a device and an offset. The storage address space is divided up into blocks (e.g., sectors), where each block is 512 bytes long. When presented with an I/O request, the I/O request is sent to a specific device/disk/storage unit, and the address is known as a Logical Block Address ("LBA") and a length. In this example, the block comprises the unit of storage and the LBA indicates the unit of storage where the I/O operation begins, i.e., a specific 512-byte block that is part of the device. The length indicates how many 512-byte blocks the I/O request will operate on. For instance, in order to read 4096 bytes from a device starting at byte 8192, the LBA would be set to 16 and the length would be 8. Block sizes, less than or greater than 512 bytes can also be used, for example, a block can be 520 bytes long. Additionally, the unit of storage may be any part of the storage address space that is uniquely addressable.

In one embodiment, time is an added dimension in a second part of the address space for a given storage device. The user can request a specific LBA (and associated block span), and the user is also afforded the option of requesting a specific LBA/span combination at a specific point in time. The time is selected from a substantially continuous time interval, and doesn't have to be determined in advance. This capability can be provided at the block addressing level, and it can be applied to entire devices in order to produce a variable point in time storage.

In one embodiment, storage device management device 38 commands include an address that includes a location identifier and a time identifier. In one implementation, the location identifier can include at least one of a logical device identifier and a unit of storage with the logical device. The time identifier can be a current time or it can be a recovery time, i.e., a prior point in time for which the data stored in that unit of storage is desired. In this description, the prior time for which data is requested by the host 34 is referred to as the "recovery time." A "request time" refers to the time at which the host 34 makes a request for data from a recovery time. The units of storage of digital data can be accessed by specifying an address that includes both a location or address and a time. The storage management device 38 thus can present a continuum of "prior images" of a data store to the host 34 regardless of whether a snapshot was generated prior to the request time where each prior image is a view of the disk at the recovery time. In one embodiment, an increment that defines a minimum elapsed time between consecutive time identifiers is sufficiently small that it allows the generation of a prior data store from a substantially continuous time interval. In a version of this embodiment, requests for a current image can be responded to with data located entirely on the current store A 44 without employing any of the data from the time store A 46. However, as will be explained below in more detail, requests for data from a prior time (i.e., a prior image) can require data from both the current store A 44 and the time store A 46.

In one embodiment, each host 34 I/O request includes one or more target units of storage identified by a device identifier (e.g., a physical disk, a logical device, a virtual device, etc.), a first unit of storage (e.g., an LBA, etc.), a length, and for read commands, a time identifier. Write commands include a data payload comprising data that is being written to the target units of storage.

In another embodiment, the time identifier is implied, in the sense that a logical device is provided by the storage management device 38 that is a view of another first logical device at an earlier time. The second logical device can be established through out-of-band communication (e.g., at a console of the storage management device) or by way of in-band communication between the host 34 and the storage management device 38. In one embodiment, once the second logical device is established, units of storage associated with it can be accessed by requesting data from the second logical device rather than expressly requesting data for a specific time.

In one embodiment, the time store includes both control information, also referred to as "meta data," and payload data. In a version of this embodiment, the control information includes a time stamp that indicates when a particular unit of storage in the current store 44 was directed to be overwritten as a result of a write operation, the location in the current store 44 of the unit of storage where the data originated from, and the location in the time store 46 where the old data is now stored. The payload data that is stored in the time store 46 can include data that formerly appeared in the current store 44 but has been replaced by new data.

Figure 2:
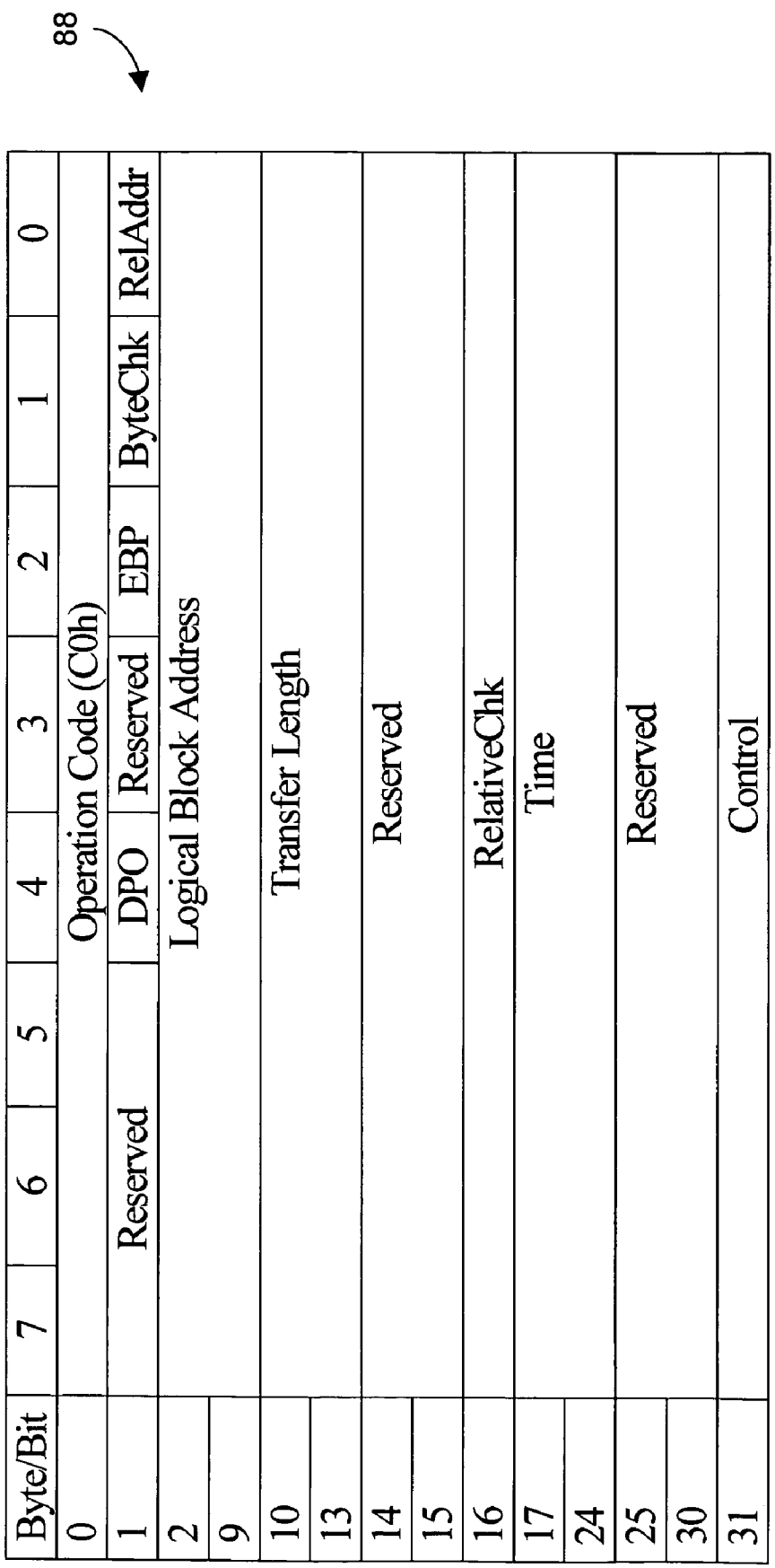
FIG. 2 is a diagram depicting an embodiment of an I/O request sent by a host to a storage management device.

FIG. 2 depicts an embodiment of an I/O request, specifically, a time-based read command that can be sent by the host 34 to the storage management device 38. In one embodiment, the I/O request is a SCSI command. FIG. 2 identifies each bit included in the 32 bytes of the command block 88. In byte 0, an operation code identifies the type of command to be performed, i.e., a time-based read command. Bytes 2-9 are for the Logical Block Address that identifies a first unit of storage that the read command operates on. Bytes 10-13 are for the transfer length, which indicates the number of blocks that are being read beginning with the unit of storage (i.e., block) identified by the logical block address. Bytes 14 and 15 are reserved for future use. Byte 16 is a RelativeChk field that indicates whether the time field is relative or absolute. If the RelativeChk field is 0, the time specified in the command block is relative to the present time; therefore, a 0 indicates that the time specified is a past time measured from the current time. For example, a recovery time of T−5000 specified at a request time T provides an example of a read command with a recovery time that is relative to current time T, i.e., the recovery time is 5000 increments of time prior to the current time. If the RelativeChk field is non-zero, the time specified is a specified absolutely, i.e., without reference to another time. For example, such an I/O request could include a relative time and the storage management device 38 could have a minimum increment of time that is one second or less. In another embodiment, the I/O request could include an absolute time and the minimum time increment could be one millisecond or less.

Bytes 17-24 include the specified read time, either relative or absolute. If the read time is absolute, the recovery time is included in bytes 17-24. If the read time is relative, the recovery time is calculated based on subtracting the specified read time from the current time. Bytes 25-30 are reserved for future use. Byte 31 is the control field of the command block 88.

In operation, data is provided to the host 34 in response to I/O requests generated by the host 34 and communicated to the storage management device 38 over the first communication link 40. To maintain a historical record of data that was stored in current store A 40 in the past, in one embodiment, the storage management device 38 employs a copy-on-write process when a host 34 I/O request directs the storage management device 38 to replace existing data with new data. Upon receipt of the host's 34 write request, the copy-on-write operation is executed by copying the existing data that is to be replaced from the current store A 44 to the time store A 46. The location in the current store A 44 from which the data is copied is referred to as the original location. The location in the time store A 46 in which the old (i.e., overwritten) data is stored is referred to as the destination location.

It may be that an actual copy of data is not performed upon the occurrence of a write operation in a particular instance, for example, because the data that will be overwritten is already saved (because it was saved with other nearby blocks, for example) or because the data is saved in memory and not written immediately. Here, copy-on-write operation can mean actual copying, but also can include such optimizations that allow for the effect of a copy-on-write. The storage management device 38 keeps track of the data that was in a unit of storage before it is overwritten, and there is sufficient information in a time store to obtain the saved data from somewhere within the storage management device 38, the physical store, and/or elsewhere after the block is overwritten. For simplicity of explanation, the examples described below generally present the operation of the storage management device 38 as if the copy-on-right were always performed, with the understanding that optimizations can be used in practice.

In one embodiment, the storage management device 38 indexes each copy-on-write and retains a record of the original location, the destination location, and a timestamp. In various embodiments, the timestamp includes the time at which the data was written to the current store A 44 or the time store A 46. In another embodiment, the timestamp includes the time that the write request was received and processed by the storage management device 38.

As a demonstrative example, the storage management device 38 can present to the host 34 a data store A. In this example, data store A is a disk volume. In one embodiment, data store A is implemented with a current store A 44 and a time store A 46. The storage management device 38 is capable of storing each change made to the volume A, and further, of providing to the host 34, a "prior image" of the volume as it existed at times in the past. As described above, the storage management device 38 can be accessed with a time specification.

Generally, because of the high volume of I/O requests found in the data management systems employed in enterprise applications, each prior image of data store A will include at least some data from time store A 46 in those applications. For example, if at present time T, host 34 requests a prior image of data store A at some time in the past T–100, the storage management device 38 will review its index and determine the units of storage on data store A that have been updated between time T–100 and the present (T). The host 34 receives data from the prior image of data store A, at time T–100, that includes the units of storage from current store A 44 that have not been updated since T–100 and, for those units of storage that have been updated since T–100, the units of storage from time store A 46 representative of the data store A at T–100.

As another example, at a current time T, host 34 requests an image of data store A from a prior time T–30. In response, the storage management device 38 generates a prior image for T–30 by employing data that exists in the current store A 44 provided that the storage unit has not been updated since the request time T–30. However, the data from current store A 44 is combined with data from time store A 46 for each record that has been updated since the request time T–30. For example, if data stored in Block 100 of current store A 44 was written once since the request time of T–30 (e.g. at time T–20), the old data that was transferred from the current store A 44 to the time store A 46 as a result of copy-on-write command that occurred at time T–20 would be found in time store A 46 at a specific address. That is, the data in time store A 46 will be indexed with its location and a timestamp indicating that it was written at time T–20. Because this is the only point in time since T–30 in which Block number 100 was written, the unit of storage identified by Block 100 and time T–20 stored in time store A 46 is the representative data of Block 100 that will be presented to host 34 when the image of data store A at time T–30 is created.

Referring to FIG. 3, in a much-simplified illustrative example, a storage management device 38, presents a volume A that includes five units of storage, shown for simplicity as 100 byte blocks Block 100, Block 200, Block 300, Block 400 and Block 500. In this example, five updates are made to data store A between the current time T and a past time. Past write times are shown in this example, and for simplification these are identified as times T–60, T–48, T–33, T–29, and T–15. In this notation, the time T–60 is 60 units (e.g., seconds, milliseconds, microseconds) prior to time T. In an actual implementation, the units would be small increments of time, and so these numbers (i.e., 60, 48, 33, 29, 15) would likely be significantly larger.

In this example, Block 100 is updated at time T–60. Block 300 is updated at time T–48. Block 200 is updated at time T–33 and again at time T–29. Block 400 is updated at time T–15. As described above, prior to the write to Block 100, the information at Block 100 will be read and stored in the time store 46 for volume A. The same copy-on-write operation takes place for the other blocks. As a result, time store A 46 will include five records corresponding to data copied from current store A 44 prior to write requests directed to current store A 44.

In one embodiment, storage management device 38 indexes each record stored in time store A 46 with both the location of the unit of storage (e.g., Block 100, Block 200, etc.), and also a timestamp associated with the time in which the copy-on-write was performed. Thus, a prior image of data store A at time prior to T–60 can be generated by presenting data from time store A 46 for Blocks 100-400 and data in current store A 44 for Block 500, because Block 500 was not updated between prior time T–60 and present time T. Likewise, if a view of data store A (i.e., a prior image) at time T–35 is desired, three blocks can be provided by the current store A 44, i.e., Block 100, Block 300, and Block 500, because they were unchanged after time T–35. Block 200 and Block 400 were modified since time T–35, and so those blocks can be provided by the time store 46 for volume A.

Thus, as demonstrated in this simplified example, by saving in the time store 46 data that is on the volume before that data is overwritten, and also by indexing the data stored in the time store 46 by the time that it was overwritten, the system has available to it a complete current version in the current store 44, and also has an image of the data on the volume A at the time interval for which there is data in the time store 46. The storage management device 38 can present a "virtual" volume that reflects the original volume at a time in the past. Further, the storage management device 38 can provide a virtual volume from any time in the substantially continuous time interval, "substantially" continuous because of the quantization limits defined by the minimum time increment. The virtual volume need not be generated before the request time.

In one example implementation, if the example volume is referred to as volume A, another volume, volume B, can be provided that is based on the "prior image" of volume A, that is, the contents of volume A at an earlier time. This data from volume B can be copied from the prior image of volume A onto a new volume, such that volume B then a complete copy of volume A at a prior time. Volume B can also remain "virtual" in the sense that volume B can exist merely in the form of the combination of the current store A 44 and the time store A 46, with the storage management device 38 providing the data from either the current store 44 or the time store 46 in response to accesses to volume B.

Figure 4:
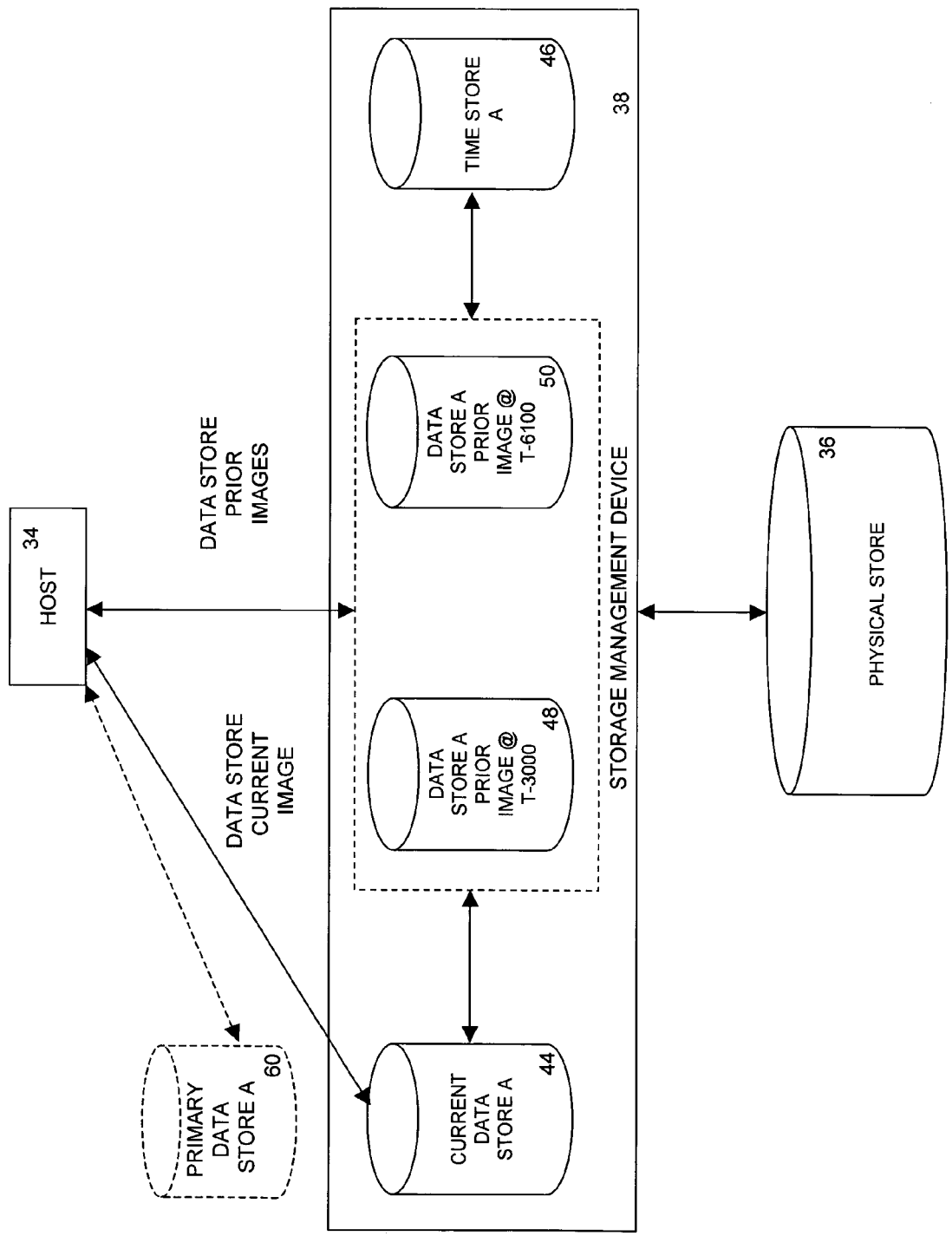
FIG. 4 is a block diagram depicting the generation of multiple prior images of a data store according to an embodiment of the invention.

Referring to FIG. 4, it is possible, for example, to provide both the current image of volume A, a prior image of volume A at one time (e.g., time T−3000) and a prior image of volume A at another time (e.g., time T−6100). Because these prior images are "virtual," the storage management device 38 can provide both virtual prior images 48, 50 simultaneously.

The host 34 and the storage management device 38 can use one or more of a variety protocols to refer to prior images of a data store. For example, the host 34 can request in an out-of-band communication that the storage management device 38 make available a virtual data store that is a prior image of another volume. The host 34 can request in an in-band communication, for example using the existing protocol or an extension to the existing protocol that the storage management device 38 make a new volume available. A system administrator can also operate a console or control panel of the storage management device 38, or otherwise provide input to the storage management device 38 to direct the storage management device 38 to make a volume available that is a virtual image of another volume. In some implementations, the new volume can be assigned a volume or device identifier (e.g., a SCSI ID, or a Fibre Channel world wide name).

Thus, in one embodiment, the storage management device receives a request to create a virtual data store that reflects the state of an original data store at a specified time. The virtual data store can be, for example, a new logical unit. The specified time can be selected from a substantially continuous time interval between a past time and the current time. The size of the interval (and the value of the past time) is a function of the size of the time store and the amount of changes directed to the data store. The virtual data store, because it is virtual, it can be provided substantially instantaneously, with minimal or no data movement.

The storage management device receives a storage protocol request for data at a specified address in the virtual data store and transmits, in response to the storage protocol request, data stored in the original data store at the specified address at the specified time.

The request to create a new virtual data store can take the form of some manipulation of a user interface. The user interface can be on one or more host systems, and communicate to the storage management device, and/or the user interface can be on a console for the storage management device. The request can be communicated via a variety of networking technologies and protocols, and/or via a storage protocol, for example, the same protocol over which the request for data is made. The request can even be part of the same storage protocol packet as the request for data. A request for data from a time in the past can even trigger automatically the provision of a virtual data store.

The request for data can be a standard read request, for example via a storage protocol, such as a SCSI read request. The request can specify an address, which can include a logical unit identifier, and a location identifier. The address can include the identifier for the virtual data store.

The original data store can itself be a virtual data store, as described here. There can be a chain of virtual data stores, each formed from a prior image of other data stores.

As described, because it is virtual, the virtual data store can be provided substantially instantaneously, with minimal or no data movement. It is possible, however, if there will be sustained use of the virtual data store, to copy the data from the virtual data store, for example, in the background, to another data store, and thereby make a complete copy of the virtual data store. Once the copy is complete, the copy can be used instead of the virtual data store. In this way the prior image can be provided by the virtual data store substantially instantaneously, with the time-consuming copying of data from one data store to another being essentially transparent to users of the storage management device.

In another embodiment, the host 34 can communicate with the storage management device 38 using a protocol that allows the host 34 to access a unit of storage by referring to an address and a time. Thus, the dimension of time is added to the access request. The time can be referred to in a number of ways. For example, the host 34 can refer to absolute time as it kept by it or by the storage management device 38, for example, 4:07.33 on a particular day. The time can also be referred to relatively, that is, it can be specified as a time relative to another time. In one embodiment, the time is referred to based on a number of time units to be subtracted from (thus, relative to) the current time. This approach eliminates the need for the host 34 and the storage management device 38 to have a precisely synchronized clocks. Time can be referred to using any applicable units and can be any applicable units, including without limitation nanoseconds, microseconds, milliseconds, seconds, etc.

Thus, in one approach, the host 34 (or the system administrator) could first direct that a new virtual volume be created, volume B, that is a prior image of volume A, at time T−3000. The host 34 (or the system administrator) could then direct that a new virtual volume be created, volume C, that is a prior image of volume A, but at time T−6100. Thus the host can compare the actual data on volumes A, B, and C as necessary to determine what files or records, etc. on the volumes differ, for example, for forensic purposes, etc.

In another approach (that can be used in addition to or instead) the host 34 could make a request of a volume with a request that includes a specification of time in addition to the address of the data. The storage management device 38 can respond to the request by providing the data at the specified address at the specified time.

It should be noted also that in some implementations, current store A 44 can be a mirror disk of a disk 60 that is shown in phantom, or used in any other configuration as would one or more actual volumes.

The time images can also be either fixed or dynamic. A fixed time image, also referred to as a clone is similar to a snapshot of data store A at a specific point in time. It is referred to as a fixed because it is not updated, i.e., once it is created no data is written to it. A fixed image generated by storage management device 38 can differ from a snapshot, however, because the image can be generated for the first time at a request time that is later than the recovery time, i.e., the storage management device 38 re-creates an image that may not have previously existed at any time since the recovery time. In contrast, a snapshot is a duplicate that is generated at the then current time.

A dynamic time image is created as an image of current store A at a specific point in time. However, unlike a fixed time image, once generated, a dynamic time image is continually updated in the same manner as current store A. As a result, the contents of a dynamic time image are the same as current store A 44 up until the recovery time. For example, if first prior image 48 is dynamic, it will match current store A up until T−3000. Thereafter, beginning at the present request time (T), updates to current store A are replicated on first prior image 48. The resulting dynamic time image functions as a current store B which includes the results of all I/O requests directed to current store A 44 except for those occurring between request time (T) and recovery time (T−3000). Accordingly, current store B also has a time store, i.e., time store B, associated with it.

Figure 5:
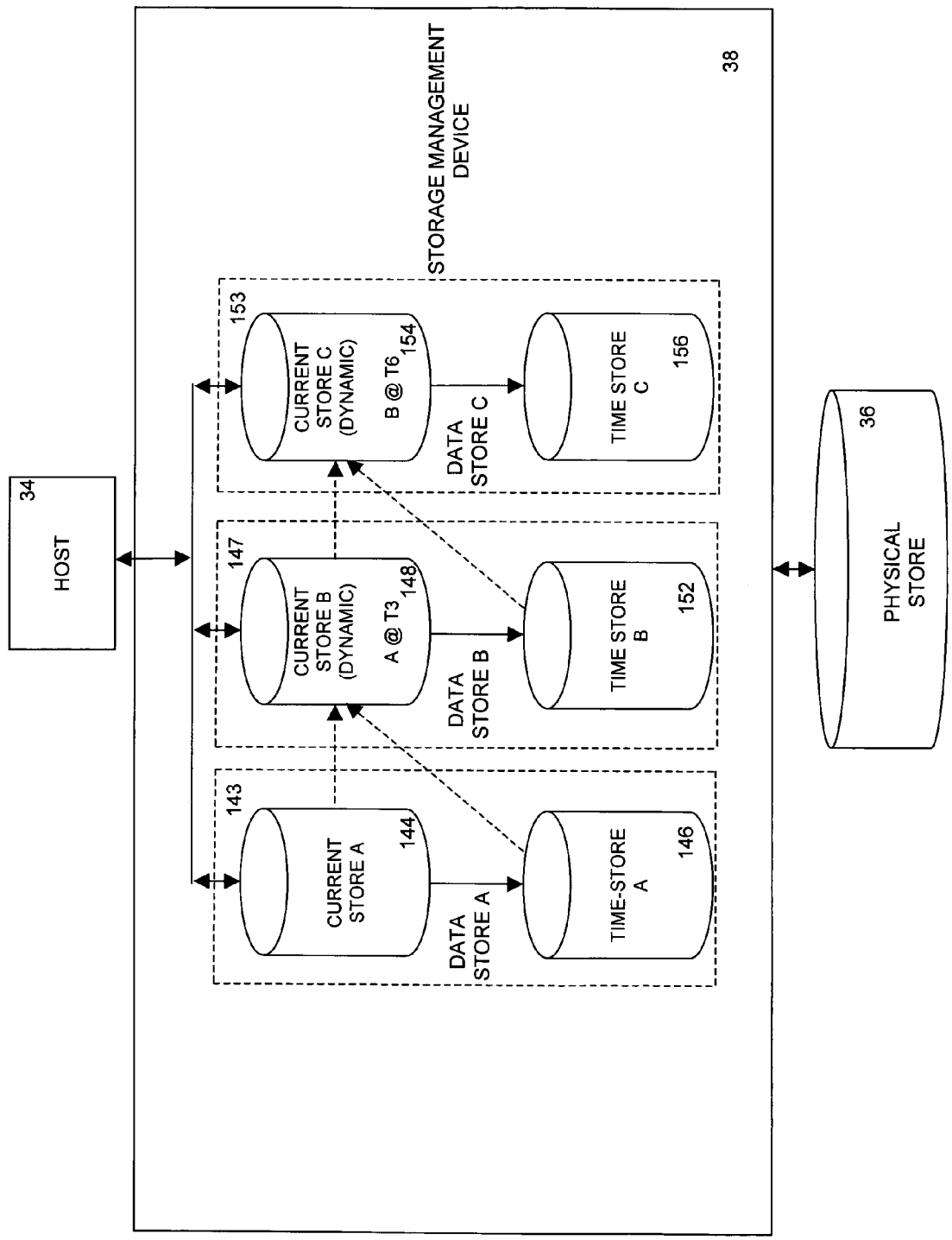
FIG. 5 is a block diagram depicting the generation of dynamic current stores according to an embodiment of the invention.

Referring to FIG. 5, fixed and dynamic time images are shown. A fixed prior image is a view of a data store at a specific point in time. It is fixed in the sense that it is not updated—for example, it can be read only. In one embodiment, a time image is fixed by identifying it as a read only image at the time the image is created. A fixed image can be useful for looking at a data store at a particular time, for forensic purposes (i.e., to identify the cause of a problem), or to recover erased data. A dynamic image starts as a view of a first data store (e.g., data store A) at a particular point in time, but the prior image can be modified. The dynamic image can appear to the host as if it were a new data store onto which a prior image were copied. A dynamic image can be useful for quick recovery from a failure.

For example, upon failure due to corruption of data in a first data store, fixed prior images can be specified (as described above) that each present the data in the first data store as it existed at a specified time in the past. These prior images can be inspected to determine the approximate time of the corruption. As the minimum time stamp increment is decreased, the approximate time can be determined with increased precision. In one embodiment, a prior image that presents data from just before the time of corruption is specified to be dynamic, the software applications that use the data in the data store begin to use the prior image instead, and business activity resumes using the most recent uncorrupted version of the first data store. The applications can use the image, for example, by reconfiguring the business applications in some way, or by directing the storage management device 38 to present the dynamic prior image in the place of the first current data store, i.e., by using the prior image to create a second data store (e.g., data store B). In one embodiment, a dynamic image appears to the host as a new data store (e.g., a new device with a target identifier).

In one embodiment, the storage management device 38 provides a dynamic image without copying (or without initially copying) the prior image to another data store. Rather, the storage management device, as described above, provides the prior image of the first data store by using the current store and the time store associated with the first data store, as appropriate. The storage management device also associates a second current store and second time store with the dynamic image (i.e., the second data store), such that the changes to the dynamic image are stored in the second current store, and the changed blocks are stored (e.g., in copy-on-write fashion) in the second time store.

In one embodiment of such an implementation, the storage management device 38, upon receiving a request for current data in the dynamic image, will check first for data in the second current store, and then for data in the first time store, and lastly, for data in the first current store. Upon a write request to the dynamic image, the storage management device 38 determines the location for the data currently in the dynamic image (i.e., the second current store, the original current store, or the original time store), stores the block that was "overwritten" in the second time store and then writes the new block to the second current store. A request for data from a prior image of the dynamic image can be provided using the second time store, the second current store, the first time store, and the first current store.

In another embodiment, the dynamic images are stored entirely in the time store. In this embodiment, a data store has a single current store and a single time store. In a version of this embodiment, fixed images, dynamic images, indexing information, and control blocks are stored in the time store. Dynamic images can be created by writing data located in the data store at a specified recovery time to a section of the time store. In a further version of this embodiment, a copy-on-write operation is not performed when dynamic images are written to.

Because the storage management device 38 (at least initially) can provide the dynamic image as a "virtual" device, in the sense that the data in the dynamic image is a combination of the data in the first and second current data stores and the first and second time stores, the dynamic image can be provided very quickly, and without copying of data from one data store to another. Once a dynamic image is up and running, it can be useful to (as storage management device capacity allows) copy the contents of the first current store and/or the first time store to the second current store and second time store for the dynamic image. In other words, the "virtual" second data store can be used to create a new data store that can be used to independently replace the first data store. This can be accomplished in the background, or at a time when storage management device transaction activity is relatively low. In addition, the background copy operation can be initiated either manually or automatically. In one embodiment, either the host 34 or a system administrator can initiate the background copy operation and data store replacement operation.

Referring to FIG. 5, as a simplified demonstrative example of this embodiment, suppose that a dynamic image is created of a first data store, referred to in this example as data store A 143. The prior image upon which the dynamic image is based is specified to be data store A 143 at (again, as an example) a particular time (e.g., 11:00 a.m.). The prior image of data store A 143 is provided using the current store A 144 and the time store A 146 associated with data store A 143. Upon indication by the host 34 or the system administrator that the prior image should be dynamic (and therefore allow modification), the second data store is assigned an identifier, which in this example is data store B 147, and a current store B 148 and a time store B 152 are allocated to the dynamic image.

The storage management device 38 responds to a read request to data store B at the current time by checking first the current store B 148, and if the requested block is not in the current store B, then the time store A 146 and current store A 144 can be used to obtain the block as it was at the time of the prior image that was the basis for the dynamic image. To use data from a prior image of data store A 143, an index of the data store A 143 is checked to determine whether current store A 144 or time store A 146 contains the desired block.

The storage management device 38 responds to a write request to data store B (for the current time) by locating the current content of the target block as just described for the read request (e.g., checking first the current store B 148, then the time store A 146, then the current store A 144), reading the target block, and then writing the data read to the time store B 152 to complete a copy-on-write operation. The data associated with the write request for the target block is written to current store B 148.

A read request to data store B 147 for a time in the past can be responded to by checking first the time store B 152. An index of the time store B 152, for example, can be checked to determine whether it contains the desired block. If not, then current store B 148 is checked, and if the block is not in the current store B, then the time store A 146 and current store A 144 are used to obtain the block as it was at the time of the prior image that was the basis for the dynamic image. That is, an index of the time store A 146 is checked to determine whether it contains the desired block for the desired time, and if not, the block in current store A 144 is used. It should be understood that the order in which the index of time store A 146 and current store A 144 are checked may be reversed. Alternatively, a composite index of time store A 146 and current store A 144 may be employed.

It should be noted that data store A 143 can continue to be an active data store and there can be continued transactions to data store A 143, but those later changes will not be reflected in data store B 147, because the storage management device 38 will continue, for accesses to data store B 147, accessing the data store A 143 at a specific past time (i.e., the prior image), and blocks later changed in the current store A 144 will be saved in the time store A 146, and so will not be lost. Practically, the size of the past time interval that can be captured by the time store will depend on the frequency of write operations directed to data store A 143 and the size of the time store A 146. Depending on the specific implementation, it therefore may be beneficial, at some time after beginning use of a dynamic image, to copy the prior image that is the basis for the dynamic image, such as the data store A at 11:00 a.m. in the example above, to another data store, or to the time store B 152 and the current store B 148. As mentioned, this transfer can be accomplished in the background while the storage management device 38 is operating normally.

In one embodiment, the transfer of the prior image blocks to current store B 148 for a specified recovery time is accomplished by the following. A block is copied from current store A 144 if the block in current store A 144 has not been overwritten since the recovery time (i.e., if the block in current store A 144 is not different from the prior image that is the basis for data store B 147) and if the block is not already included in current store B 148 (i.e., if the block was not already "overwritten" in the dynamic image since the time the dynamic image was created). A block is copied from time store A 146 to current store B 148 if it represents the data appearing in the block of data store A 143 at the recovery time, and if the block is not already found in current store B 148 (i.e., the block was not already "overwritten" in the dynamic image). Optionally, blocks in the time store A 146 from a time before the prior image can also be copied from the time store A 146 to the time store B 152, so that the data store B 147 can respond to requests for data for a time before the prior image.

Dynamic images (e.g., a third data store) can be created based on other existing dynamic images (e.g., data store B), such that the data in the third data store is provided from other current stores and time stores (e.g., from data store A and data store B). Such a dynamic image also can be generated without copying (or without initially copying) the prior image to another data store.

For example, the storage management device 38, as described above, can provide the prior image of a dynamic data store (e.g., data store B) by using the original current store (e.g., current store A), original time store (e.g., time store A), second current store (e.g., current store B), and second time store (e.g., time store B), as described in the above example. If this new prior image is specified to be dynamic, the storage management device 38 can associate a third current store and third time store with the new dynamic image (e.g., third data store), such that the changes to the new dynamic image are stored in the third current store, and changed blocks of the third data store are stored (e.g., by copy-on-write operation) in the third time store.

Using the above example, the system administrator can, upon detection of data corruption in data store B 147, again use a number of prior images to identify the approximate (or even the exact) time of data corruption. The system administrator can then identify a prior image of data store B 147 that is of a time that is before the corruption. As an example, we say this image was at 1 p.m. The system administrator can specify that the image of data store B at 1 p.m. is a dynamic image, and this new dynamic image will be called data store C. Data store C 153 is allocated a current store C 154 and a time store C 156.

Upon receiving a request for current data in the data store C 153, the storage management device will check first for data in current store C 154, and then for data in current store B 148 and time store B 152 for the time at which the dynamic image was created. If the data block is not in current store B 148 or time store B 152 as appropriate, the storage management device 38 will obtain the data from time store A 146 or current store A 144.

Upon a write request to data store C 153, the storage management device 38 determines the location for the data currently in the dynamic image (i.e., current store C 154, current store B 148, time store B 152, current store A 144 and time store A 146), stores the block that was "overwritten" in time store C 156, and then writes the new block to current store C 154. A request for data from a prior image of the dynamic image can be provided using time store C 156, and the current store C 154 in appropriate combination with current store B 148, time store B 152, current store A 144, and time store A 146.

Figure 6:
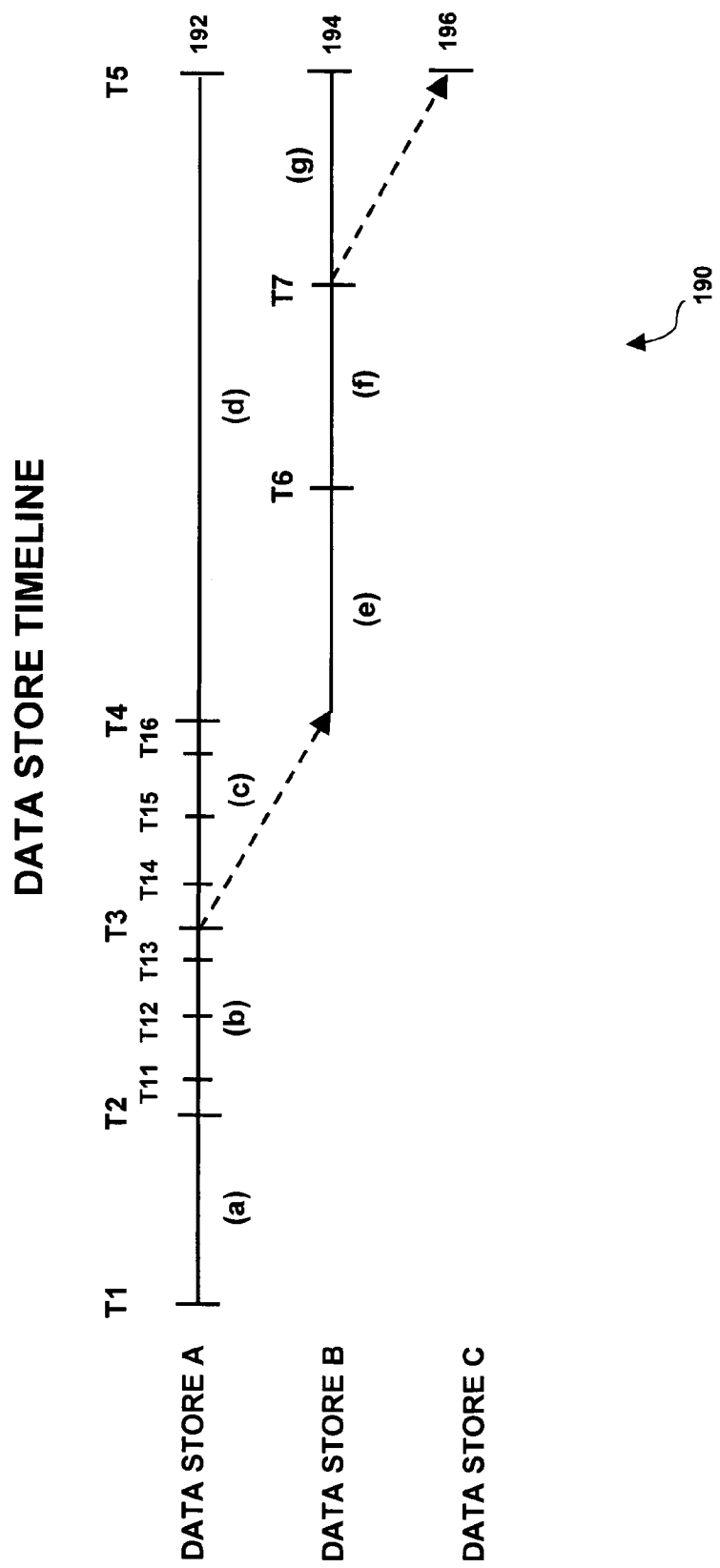
FIG. 6 is a timeline depicting the generation of a recovery data store.

Referring to FIG. 6, in another example, presented as a timeline 190, the top most horizontal line represents data store A from a first time T1 to a later time T5, i.e., time line 192. A host 34 directs I/O requests to the data stores throughout the time period T1 to T5. Data store A is used first and, in this example, an application directs read and write transactions to data store A.

At time T3, the system administrator recognizes that there has been corruption in the data store A 143, likely caused by a corruption event. The system administrator implements a review of prior images of data store A 143 to determine the time that the data corruption occurred, by identifying a recent time that the data was not corrupted. In other words, the corruption event likely occurred at the earliest time that corrupted data appears. The storage management device 38 can be employed to implement a search of arbitrary past versions of data store A 143 so that the time of the corrupting event can be determined. The degree of precision at which the corrupting event can be is at least in part determined by the minimum time stamp increment.

The validity of the data in data store A 143 is checked in a first search conducted to identify the time of the corrupting event. The first set of vertical lines appearing on time line 192 between T3 and T4 provide a simplified example of points in time (i.e., T14, T15 and T16) that a search was conducted. They represent a search from time T4 when the fact that corruption is first recognized back to time to T3. A system administrator, for example, begins the search at time T4 and reviews the data at a first search time T16. The data at time T16 is corrupted, so the system administrator reviews data from an earlier point in time, i.e. time T15 and T14. The data at time T15 and T14 is corrupted, so the search continues with review of time T11. The data at time T11 is not corrupted, and so the administrator checks time T12, time T13, and time T3. The search continues in this manner until the identification of the most recent time for which valid data exists, which in this example is time T3.

The search may also be conducted using a variety of search methodologies. For example, larger time increments between the first and second searches might be used in an effort to more rapidly determine the time of the corrupting event. Also, the search need not begin from the point in time that the corruption is discovered. For example, the search can begin at an earlier point in time if the system administrator has an idea of the approximate time of the corrupting event. The search may also begin at a time that is earlier than the corrupting event, e.g., T1, T2, etc. For a search with a first search time at time T2, for example, the search would proceed to later points in time until the first time where corrupted data is found. It should be understood that any search strategy can be employed because the storage management device 38 is capable of providing any version of the data store A 143 that is within the interval covered by the time store A 146, to the precision of the minimum time stamp increment. In one implementation, the time precision is one millisecond.

In this example, time T3 is specified as the recovery time because it was a desired point in time identified because the corruption did not exist. Of course, the user could have selected an even earlier point in time, prior to T3, as the recovery time. A second data store, data store B 147, is established using the data from data store A at time T3. Recall that at time T4, the user identified time T3 as the most recent point in time for which valid data exists for data store A 143. At time T4 (i.e., the request time), the user creates data store B 147 as a prior image of the first data store, data store A 143, at time T3 (i.e., the recovery time). In FIG. 6, timeline 194 is associated with data store B 147.

Data store B 147 is a dynamic image; therefore, a second current store (current store B) 148 and a second time store (time store B) 152 are associated with data store B 147. Once current store B 148 is created, the storage management device 38 can make data store B 147 available to the host 34, and the application can use data store B 147 in place of data store A 143. Thereafter, host 34 I/O requests can be directed to data store B 147 instead of data store A 143. In this example, I/O requests continue to be directed to data store A 143 and data store B 147 between time T4 and time T5. In another embodiment, data store B 147 is a dynamic image comprised of a second current store that is not associated with a second time store. In a version of this embodiment, current store B 148 is implemented in a write pool whereby a write command directed to data store B 147 results in the newly written data replacing existing data in current store B 148, i.e., a record of the old data in the current store B 148 is not retained.

As described previously, data store B 147 can be created without copying the contents of data store A 143. Data store B 147 therefore can be created virtually immediately, and it can be brought on-line quickly. The data initially associated with data store B 147 resides in current store A 144 and time store A 146.

Upon receiving a read request for data store B 147 at the current time, the storage management device 38 determines which of current store A 144 and time store A 146 has the data for the block that is being read. Data in current store A 144 will be used for all data that has not been written to since time T3 and data in time store A 146 will be used for all blocks in current store A 144 that were overwritten after time T3. Once some data has been written to current store B 148, a response to a read command directed to data store B 147 at the current time might come from current store B 147, current store A 144, or time store A 146. Upon receiving a read request, storage management device 38, determines which of current store B 148, current store A 144, and time store A 146, has the data for the block that is being read. The storage management device 38 will use data in current store B 148 for all requests for blocks in data store B 147 that were written after time T4, i.e., timeline segments (e), (f), and (g). Data in current store A 144 will be used for all blocks of data that have not been written to since time T3 (timeline segments (a) and (b)), and data in time store A 146 will be used for all blocks of data on data store A 143 that have been written to between times T3 and T4 (timeline segment (c)).

Data store A 143 can continue in a dynamic state after time T4, however, changes that occur to data store A 143 after T4 will affect only the location of the data used to respond to requests for blocks in data store B 147. Such changes will not affect the actual contents of data store B 147. The source of data for block 100 of data store B 147 is a corresponding block in current store A 144 if, for example, the corresponding block 100 of data store A 143 has not been overwritten since time T3. However, the source of data for block 100 of data store B 147 is a corresponding block in time store A 146 if the corresponding block 100 was overwritten in current store A 144 since time T3, e.g., a copy-on-write command was executed on the corresponding block in data store A 143. Of course, the immediately preceding description assumes that block 100 has not yet been the target of a write command since the creation of data store B 147. Additionally, where data store A 143 is dynamic, data written to data store A 143 following time T4 is processed with copy-on-write operations such that time store A 146 continues to be employed after time T4 to save newly-overwritten data.

When a write request is directed to data store B 147, the storage management device 38 determines where the data currently in data store B 147 is located (i.e., current store B 148, current store A 144, or time store A 146). The location of the data will be the following:

1) in current store B 148 if the block in current store B 148 has been overwritten since time T4;

2) in current store A 144 if the block in current store A 144 has not had data written to it since time T3; and 3) in time store A 146 if the block in current store A 144 was overwritten anytime after time T3.

It then follows that:

1) If the data is located in current store B 148, the existing data will be read from current store B 148 and written to time store B 152. (e.g., copy-on-write). The new data will be written to current store B 148. In one embodiment, updates to current store B 148 are accomplished without using a copy-on-write operation or a time store B 152. In a version of this embodiment, old data is not saved when write commands are directed to current store B 148.

2) If the data is located in current store A 144, the existing data from current store A 144 will be copied and written to time store B 152 without overwriting the existing data in current store A 144. The new data will be written to current store B 148.

3) If the data is located in time store A 146, the existing data from time store A 146 will be copied and written to time store B 152 without overwriting the existing data in time store A 146. The new data will be written to current store B 148.

Upon a read request for data store B 147 for the current time, the storage management device 38 determines the location for the data currently in the dynamic image by checking for data in current store B 148, current store A 144 and time store A 146. The storage management device 38 will use data in current store B 148 for all blocks of data store B 147 that are written to after time T4, i.e., timeline segments (e), (f), and (g). Data in current store A 144 will be used for all blocks of data that have not been written to since time T3 (i.e., timeline segments (a) and (b)), and data in time store A 146 will be used for all blocks of data on data store A 143 that have been written to (in data store A 143) between times T3 and T4 (timeline segment (c)).

Any number of additional data stores may also be generated based upon a current or prior image of data store A 143. For example, an image of data store A 143 at time T2 can be created at any time beginning with time T2, e.g., a data store D can be created at time T3. Creation of additional data stores can be performed sequentially with, in parallel with, or independently of the creation of the other data stores that are based on data store A 143. In each case, the contents of the additional data stores appear to be independent of the contents of the other data stores, i.e., at the creation of a data store its contents depend upon the contents of data store A 143. Thereafter, read and write commands directed to the additional data stores are responded to with data from current store A 144, time store A 146, and/or the additional data store that the command is directed to.

In one embodiment, the storage management device 38 implements an instant restore that allows a user (e.g., a host or system administrator) to generate a prior image of a data store substantially instantaneously. For example, as is described in greater detail herein, the architecture of the storage management device 38 provides detailed indexing of the write commands that are directed to each data store so that the appropriate data for each block of the data store at any time can be rapidly identified and accessed.

The instant restore can be performed in more than one manner. For example, an instant restore occurring at time T4 can be a non-destructive restore of data store A 143 for a desired recovery time of time T3. In one embodiment, the non-destructive restore is implemented by copying back into current store A 144 the results of write operations performed between times T3 and T4. In a version of this embodiment, a copy-on-write operation is performed on each block of data store A 143 that was written to from time T3 to time T4. At the recovery time, data that was current at time T3 for that block is written to each of the corresponding blocks of data store A 143. The data in the current store that is overwritten is copied to time store A 146. As described herein, the relevant details regarding the data written with a copy-on-write operation are indexed by the storage management device 38. As a result, it is possible to later recover and review the operations that were performed on data store A 143 between T3 and T4.

Because non-destructive instant restore operations increase the amount of data that must be stored in the time store, the storage management device 38 can also implement a compact recovery. In a compact recovery, some selected data is not retained following the recovery. In a version of this embodiment, a write operation, not a copy-on-write operation, is performed on the blocks of data store A 143 that were updated between T3 and T4. As a result, at the recovery time, data that was current at time T3 is written to each of the corresponding blocks of data store A 143 that were updated between T3 and T4. In another version of this embodiment, a copy-on-write operation is performed, but the data retained for the period between T3 and T4 is placed at the front of the queue of data that will be overwritten should the time store reach its storage capacity. For example, the data from the period T3 and T4 can be associated with the earliest portion of the time line so that it will be the first to be replaced when the specified storage capacity for the data store is reached.

FIG. 6 also depicts the creation of a third data store (i.e., data store C) generated from the contents of data store B 147, i.e., data store C 153 is generated from a previously created dynamic image. Here the request time is T5 and the recovery time is T7. Once again, the recovery time can be a time before corruption occurred. The operation that creates data store C 153 from data store B 147 is referred to as "stacking" because it creates a series of virtual data stores where each data store is based upon a prior image of another data store (or data stores).

In this example, data store C 153 is based upon a prior image of data store B 147 and data store B 147 is based upon a prior image of data store A 143. As a result, data store C 153 can initially be provided from data stored in any of current store B 148, time store B 152, current store A 144 and time store A 146. The storage management device 38 can present an image of data store C 153 to the host 34 based upon the following resources: 1) current store B 148 will be used for data from blocks that were overwritten between times T4 and T7, but that have not been overwritten since time T7 (timeline segments (e) and (f)); 2) time store B 152 will be used for data from blocks that have been overwritten since time T7 (timeline segment (g)); 3) current store A 144 will be used for data from blocks that have not been overwritten since time T3 (time line segments (a) and (b)); and 4) time store A 146 will be used for data from blocks that were overwritten between times T3 and T4 (timeline segments (c)).

Current store C 154 and time store C 156 are allocated as described above. Read and write requests directed to data store C 153 are processed by storage management device 38 in a similar manner to the process described for data store B 147. One difference, however, is that, in order to locate the contents of data store C 153, the quantity of data stores that must be searched has increased to include current store A 144, time store A 146, current store B 148, and time store B 152. The process of creating a dynamic image from prior data store images can be extended as required by the application within the storage capacity of the system. For example, a dynamic image can be created from a prior image of data store C 153 to create a fourth data store, e.g., data store D. Additionally, the preceding approach can be employed to create a static image from a prior image of any data store, e.g., creation of a clone of data store A 143 at time T3, etc.

Figure 7A:
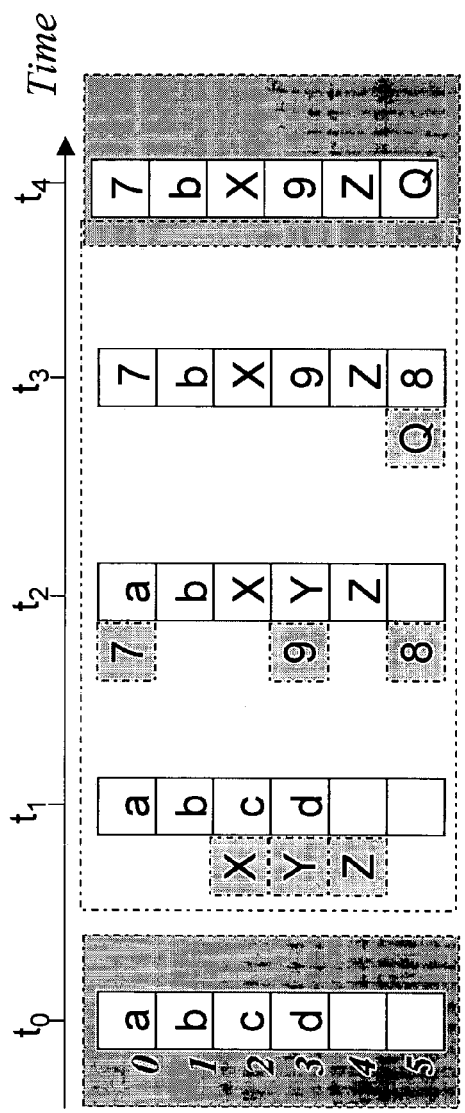
FIGS. 7A and 7B are tables depicting the contents of a current store and a time store during a series of write commands directed to the current store.
Figure 7B:
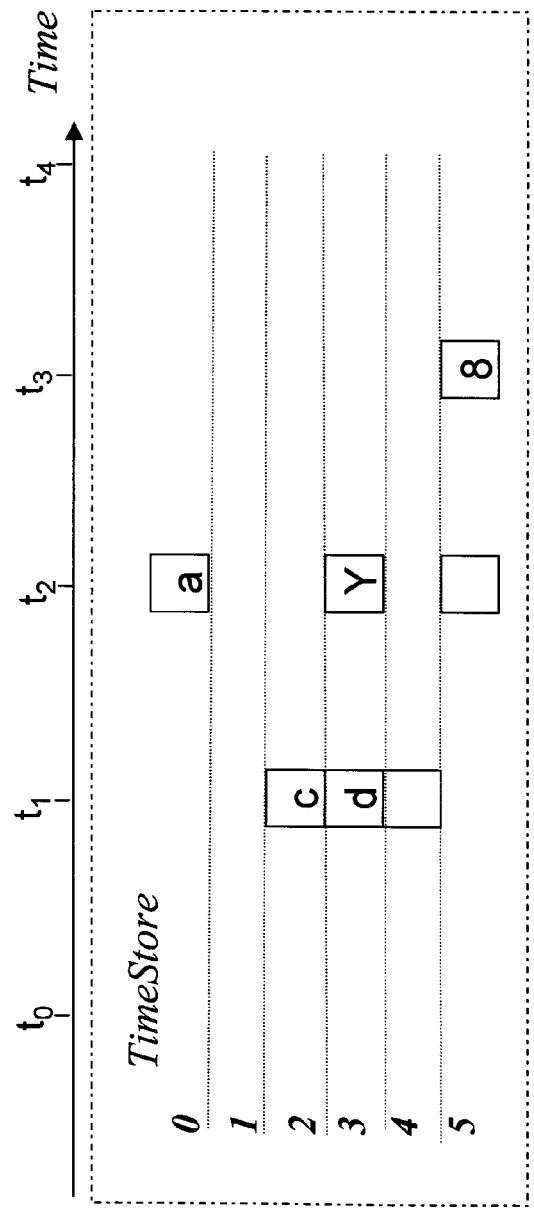

FIGS. 7A and 7B provide another illustrative example of the operation of a current store and a time store for a given data store. FIG. 7A shows the contents of the current store, and FIG. 7B shows the contents of the time store associated with the current store of FIG. 7A. A timeline is drawn at the top of each figure to indicate an initial time t0, a first write time t1, a second write time t2, a third write time t3 and a final time t4. The numbers 0-5 appearing to the left side of FIGS. 7A and 7B identify six blocks of the data store. As mentioned, the data store can consist of any number of blocks or other units of storage. Additionally, the data store can be implemented as any type of resource for storing digital data including a virtual disk, a logical disk, a physical disk, and the like.

The data that is stored at each point in time is enclosed in a solid box. Each of blocks 0-6 of the current store have a corresponding block in the time store. At the time a write request is directed to a block, the data that is written is enclosed in a dashed block appearing adjacent the corresponding block of the current store in FIG. A. This represents data that is pending its transfer to the current store at the completion of the copy-on-write command.

In operation, at for example time t0, data a, b, c, and d are present in each of current store blocks 0-3 respectively. Blocks 4 and 5 do not contain any data at this time. Additionally, the time store does not contain any data because write requests for blocks 0-5 have not yet been directed to the current store. At time t1, data X, Y, and Z are written to blocks 2-4 respectively. A copy-on-write operation is performed on each of blocks 2-4 and the old data appearing in those blocks is read from the current store and written to the time store, i.e., data c, d, and an empty block are written to blocks 2-4 of the time store respectively. As shown in the current store at time t2, the newly written data appears in blocks 2-4 following completion of the write operation at time t1. However, a second write operation is performed at time t2 when data 7, 9, and 8 are written to blocks 0, 3, and 5 respectively. Again, a copy-on-write is performed and, as a result, old data a, Y, and an empty block are written to blocks 0, 3, and 5 respectively. At time t3, a third write operation is performed and data Q is written to block 5. The original data 8 that was previously written to block 5 at time t2 is read and written to block 5 of the corresponding time store. The new data Q is written to block 5 at time t3 and, as a result, the data Q appears in block five of the current store at time t4. Provided that a write operation is not performed at time t4, the time store will remain empty at time t4.

Figure 8:
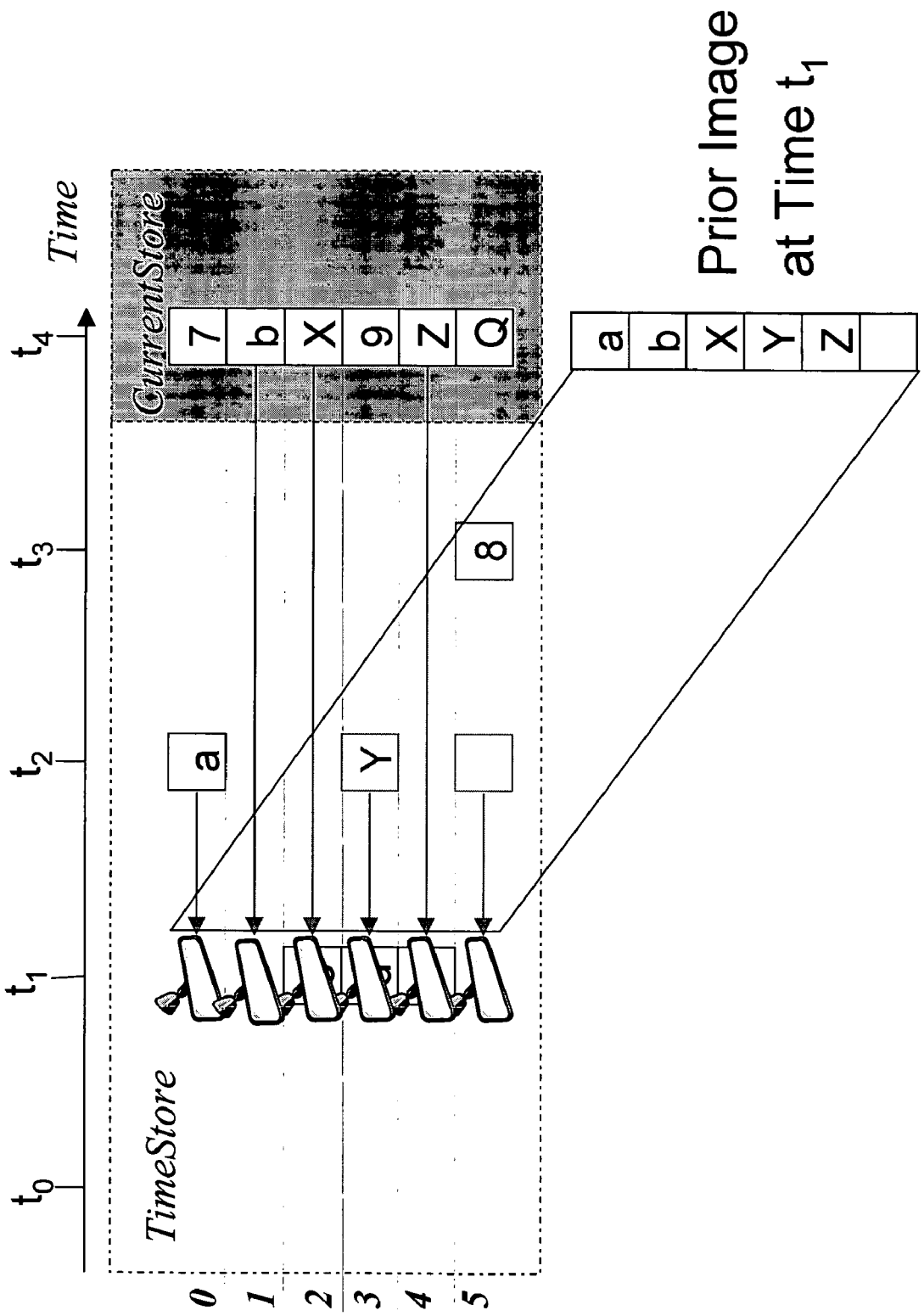
FIG. 8 is a table depicting the generation of a prior image of a data store according to an embodiment of the invention.

The time store of FIG. 8 is based upon the sequence of copy-on-write operations performed to the data store as shown in FIGS. 7A and 7B. FIG. 8 demonstrates how, at request time of t4, a prior image of the current store can be generated for recovery of an image representative of the data store at recovery time t1. Because no write operations were performed on blocks 0, 1, and 5, at either time t0 or time t1, blocks 0, 1, and 5 of the prior image are comprised of data from the current store at time t1. Data from the time store is used for the prior image of blocks 2, 3, and 4 at time t1 because data was written to blocks 2, 3, and 4 at time t1. Thus, the prior image of the data store for time t1 does not reflect the result of changes to the current store occurring after time t1.

Figure 9:
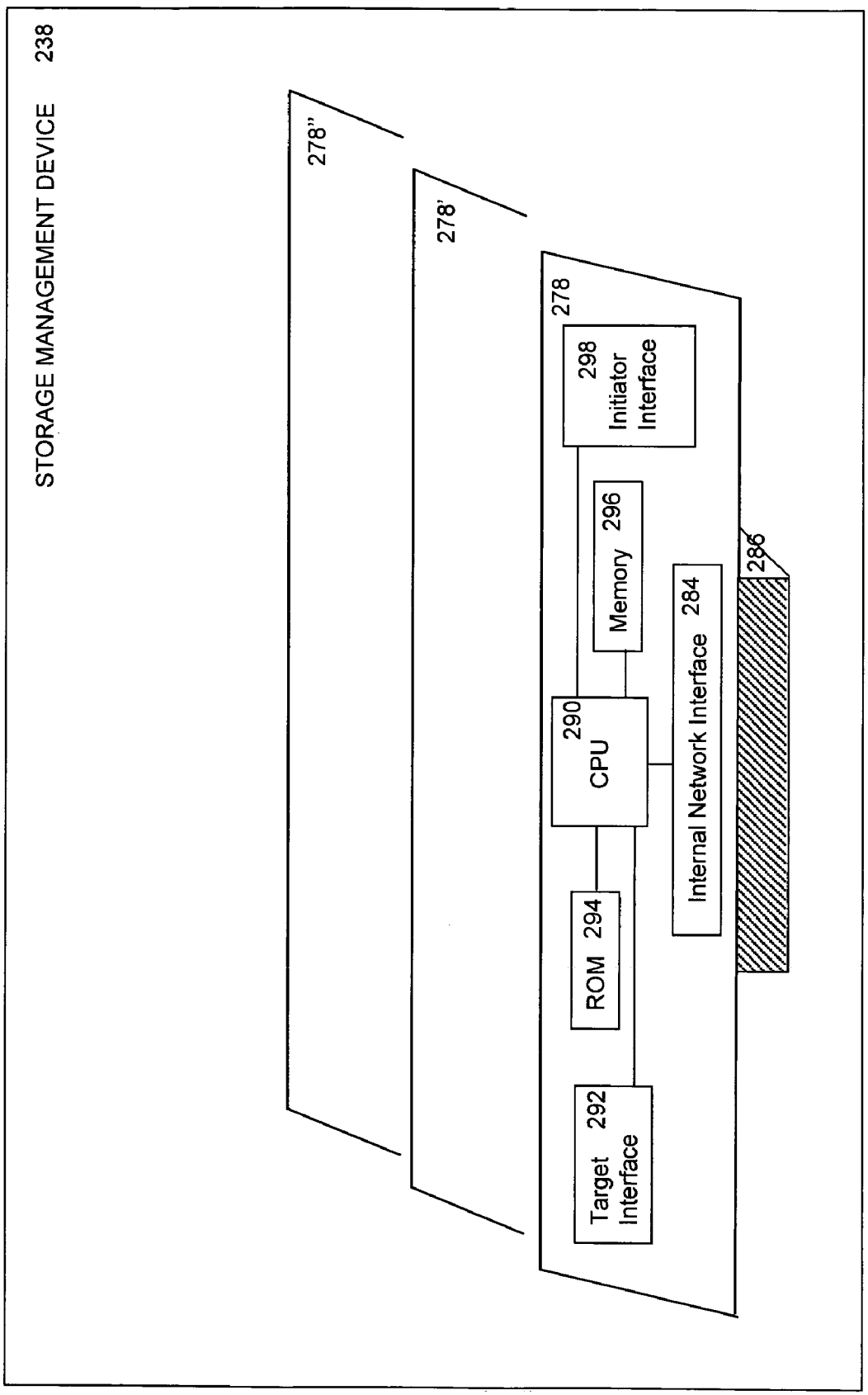
FIG. 9 is a block diagram of a processor module according to an embodiment of the invention.

Referring now to FIG. 9, in one embodiment, a storage management device 238 includes one or more processor modules 278, 278', 278", generally 278. There can be any number of processor modules 278, although three are shown for demonstrative purposes in the figure.

Each processor module 278 includes a CPU 290 that is in communication with each of a target interface 292, a ROM 294, a memory 296, and an initiator interface 298. The CPU 290 can be implemented in one or more integrated circuits, and can include other "glue" logic (not shown) for interface with other integrated circuits, such as bus interfaces, clocks, and communications interfaces. The CPU 290 implements software that is provided in the ROM 294 and also software in memory 296, which software can be accessed, for example, over the internal network interface 284 or in the physical store 36.

The CPU 290 is also in communication with an internal network interface 284 that connects the processor module 278 to an internal network 286, which network allows the processor modules 278 to communicate with one another. The internal network 286 can be implemented as one or more actual networks, and can be any sort of network with sufficient capacity to allow communication of both control information and data. The internal network 286 can include a shared serial or parallel bus, or some combination. The internal network can be or include any type of physical network that implements remote direct memory modeled interfaces such as InfiniBand, Ethernet, Fibre Channel, SCSI, and the like. In one embodiment, the interface is a Direct Access Provider Library ("DAPL").

In one embodiment, the processor modules 278 plug into a backplane that implements the connections for the internal network 286. In one implementation, one or more sets of processor modules 278 are rack mounted within the storage management device 238 and the internal network 286 also connects each rack to the other racks within the storage management device 238. The distributed processing implemented in the storage management device 238 creates a system whose size (e.g., memory capacity, processing speed, etc.) can easily be scaled up or down to fit the desired capacity.

The target interface 292 provides an interface that allows the processor module 278 to present itself as one or more target data store devices. For example, if the target interface 292 is a Fibre Channel interface, the target interface 292 allows the processor module 278 to present one or more Fibre Channel devices to the host (not shown). The target interface 292 can implement any suitable networking communication or data storage protocol. The target interface 292 can be implemented with one or more integrated circuits that preferably have direct memory access to portions of the memory 296 for storage of data received and data to be transmitted. The target interface 292 typically will require initialization and programming by the CPU 290.

The initiator interface 298 provides an interface that allows the processor module 278 to present itself as one or more hosts for communication with physical data storage. For example, if the initiator interface 298 is a Fibre Channel interface, the initiator interface 298 allows the processor module 278 to communicate with one or more physical storage devices over a Fibre Channel interface. The initiator interface 298 can implement any suitable networking communication or data storage protocol. The initiator interface 298 can be implemented with one or more integrated circuits that preferably have direct memory access to portions of the memory 296 for storage of data received and data to be transmitted.

The processor modules 278 can be implemented in a fault tolerant configuration wherein two processor modules 278 are each responsible for responding to I/O requests directed to the same units of storage. In a version of this embodiment, fault tolerance can be further improved by sharing responsibility for I/O requests for units of storage comprising a single physical or logical device (or volume) to multiple pairs of processor modules 278. For example, first and second processor modules 278 can be given responsibility for blocks 100 and 200 of current store A and third and fourth processor modules 278 can be given responsibility for blocks 300-500 of current store A. Fault tolerance can be further improved by locating processor modules 278 that perform the same tasks in separate racks.

Figure 10:
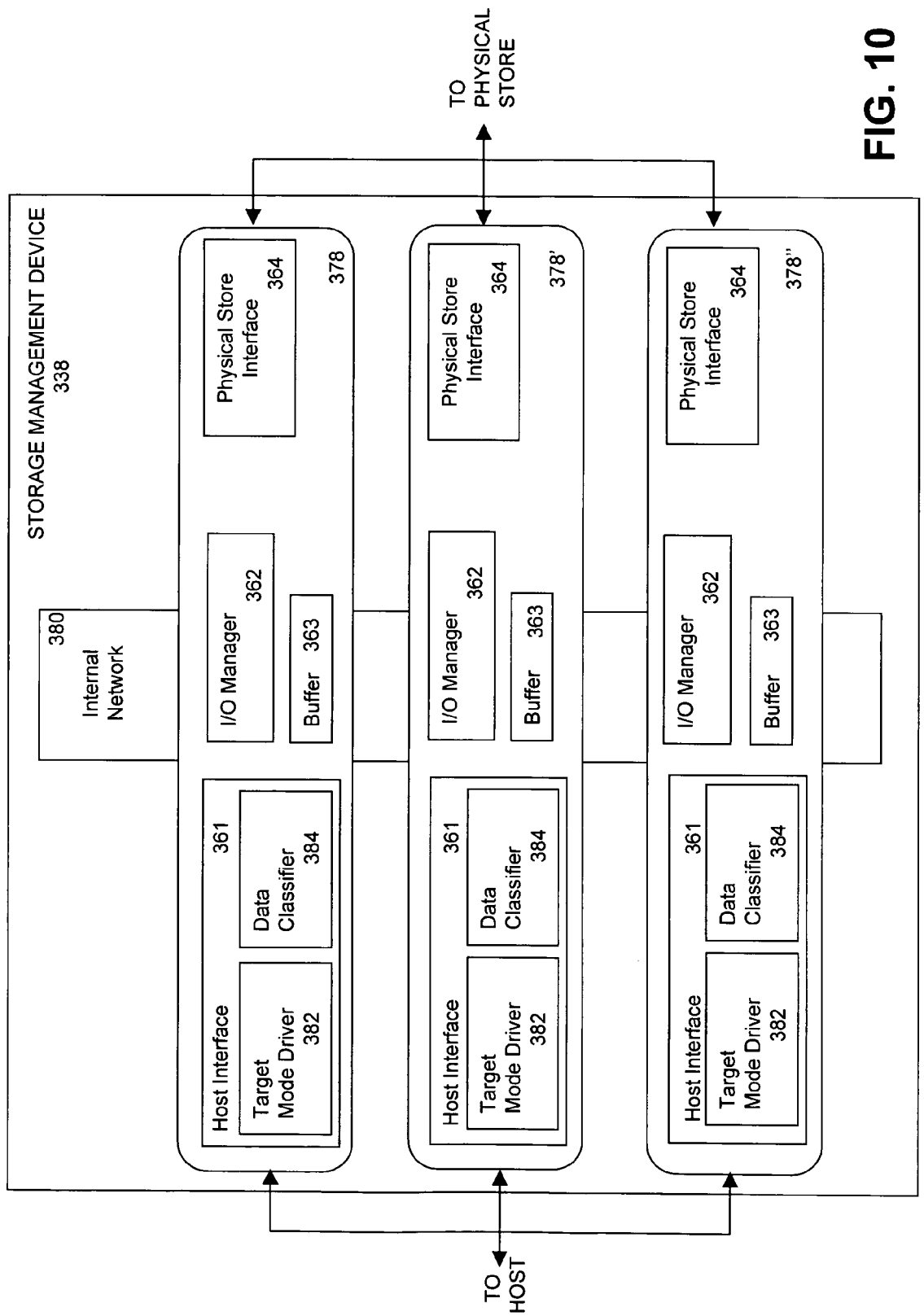
FIG. 10 is a block diagram depicting further details of a storage management device according to an embodiment of the invention.

Referring now to FIG. 10, in a functional depiction of the system elements, again, three processor modules 378, 378', 378", generally 378, are shown in a storage management device 338. The number of modules 378 is (again) merely illustrative, and the quantity of processor modules 378 can be increased or decreased for such considerations as scalability, performance, and cost. The functional elements shown on each processor module 378 can be implemented with hardware and/or software; in general, both are used to implement each of these elements.

In one embodiment, each processor module 378 of the storage management device 338 includes at least a host interface 361 for communicating with a host, an I/O manager 362, a storage buffer 363, and a physical store interface 364. In another embodiment, each processor module 378 includes fewer or more of these functional elements. In various embodiments, the storage management device 338 also includes an internal network 380 (e.g., an internal InfiniBand network, an internal Ethernet network, an internal Fiber Channel network, and/or an internal SCSI network) for enabling communication between the functional elements (e.g., the host interface 361, the I/O manager 362, the storage buffer 363, and the physical store interface 364) of a single processor module 378, for enabling communication between any of the functional elements of a first processor module 378 and any of the functional elements of a second processor module 378, for enabling communication between one or more components of the same functional element (e.g., for enabling communication between a target mode driver 382 and a data classifier 384 of the host interface 361), and for enabling communication between a component of one functional element and another functional element (or a component of that other functional element), whether on the same or on a different processor module 378.

In one embodiment, the host interface 361 includes the target mode driver 382, which includes the target interface 292 (see FIG. 9) and software for communicating with the target interface 292. Functionally, the target mode driver 382 communicates with the host 34 over any type of communication link 40 described above (e.g., a Fiber Channel network). As a result, the target mode driver 382 receives and responds to incoming I/O requests from the host 34.

In one embodiment, the target mode driver 382 receives I/O requests that include control information, such as, for example, write operations that also include a data payload, read operations, or, as described below, requests for a modification history for a location within a data store. In response to a read operation, for example, the target mode driver 382 can obtain from an I/O manager 362 the requested data and can thereafter communicate the requested data to the host 34. In response to a write operation, the target mode driver 382 initially stores the received write operation in a first storage buffer 363 that is located on the same processor module 378 as the target mode driver 382. In one embodiment, the target mode driver 382 then separates the write operation into its associated control information and data payload, such that both the control information and the separated data payload are initially stored in the first storage buffer 363. In one embodiment, the I/O requests are separated into the data payload and a control packet by the host interface 361. The control information may then be transmitted via the internal network 380 to other components within the storage management device 338. For example, in one embodiment, the target mode driver 382 transmits the control information to a data classifier 384. For its part, the data payload, or copies thereof, may also be transmitted via the internal network 380 to other components within the storage management device 338. Ultimately, the data payload will be communicated over the internal network 380 to the appropriate physical store interface 364, as directed by an I/O manager 362. Preferably, the data payload is communicated by hardware direct memory access, without need for software processing.

In one embodiment, prior to transmitting the control information to the data classifier 384 and prior to acknowledging the received I/O request to the host 34, the target mode driver 382 time stamps the control information. In other words, the target mode driver 382 associates with the control information a time at which the control information was received at the host interface 361. For example, where the target mode driver 382 transmits the control information to the data classifier 384 in a data packet, the target mode driver 382 may use a field within the data packet to indicate the time at which the control information was received at the host interface 361. Any other method of time stamping the control information may also be used.

In one embodiment, after the target mode driver 382 has separated the data payload of the write operation from the control information of the write operation, and apart from the target mode driver's transmission of the control information to a data classifier 384, the target mode driver 382 replicates the separated data payload to create at least one data payload copy. In one embodiment, the target mode driver 382 then evaluates a first cost equation, as described below, and, based on the results of the evaluated first cost equation, optimally identifies a second storage buffer 363 that is capable of at least temporarily storing a first data payload copy. In one embodiment, the first storage buffer 363 and the second storage buffer 363 are different storage buffers 363, in, for example, different processor modules 378. Optionally, the target mode driver 382 may then also evaluate a second and/or further cost equation(s), as described below, and, based on the results of the evaluated second and/or further cost equation(s), may optimally identify a third and/or further storage buffer(s) 363 that is/are capable of storing second and/or further data payload copies. The first, second, third, and any further storage buffers 363 may each be different storage buffers 363. The target mode driver 382 may then transmit the first data payload copy to the second storage buffer 363 and, optionally, may transmit the second and/or further data payload copies to the third and/or further storage buffers 363. Accordingly, the storage management device 338 may provide for the redundant storage of data, be it temporary or permanent.

In one embodiment, the host interface 361 also includes the data classifier 384. The data classifier 384 is in communication with the target mode driver 382 of the host interface 361, and is also in communication with the plurality of I/O managers 362. The data classifier 384 receives the control information of the I/O requests from the target mode driver 382, identifies the appropriate processor module 378 to respond, and forwards this control information to the I/O Manager 362 of the appropriate processor module 378.

In one embodiment, the data classifier 384 classifies the I/O requests received at the host interface 361, by the target mode driver 382, as a particular type of I/O request (e.g., as a write operation, as a read operation, or as a request for a modification history). In one embodiment, the data classifier 384 analyzes the control information of the received I/O request to classify the I/O request. The data classifier 384 also classifies the control information by comparing the incoming I/O requests with subscription requests generated, for example as described below, by the I/O managers 362. In one embodiment, the data classifier 384 determines a process group, storage device identifier (e.g., a logical unit), a unit of storage identifier, and a length for each I/O request. This information, along with the control information, the time stamp, and the I/O request type, is passed to the appropriate I/O manager 362. In order to allow for processing a large volume of I/O requests, the storage buffers 363 temporarily store these information packets from the data classifier 384 as they are transmitted to the respective I/O manager 362.

In greater detail, the plurality of I/O managers 362 of the storage management device 338 are responsible for managing a data store. In one embodiment, each one of the plurality of I/O managers 362 subscribes, via a subscription protocol (for example as described below), to at least one set of locations within the data store for which it will process control information that it receives from a data classifier 384. Accordingly, when the control information of an I/O request received at the host interface 361 includes an operation to be performed on a first location within the data store, the data classifier 384 can identify, based on the subscriptions of the plurality of I/O managers 362, a first one of the plurality of I/O managers 362 capable of processing the control information. Moreover, in one embodiment, the data classifier 384 may also identify, again based on the subscriptions of the plurality of I/O managers 362, a second one of the plurality of I/O managers 362 capable of processing the control information should the first one of the plurality of I/O managers 362 fail.

In one embodiment, after the data classifier 384 receives the control information from the target mode driver 382, the data classifier 384 replicates the control information to create a copy of the control information. In one such embodiment, the data classifier 384 transmits the control information to the first one of the plurality I/O managers 362 identified as described above, and instructs that first I/O manager 362 to process the control information. The data classifier 384 may also transmit the copy of the control information to the second one of the plurality of I/O managers 362 identified as described above, and may instruct that second I/O manager 362 to temporarily store the copy of the control information, rather than process the copy of the control information. The copy of the control information may be stored, for example, in the storage buffer 363 of the processor module 378 at which the second one of the plurality of I/O managers 362 is located. Accordingly, in one embodiment, the storage management device 338 saves a redundant copy of the control information so that it may be processed by a second I/O manager 362 in the event that the first I/O manager 362 fails.

In one embodiment, the control information of a first I/O request directs an I/O manager 362 to operate on a first location within a data store. In one such embodiment, the I/O manager 362 may also be directed by the control information of other I/O requests to operate on second locations within the data store that at least partially overlap the first location within the data store. In such a case, the I/O manager 362 first processes the control information having the earliest time stamp. Accordingly, in one approach, by time stamping the control information of the I/O requests, the target mode driver 382 effectively ensures that the I/O manager 362 processes the control information of any one particular I/O request for a first location within a data store before it processes the control information of other I/O requests having a later time stamp, when those other I/O requests are directed to locations within the data store that at least partially overlap the first location within the data store.

Once an I/O manager 362 receives the control information and is instructed by the data classifier 384 to process the control information, the I/O manager 362 orders and manages the I/O requests and forwards appropriate instructions to the physical store interface 364. In one embodiment, the I/O manager 362 processes control information, and monitors and indexes the flow of information within the storage management device 338. For example, the I/O manager 362 monitors and indexes the flow of information to and from the other processing modules, and the host interface 361 and the physical store 364. The I/O manager 362 also manages the I/O and insures that modified units of storage are saved and accessible for future reference in the creation of prior images. In addition, the I/O manager 362 tracks the performance (e.g., response time) of the storage management device 338 in responding to I/O requests from the host 34.

The I/O manager 362 may also implement various optimization routines in order to provide the host with an efficient response time to I/O requests. For example, because the storage management device can be employed in very large storage systems 30, including storage systems with terabytes of storage capacity, optimization of the copy-on-write command may be desirable. A copy-on-write command can require at least two sequential operations prior to writing the new data to a target storage address: (a) reading existing data from the target storage address and (b) writing the existing data to a new storage address. In one embodiment, the storage management device implements, either alone or in combination, certain optimizations. These optimizations generally fall into one of five categories: (i) aggregation; (ii) spanning; (iii) redundant write; (iv) reordering; and (iv) live storage. Each of these optimizations can allow for more efficient processing, particularly of the copy-on-write operations.

1. Aggregation. The first optimization is aggregation. The storage management device 338 may aggregate separate copy-on-write commands for sequential units of storage (e.g., units of storage in adjacent blocks) and perform the operations in a single copy-on-write command. This can be useful because the extra overhead associated with the multiple physical disk reads and writes of each block is eliminated when adjacent blocks are operated on as a group.

2. Spanning. The aggregation optimization can be extended further by combining separate copy-on-write commands directed to units of storage that are non-sequential but in close proximity to one another into a single copy-on-write command that spans, in addition to all the targeted units of storage, all the units of storage that are located in the span. For example, where five units of storage 100, 200, 300, 400, and 500 are located sequentially to one another in the order shown, copy-on-write commands directed to blocks 100, 300 and 500 can instead result in a single copy-on-write command directed to blocks 100-500 inclusive. Although extra data is read and operated on, a spanned block that included extra data can still be significantly faster than 3 separate disk operations.

3. Redundant Write. A redundant write optimization can be implemented by identifying a first unit of storage that is likely to be the target of a host write request. Data written to a first block may also written to a second block. An index can track the address of each unit of storage. Instead of implementing copy-on-write, then, the next write command to that block can result in one of the two blocks being overwritten. The unaffected block can then serve as the historical copy of that block.

4. Reordering. With the reordering optimization, incoming I/O requests may be reordered so as to maximize the benefits of one or more of the other optimization protocols such as the aggregation protocol, the spanning protocol, the redundant write protocol, and the like.

5. Live Storage. In some instances, significant efficiencies can be gained by storing data in memory rather than in physical storage. For example, if certain blocks have a high volume of I/O requests (e.g., they are updated frequently), many read/write operations can be saved by keeping the data in memory. In one embodiment, the memory is memory 296 (FIG. 9) located in the processor module 378.

A storage buffer 363 may store, at least temporarily, data payloads, data payload copies, control information, and copies of control information that are being processed within the storage management device 338. In one embodiment, the plurality of storage buffers 363 are in communication with one or more of the target mode drivers 382. In one such embodiment, data received by a target mode driver 382, and any copies of that data made by the target mode driver 382, is stored in one or more storage buffers 363 until it is communicated to a physical store 36 by the physical store interface 364 or to another processor module 378 via the internal network 380. A storage buffer 363 includes the memory 296 (see FIG. 9), which is allocated in such a way as to allow the various devices to communicate data without software processing of the data.

A physical store interface 364 communicates with the physical store 36 over any type of communication link 42 described above (e.g., a Fiber Channel network), and communicates with the plurality of I/O managers 362, one or more of the host interfaces 361, and the plurality of storage buffers 363 via the internal network 380. In response to read requests for example, the physical store interface 364 retrieves data stored on the physical store 36, which data is ultimately provided to the host interface 361 for communication to the host 34. For write requests, the physical store interface 364 forwards the data payload to target units of storage of the physical store 36.

After an I/O manager 362 has processed the control information of an I/O request that was initially received by the target mode driver 382 at the host interface 361, that I/O manager 362 may instruct a physical store interface 364 to communicate with one or more of the physical stores 36. In one embodiment, the I/O manager 362 instructs the physical store interface 364 to read data from a physical store 36. For example, the I/O manager 362 may have processed the control information of a write operation and the physical store interface 364 is therefore instructed to read data from the physical store 36 in order to perform a copy-on-write operation. Alternatively, the I/O manager 362 may have processed the control information of a read operation and the physical store interface 364 is therefore instructed to read data from a particular location within the physical store 36. Upon being instructed by the I/O manager 362 to read data from the physical store 36, the physical store interface 364 reads such data.

In another embodiment, the I/O manager 362 processes the control information of a write operation that included a data payload, but the data payload, previously separated from the control information by the target mode driver 382, will have been stored in a first storage buffer 363, as described above. In one such embodiment, in addition to instructing the physical store interface 364 to communicate with the physical store 36, the I/O manager 362 also instructs the physical store interface 364 to communicate with that first storage buffer 363. Accordingly, the physical store interface 364 retrieves the data payload from the first storage buffer 363 and writes the data payload to a location within the physical store 36, as instructed by the I/O manager 362.

Once the data payload is safely stored to a location within the physical store 36, the I/O manager 362 may delete, mark for deletion, or mark for replacement, the one or more data payload copy(ies) previously stored (redundantly) in the second and/or further storage buffer(s) 363. Similarly, once the control information has been processed by an I/O manager 362, the I/O manager 362 may delete, mark for deletion, or mark for replacement, the copy of the control information previously stored in a storage buffer 363 of a processor module 378 on which a second I/O manager 362 is located.

Referring now to FIG. 1, each processor module 378 (FIG. 10) is responsible for I/O requests made with reference to specific portions of a data store. Each I/O manager 362 is responsible for managing and fulfilling I/O requests for the portions of the data store to which its processing module is assigned. In one embodiment, each I/O manager 362 is assigned a set of blocks of the data store, for example, blocks 100-500 of data store A. Each processor module 378 can employ multiple I/O managers 362. Assignment of the I/O manager 362 to the portions of the data store to which it is responsible takes place by way of a subscription protocol. In one embodiment, the subscription protocol is implemented by having each one of the plurality of I/O managers 362 register, with each one of the data classifiers 384, the one or more portions of the data store for which it will perform data operations (e.g., read operations or write operations).

Each I/O manager 362 can be responsible for multiple current stores and multiple time stores, which are managed by the current store controller 472 and the functional storage module 474. In one embodiment, the storage management device 338 maintains a database that associates each I/O manager 362 with the contiguous set of blocks that are assigned to the respective I/O manager 362. The data classifiers 384 associated with an I/O manager 362 employ the database to ensure that each I/O manager only performs tasks associated with the blocks assigned to it. In one embodiment, this approach allows a subset of the total number of I/O managers 362 in the storage management device 338 to service a single time store while other I/O manager 362 subsets can service additional time stores. This approach is also scalable because increasing the quantity of I/O managers 362 will increase the quantity of time stores that the storage management device 338 can efficiently service. Also, the approach can be used with a single physical store 36 that comprises multiple time stores and multiple current stores. Because this approach uniquely identifies each data store, only a limited amount of additional information is required to associate each I/O manager 362 with specific unit(s) of storage. In one embodiment, the data store block number, the time store block number, and the time stamp are the only additional information that is required.

In one embodiment, the I/O manager 362 maintains a series of control information tables that each correspond to a specific window of time. For example, all I/O processed by an I/O manager 362 between 9:00 and 9:05 can be stored in a single table, while I/O that occurred between 9:05 and 9:10 is stored in another table. In a version of this embodiment, the tables are a fixed size. A fixed table size allows the processing time of each query to a table to be readily determined because all the tables are full except the table that is currently in use. Thus, the processing time is identical for all tables, but the current table. Although the table size is fixed, the time period covered by each table is variable as a result of the variable frequency of write commands and the variable size of the target units of storage associated with each command. For example, a table that is limited to 600,000 entries will fill in 9,000 units of time if, on average, the associated I/O manager 362 processes 200,000 write commands every 3000 units of time. However, the same size table will fill in 3000 units of time if the associated I/O manager 362 receives 200,000 write commands every 1000 units of time. In a version of this embodiment, the table comprises a data store block number, a time store block number, and a timestamp that indicates when the associated copy-on-write operation was performed.

When a table is filled, the I/O manager 362 does three things:

1) The I/O manager 362 creates a new table for new incoming write operations.

2) The I/O manager 362 creates an entry in a separate table (e.g., a master table) that describes and indexes these control information tables. The master table contains the table name and the time range that the table covers, i.e., from the creation time of the table to the time that the last entry was recorded in the table. In one embodiment, the master table is local to the I/O manager 362 with which it is associated.

3) The I/O manager 362 creates a bitmap representing all of the I/O in a given table. This bitmap has a bit for a given block range. The bitmap can be tuned to adjust the block ranges represented by each bit; therefore, in one embodiment, bit 0 represents blocks 0-15, bit 2 represents block 16-32, etc. The amount of data each bit represents is referred to as the region size.

The region size is also tunable. Thus, the chance for a false positive on a bit is reduced the closer the region size is to either the average I/O request size or the minimum I/O request size. In one embodiment, the minimum I/O request size is 1 sector or 512 bytes. In operation, if the region size is 128 kilobytes, the first bit would be set if the user wrote data to blocks 2-10. However, if the bitmap was later used to determine whether block 85 is referenced in the underlying data, the bitmap would provide a false positive indication.

As the region size is reduced the quantity of false positives is reduced, and may in fact be reduced to zero. More memory and disk space are required, however, to store the bit map when the region size is reduced. Conversely, as the region size is increased, there is an increase in the quantity of false positives that occur, however, the memory requirements of the bit map are reduced. In one embodiment, each I/O manager selects a region size that dynamically balances the rate of false positives and the size of the bitmap.

In one embodiment, the impact of the operations required by the I/O manager to close or "seal" a table when it reaches capacity and to move to a new table are minimized because the table transfer is performed asynchronously relative to the continuing I/O stream.

When a specific recovery time is requested for the generation of a time based data store (for example data store B), three general levels of operations must be performed by the I/O manager 362.

1) The I/O manager 362 first identifies the tables that are involved. If the user requests a recovery time of T−500, the I/O manager 362 scans the master table for the control information tables that include I/O operations that occurred between T−500 and the request time. The I/O manager then retrieves the bitmaps for each of the control information tables that include the qualifying I/O operations.

2) The I/O manager 362 then creates a master bitmap by OR'ing together all of the bitmaps that were retrieved and saves the individual bitmaps and the master bitmap. Once the OR operation is complete, the master bitmap can be used to evaluate a substantial percentage of potential read requests to determine whether the requested blocks were involved in prior write operation (i.e., between T−500 and the request time). If a block was not involved in a write operation at that time, data from the current store will be used for the block. Retrieval and presentation of data from the current store is a substantially real time operation. If the region bit is set in the master bitmap, the I/O manager 362 begins scanning the individual bitmaps from the oldest to the newest to determine which bit is set for the region and then scans the bitmap's underlying table for the location of the I/O operation in the time store. These operations are slower than the retrieval of data from the current store, but they continue to proceed through the system.

3) The I/O manager 362 begin creating region maps whereby copies of the blocks described in each individual control information table are stored in memory. When this operation is complete, the time delay for a read request that must go to the time store for data is reduced because the request is redirected to the memory and rarely (if ever) requires any extra table scanning.

The response time of the storage management device 38 is reduced by the preceding approach because the I/O manager 362 begins servicing requests when the first step is complete. In most applications, the current store will provide the majority of the data required for the generation of a time store because, most often, the time store will be generated at a relatively recent point in time, for example, 1 minute, 1 hour, 1 day. The amount of data typically changed in those time segments is small when compared to the entire data store. Each master table can contain 500,000 to 5,000,000 records, yet each master table can be searched in a fixed time. Thus, a master table of only a few thousand entries can be used in an application that supports a physical store 36 of 2 terabytes.

Figure 11:
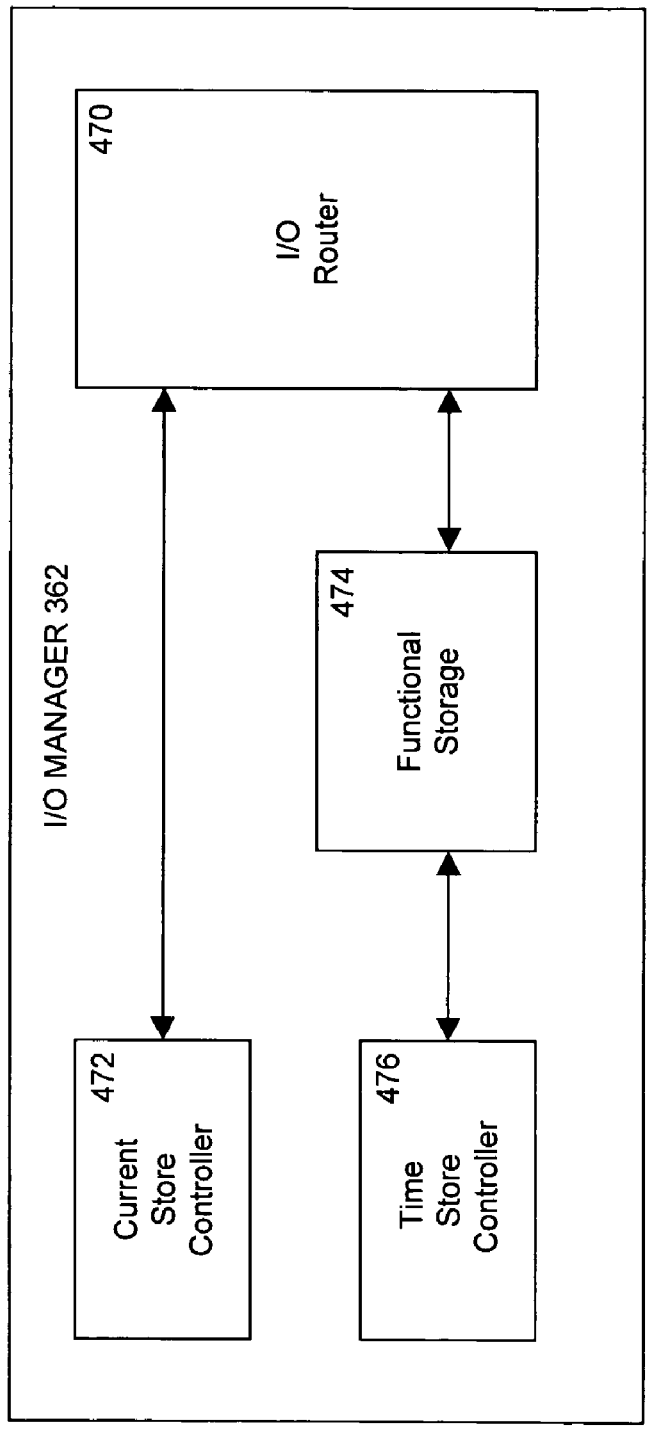
FIG. 11 is a block diagram of an I/O manager according to an embodiment of the invention.
Figure 12:
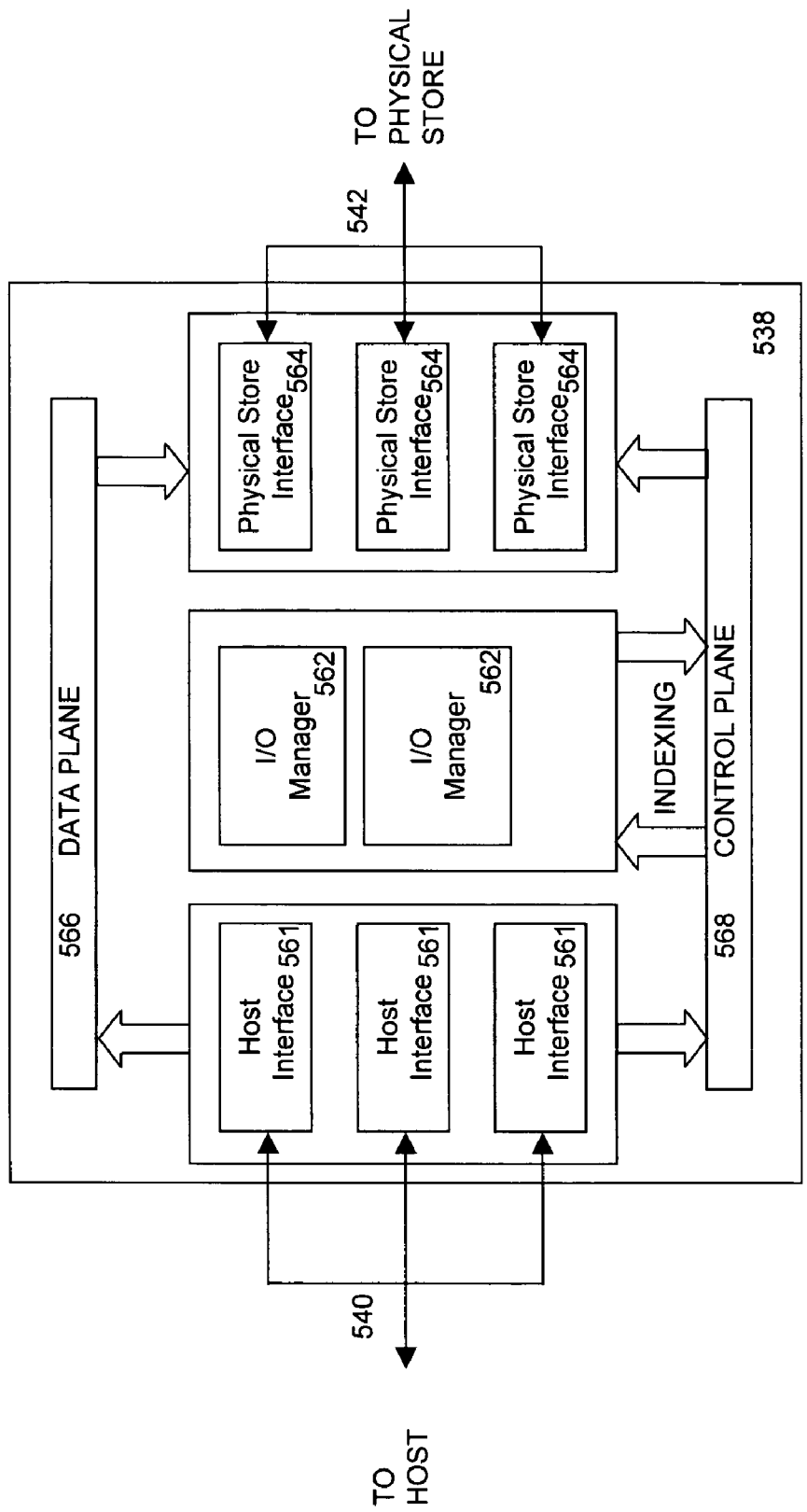
FIG. 12 is a block diagram of a storage management device according to an embodiment of the invention.

Referring to FIG. 11, the current store controller 472 processes requests directed to the device/unit of storage combinations to which the current store controller 472 is subscribed. Each current store controller 472 receives the resulting control information transmitted from a host interface 361 (FIG. 10) to the I/O manager 462 over a control plane 568 (FIG. 12). The current store controller 472 creates work orders based on this control information to insure that the data associated with the control request is written to a logical unit and that the old data that presently appears at the target location is copied and saved elsewhere by the storage management device 538.

Similarly, the time store controller 476 processes requests directed to the device/unit of storage combinations to which the time store controller 476 is subscribed. Each subscription is registered with the data classifier 384 of the processor modules 378.

The I/O manager 362 also includes an I/O router 470. The I/O router 470 is the software module responsible for moving the data, as directed by the current store controller 372 and the time store controller 376.

Although one of each of the I/O router 470, a current store controller 472, functional storage 474, and a time store controller 476 is shown, the I/O manager 362 can include one or more of each of these. Moreover, these elements can communicate in other configurations than the configuration shown in FIG. 11. For example, in one embodiment, the I/O manager 462 includes a plurality of time store controllers 476.

Referring now to FIG. 12, in another embodiment and a more abstract representation, the storage management device 538 includes a data plane 566 and a control plane 568 used for communication of the multiple modules between each other. The storage management device 538 includes multiple host interfaces 561, I/O managers 562 and physical store interfaces 564. Although these components are, as shown in earlier figures, each located on a particular processor module, they can be viewed together as collections of these components working together to share the load, both for efficiency and fault tolerance.

The host interfaces 561 and physical store interfaces 564 communicate data to each other on a data plane 566, which as described above is implemented with direct memory access and the internal network 380 (FIG. 10). Control information (e.g., control packets, meta-data packets) is communicated on the control plane 568 between the host interfaces 561 and the I/O managers 562, and between the I/O managers 562 and the physical store interfaces 564. The control plane 568 is implemented with inter-processor communication mechanisms, and use of the internal network 380 (FIG. 10). The data payload is communicated between the host interface 561 and the physical store interface 564 over the data plane 566.

The optimization operations described above are accomplished, in part, because of a queue system employed by the storage management device 338. The queue system organizes the control information (e.g., control packets, meta data packets) that are processed by the I/O managers 362. The control information is first subject to an incoming queue in which the I/O manager 362 queues the control information in the order that it is received.

In one embodiment, control packets are joined, reordered, and/or strategically delayed in order to process the packets more efficiently. Referring again to FIG. 10, the I/O manager 362 identifies and tracks idempotent groups of control packets, that is, groups of control packets that are independent of one another. Generally, the idempotent groups are the groups that can be processed more efficiently than other packet groups, e.g., idempotent groups are processed more quickly.

If for example, at time T0 a first control packet directed to blocks 0-15 arrives, and at time T5, a second control packet directed to blocks 8-31 arrives, the I/O manager 362 includes all the operations from T0 to T4 in one idempotent group, and begins another group at time T5 (provided that no other control packets overlap between T0 and T5). In this example, the processing, grouping, and execution order are selected to prevent the T5 operation from occurring prior to the T0 operation. If for example, the T5 operation were performed first, the T0 operation would include part of T5's payload in its before image (i.e., blocks 8-15). Further, the T5 operation would be missing the data from the T0 operation in it's before image although the data existed at time T1.

The storage management device 338 creates many opportunities for generating customized control packet groups that improve processing efficiency because, for example, operations can be split into "worker groups", where each worker group can operate in a threaded, independent by simultaneous fashion. A determination that certain blocks are not idempotent as described above, forces the I/O manager 362 to ensure that all the blocks referencing 0-32 occur in the same worker group as the T0 and T5 operations, but operations involving other very large groups of blocks can still reordered. Therefore, the I/O managers 362 are constantly identifying, analyzing, and managing idempotent relationships on multiple queues using advanced queuing theory.

The system allows the user to create a new dynamic or static data store B, which is a representation of the main data store A but at a previous point in time, for example, T−500. The target mode driver 382 creates target device representations on the first communication link 40, which allows the host 34 to issue commands to the new data store B. The I/O manager 362 uses functional storage 474 to create a map of all blocks which can not be satisfied for the data store B via current store A, i.e., the blocks have been overwritten in current store A since the recovery time T−500. The map continues to be updated as a result of the continuing stream of I/O which is directed to the main data store A. For example, each time the user modifies a block of data store A, the targeted block in current store A no longer contains the same data as it did before time T−500. The map incorporates the location where the newly targeted block gets copied to in time store A. As a result, I/O requests directed to data store B locate the correct block contents. Additionally, this entire process must be synchronized to ensure that updates to the current store A, time store A are accurately reflected in data store B's map in order to prevent I/O requests to data store B from identifying the wrong block as the source of data. For example, when a new block is written to data store A, the map is updated with the location in the time store of the prior contents of data store A. The storage management device 538 employs methods to ensure that later in time I/O requests directed to data store B locate the correct data.

Modification History Request

In general, in another aspect, the invention relates to systems, methods, and articles of manufacture for providing a modification history for a location within a data store. In brief overview, in one embodiment of this aspect of the invention, a first computing device (e.g., a host as described above) specifies to a second computing device (e.g., a storage management device as described above) a location within a data store (e.g., an address range within a data store) that the second computing device manages. The first computing device then also requests from the second computing device a list of times at which at least a portion of the data stored at the specified location was modified. This could be a request for a modification history for the location within the data store. The second computing device then responds, in one embodiment, with a list of times at which some portion of the data stored at the location was modified and, optionally, identifies which portions of the location were modified at those times. Generally speaking, if some portion of the data stored at the location has been modified, it will have been modified as a result of a write operation directed to that portion of the data store.

In one embodiment, the request for a modification history for a location within the data store is received at the second computing device in-band, that is, from the first computing device and through the same communication protocol that the first computing device uses when it communicates data commands (e.g., read operations and write operations). In another embodiment, the request is received at the second computing device out-of-band. For example, the request is received via a different communication protocol than that used by the first computing device when it communicates data commands, is received via a different channel (e.g., via a user interface, such as a graphical user interface, or a command line on a console of a computing device that is different from the first computing device, such as, for example, the second computing device or another computing device such as an administrator's computing device or a computing device located at a third party control center), or is received via some combination thereof.

This aspect of the invention can be useful, for example, if a user (e.g., a system administrator) becomes aware of a problem with data stored in a data storage device. The problem could be, for example, data corrupted as a result of improper operation of software or hardware, or, as another example, data overwritten by an application as a result of an administrator error. Upon determining the relevant location(s) of the problem, the administrator can query the device to determine when the location(s) were last modified. With that information, the administrator can then request that the data storage device present a prior image of the data store at a time prior to each of the times indicated. In this way, the user is likely to identify the most recent available prior image in which the corrupted data was intact.

Some applications and operating systems, for example, upon detecting certain errors in a data store, provide information about the specific data store locations at which the error was detected in order to facilitate debugging. When such location information is provided directly by the application, the query described above can be made using that location information. Some applications and operating systems, as another example, report errors associated with a particular file. Typically, operating system and/or file system tools can be used to determine the data store locations allocated to those files by the operating system and/or file system. If the data store presented to an application (or operating system, device, etc.) is virtualized, it may be that the data store locations provided by the application (or operating system, device, etc.) need to be converted (e.g., de-virtualized) to identify the respective relevant locations in the data store as presented by the data storage device.

In one exemplary embodiment, a user of a data store is notified of a problem encountered by an application, such as a database application. The user determines, either directly from the application, or indirectly using information provided by the application or operating system, the location(s) of the problem. The user may, for example, make this determination by using a software-based tool to analyze application specific or operating system maintained error logs to facilitate the de-virtualization of I/O errors. The user then directs an inquiry to the storage device to determine the times at which the location(s) were last modified. This inquiry can be performed, for example, using the application, using a software-based tool otherwise provided on the user's computer, or directly to the storage device using a control panel, console, or other means. The user (via the tool, etc.) receives the modification history. The user then requests that the storage device present one or more prior images (e.g., one at a time, or all at once) at a respective time prior to the reported modification times. The user can then check each prior image to identify the most recent available prior image in which the problem is absent. The user can then, for example, copy data from the prior image to the data store, begin using the prior image, or take some other course of action.

Figure 13:
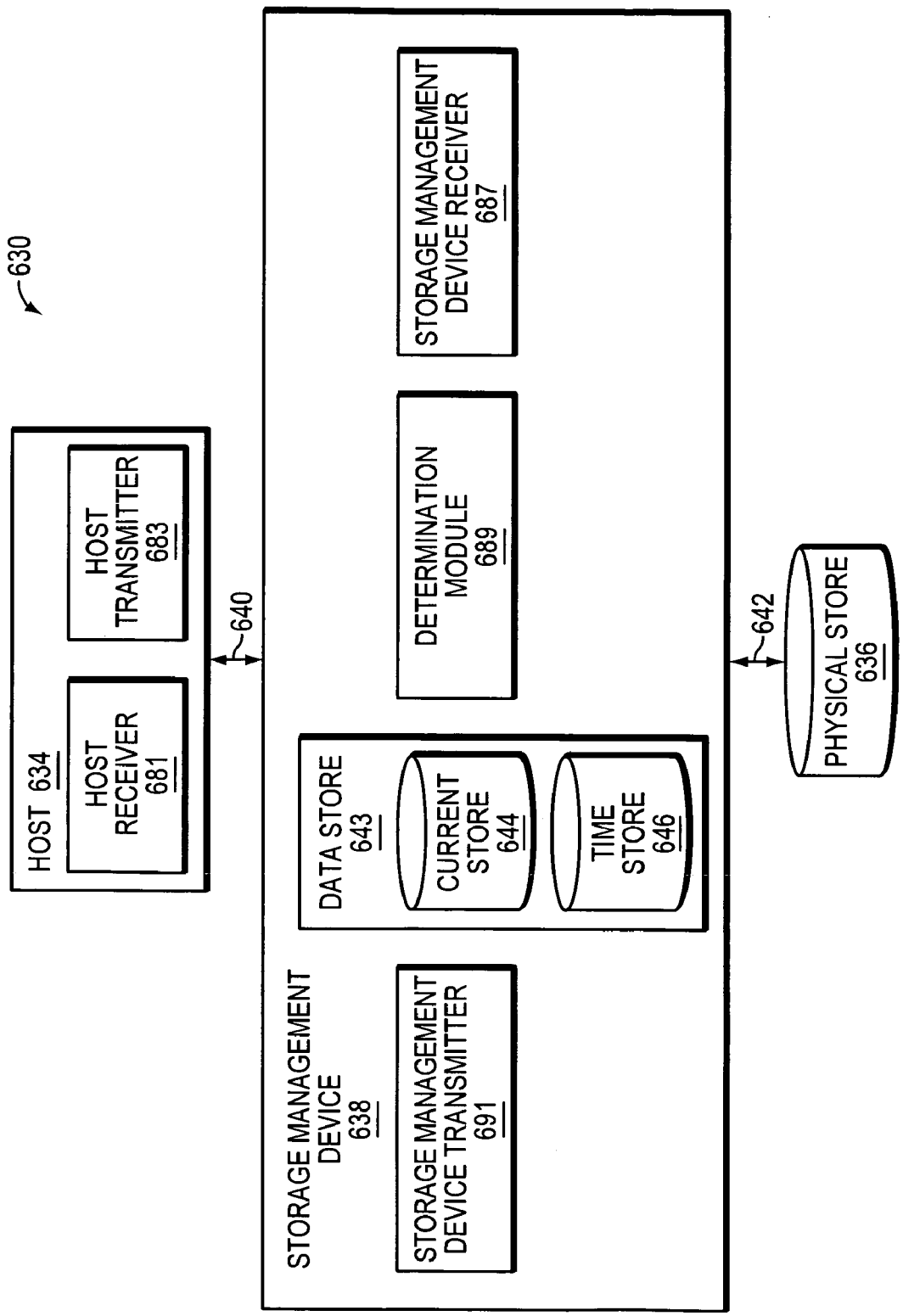
FIG. 13 is a block diagram of a storage system according to an embodiment of the invention.

FIG. 13 illustrates one embodiment of a storage system 630 that can provide a modification history according to this aspect of the invention. The storage system 630 includes a host 634, a storage management device 638, and a physical store 636. The host 634 and the storage management device 638 communicate with one another over a first communication link 640. The storage management device 638 and the physical store 636 communicate with one another over a second communication link 642. Generally speaking, the host 634, the storage management device 638, the physical store 636, and the first and second communication links 640, 642 may have the capabilities of, and may be implemented as, the hosts, storage management devices, physical stores, and first and second communication links, respectively, described above, with the additional functionality described here. It will be understood that other implementations are also possible.

In one embodiment, the host 634 includes at least a host receiver 681 and a host transmitter 683. The host receiver 681 and the host transmitter 683 can each be implemented in any form, way, or manner that is useful for receiving and transmitting, respectively, communications, such as, for example, requests, commands, and responses. In one embodiment, the host receiver 681 and the host transmitter 683 are implemented as software modules with hardware interfaces, where the software modules are capable of interpreting communications, or the necessary portions thereof. In another embodiment, the host receiver 681 and the host transmitter 683 are implemented as a single host transceiver (not shown). The host 634 uses the host receiver 681 and the host transmitter 683 to communicate over the first communication link 640 with the storage management device 638.

In one embodiment, the storage management device 638 includes at least a storage management device receiver 687, a determination module 689, and a storage management device transmitter 691. Again, the storage management device receiver 687 and the storage management device transmitter 691 can each be implemented in any form, way, or manner that is useful for receiving and transmitting, respectively, communications, such as, for example, requests, commands, and responses. For example, like the host receiver 681 and the host transmitter 683, the storage management device receiver 687 and the storage management device transmitter 691 also may be implemented as software modules with hardware interfaces, where the software modules are capable of interpreting communications, or the necessary portions thereof. In one embodiment, the storage management device receiver 687 and the storage management device transmitter 691 are implemented as a single storage management device transceiver (not shown). The storage management device 638 uses the storage management device receiver 687 and the storage management device transmitter 691 to communicate over the first communication link 640 with the host 634 and/or to communicate over the second communication link 642 with the physical store 636.

For its part, the determination module 689 may be implemented in any form, way, or manner that is capable of achieving the functionality described below. For example, the determination module 689 may be implemented as a software module and/or program, and/or as a hardware device, such as, for example, an application specific integrated circuit (ASIC) or a field programmable gate array (FPGA). In one embodiment, the determination module 689 is implemented as part of an I/O Manager 362 (see FIG. 10) described above.

In one embodiment, the storage management device 638 also includes at least one data store 643 that has an associated current store 644 and a time store 646. For example, the data associated with one or both of the current store 644 and the time store 646 may be stored in the memory of the storage management device 638. The data associated with one or both of the current store 644 and the time store 646 also can be stored in the physical store 636, which for its part can be either directly stored, or virtualized, etc. The storage management device 638 keeps track of the data in the current store 644 and in the time store 646. For example, the storage management device 638 reads and writes data to and from memory and/or the physical store 636, and uses indexes and pointers to the data to maintain the time store 646. Again, the data store 643, its current store 644, and its time store 646 may have the capabilities of, and may be implemented as, the data stores, current stores, and time stores, respectively, described above, with the additional functionality described here. In yet another embodiment, as described above, the storage management device 638 includes more than one data store, such as, for example, two, three, or any number of data stores.

As previously described, when the storage management device 638 receives from the host 634 a write operation directed to the data store 643, the storage management device 638 maintains a record of the write operation. In one embodiment, the storage management device 638 employs a copy-on-write procedure and updates a historical index. For example, after receiving, but prior to executing, the write operation, the storage management device 638 copies any old data from the data store 643 that is to be overwritten by new data contained in the write operation. The storage management device 638 saves the "old" data to a new destination within the data store 643 and updates the historical index. In one embodiment, for example, for every occurrence of a write operation, the storage management device 638 records a timestamp that indicates the time at which the old data was overwritten, records the address range within the data store 643 at which the old data was overwritten, and records the new address range within the data store 643 at which the old data is now stored. Accordingly, the storage management device 638 maintains an index that may be consulted, as described below, in responding to a request for a modification history for a location within the data store 643.

Although described with reference to the copy-on-write operation, it should be understood that the principles just described would be applicable to any data storage system in which a log or index of changes are recorded. For example, if the actual writes to the data store are recorded, instead of or in combination with logging data that was previously written prior to overwriting, the system still could provide information about when storage locations were modified as described above, and this information could be determined from the log or index of changes. Also, it should be understood that in some circumstances, some, rather than all, changes to the data store may be recorded, and the data store can in such circumstances, provide only the modification information that it has available.

Figure 14A:
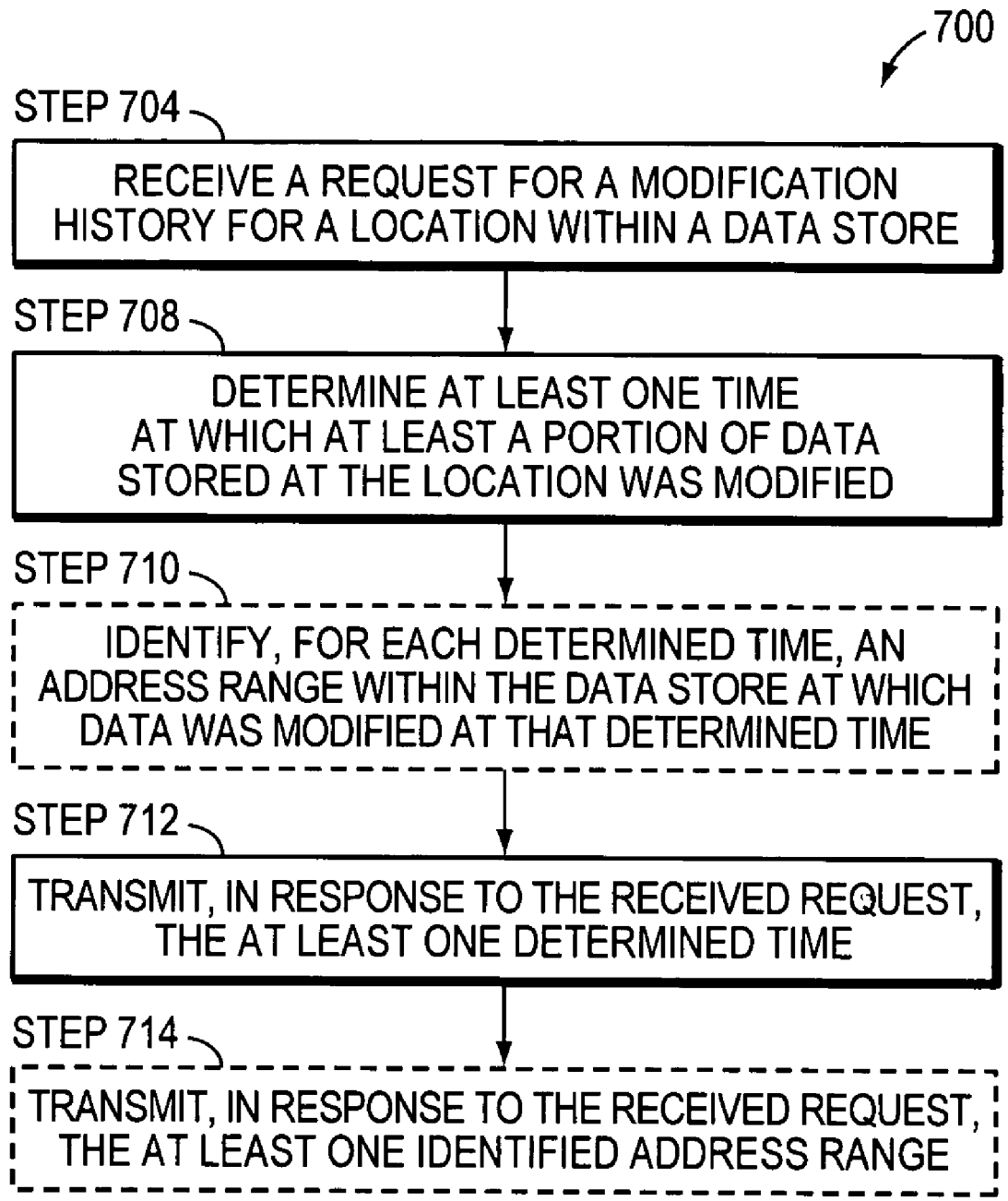
FIG. 14A is a flow diagram of an illustrative embodiment of a method for providing a modification history for a location within a data store in accordance with the invention.

Referring now to FIG. 14A, in brief summary of one embodiment of a method 700 for providing a modification history for a location within a data store, for example using the exemplary storage system 630 of FIG. 13, the storage management device 638 receives, at step 704, a request for a modification history for a location within the data store 643. The storage management device 638 then determines, at step 708, at least one time at which at least a portion of data stored at the location specified in the received request was modified. Then, at step 712, the storage management device 638 transmits, in response to the received request, the at least one time determined at step 708. Optionally, the storage management device 638 also identifies, at step 710, for each time determined at step 708, the address range within the data store 643 at which data was modified at that determined time. At step 714, the storage management device 638 may, optionally, also transmit, in response to the received request, the address ranges identified at step 710.

In greater detail, at step 704, the host 634 transmits, via its transmitter 683 and over the first communication link 640, a request for a modification history for a location within the data store 643. The request can be communicated in any form or manner that is useful for making the request. In one embodiment, for example, the request is communicated in the form of a data packet. The request is received at the receiver 687 of the storage management device 638. In one embodiment, the location specified in the request is an address range within the data store 643. The address range may be designated, for example, by an LBA and a length. In one embodiment, the LBA specifies the beginning of the address range, and the length specifies the length of the address range. For example, in one embodiment, the storage address space of the data store 643 is divided up into blocks (e.g., sectors), where each block is 512 bytes long. In such a case, the LBA is used to designate a specific 512-byte block (i.e., the 512-byte block at the beginning of the address range) and the length is used to designate how many 512-byte blocks are included within the address range. For instance, where the host 634 requests a modification history for an address range in the data store 643 that starts at byte 8192 and that is 4096 bytes long, the request would include an LBA of 16 and a length of 8.

After the storage management device 638 receives the request for the modification history for the location within the data store 643, the determination module 689 of the storage management device 638 determines, at step 708, one or more times at which at least a portion of the data stored at the location was modified. In one embodiment, for example, the determination module 689 parses the aforedescribed historical index listing the modifications made to (e.g., the write operations performed on) the data store 643. The index may be stored, for example, as part of the time store 646 of the data store 643. The determination module 689 then determines which of those listed modifications were made to the data at an address range at least partially overlapping the requested location's address range and notes the time(s) such modifications were made. It could be the case, however, that no modifications were made to the data at the requested location's address range. In such a case, the storage management device 638 would transmit at step 712 (described below) a negative response (i.e., a response indicating that there are no times at which the data at the requested location's address range was modified).

In general, prior to receiving the request for the modification history, one or more subsets, intersecting sets, supersets, and/or the whole set of the data stored at the location within the data store 643 may have been modified at one or more times. For example, the request received by the storage management device 638 might be for a modification history of a location having an address range (LBA 0, length 64). Prior to receiving this request, data stored at the address range (LBA 0, length 8) (i.e., a subset of the location), data stored at the address range (LBA 62, length 16) (i.e., an intersecting set of the location), data stored at the address range (LBA 0, length 128) (i.e., a superset of the location), and/or data stored at the address range (LBA 0, length 64) (i.e., the whole set of the location) may have been modified at one or more times. In one embodiment, after having determined, at step 708, the times at which these sets (and/or any other sets that at least partially overlap the requested location's address range) were modified, the determination module 689 of the storage management device 638 also identifies, at step 710, the address ranges of these previously modified sets.

At step 712, the storage management device 638 transmits, for example in the embodiment of FIG. 13, via its transmitter 691 and over the first communication link 640, the one or more determined times at which at least a portion of the data stored at the location was modified. Optionally, at step 714, the storage management device 638 may additionally transmit, via its transmitter 691 and over the first communication link 640, the one or more identified sets of address ranges that were modified at the one or more determined times. The one or more determined times and/or the one or more identified sets of address ranges can be communicated in any form or manner that is useful for providing such information. For example, the information is communicated in the form of a data packet. In one embodiment, the host 634 receives, at its receiver 681, these one or more determined times and/or one or more identified sets of address ranges. Also, optionally, the transmitter can transmit the data that was modified.

In one embodiment, the storage management device 638 transmits the modification information in a single packet. For example, the single transmitted packet identifies each of the sets of address ranges that was modified and, for each of the sets, lists the times at which it was modified. In another embodiment, the storage management device 638 transmits the determined times and the identified sets of address ranges separately, for example in separate packets, and further provides the host 634 with additional information to relate the determined times to the identified sets of address ranges. In still another embodiment, the storage management device 638 also transmits to the host 634 the data that was stored at the identified sets of address ranges prior to being modified at the determined times. In doing so, the storage management device may identify which determined time and/or set of address ranges corresponds to a given piece of subsequently modified data.

Figure 14B:
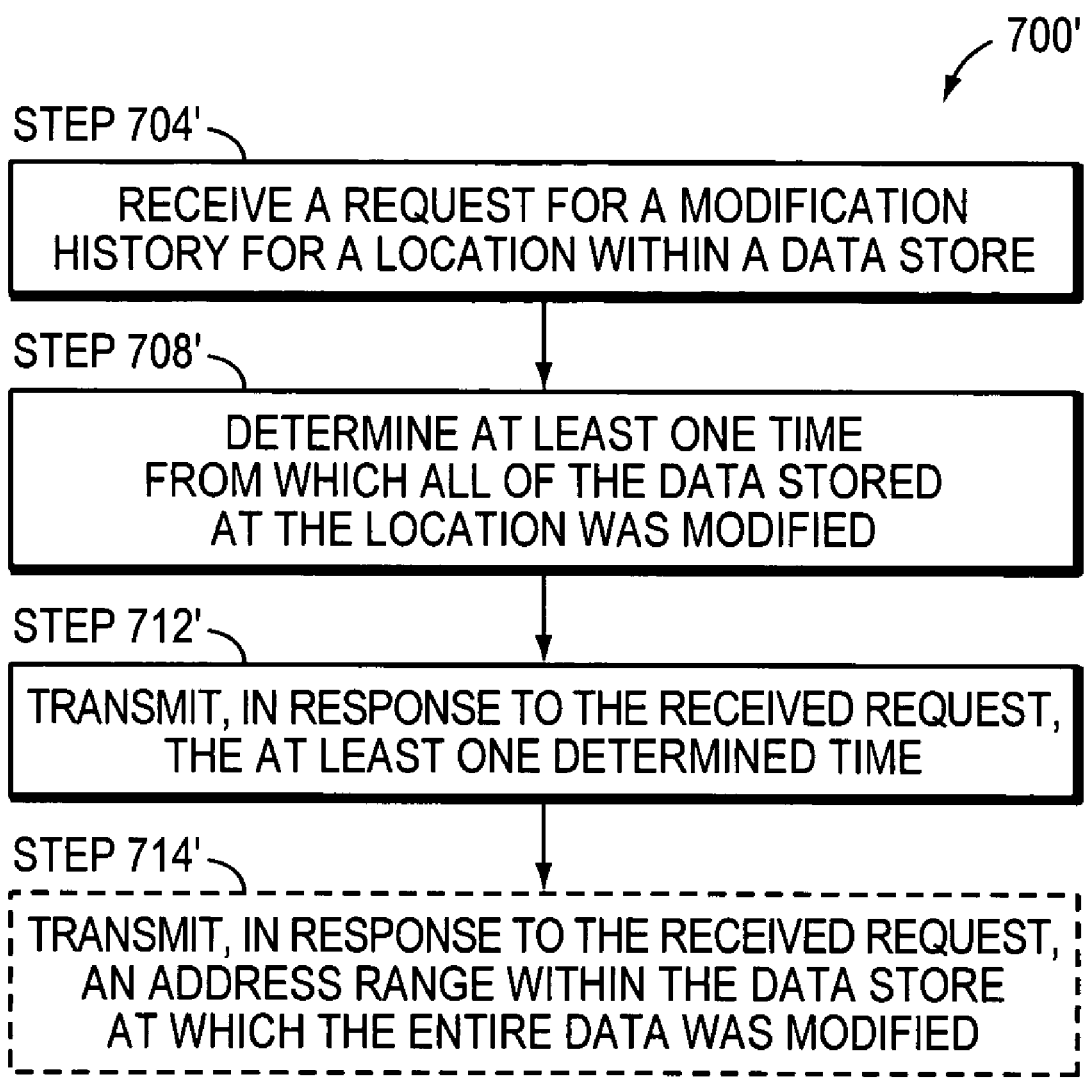
FIG. 14B is a flow diagram of another illustrative embodiment of a method for providing a modification history for a location within a data store in accordance with the invention.

FIG. 14B depicts one embodiment of a method 700', which is a variation on the method 700 of FIG. 14A, for providing a modification history for a location within a data store, again using the exemplary storage system 630 of FIG. 13. Generally speaking, except as set forth herein, the steps of the method 700' are performed in the same or a similar manner to the steps of the method 700 described above.

In one embodiment, like the method 700, the storage management device 638 receives, at step 704', a request for a modification history for a location within the data store 643. In this embodiment, however, the request for the modification history is a request for a list of every time from which the entire data, and not simply some portion of the data, stored at the location specified in the request was modified. Accordingly, the storage management device 638 determines, at step 708', at least one time from which all of the data stored at the location was modified, and transmits in response to the received request, at step 712', the at least on determined time.

Optionally, at step 714', the storage management device 638 also transmits, in response to the received request, an address range within the data store 643 at which, beginning from the at least one determined time, the entire data was modified. If transmitted, this address range would be the same as the location specified in the request for the modification history.

In the embodiment of the method 700' described above, the data stored at the location specified in the request for the modification history may all have been modified, but need not necessarily all have been modified, at the same time in order for the conditions of the request to be satisfied. Put another way, at least one portion of the data stored at the location specified in the request for the modification history may have been modified at a different time from (i.e., at a time subsequent to) the at least one time determined by the storage management device 638 at step 708' of the method 700'. If, for example, the entire data stored at the location specified in the request for the modification history is modified at a first time T1, a first portion of the data, but not the entire data, stored at the location is modified at a second time T2, a second portion of the data, but not the entire data, stored at the location is modified at a third time T3 (where the first portion and the second portion of the data amount to all of the data stored at the location specified in the request for the modification history), and the entire data stored at the location is again modified at a fourth time T4 (where T1, T2, T3, and T4 occur chronologically in time), the times from which the storage management device 638 will determine, at step 708', all of the data stored at the location to have been modified are T1, T2, and T4.

Being able to request, as just described for the method 700', a list of every time from which the entire data, and not simply some portion of the data, stored at a particular location was modified is particularly useful where a user knows that the entire data stored at the location is corrupt and needs to be replaced (e.g., where the user knows than an entire JPEG file is corrupt). Armed with the times determined by the storage management device 638 at step 708, the user can then request that the storage management device 638 produce an image of the location at times just prior just prior to the determined times. The user is thereby able to identify the most recent time at which the entire data was intact (i.e., not corrupt) and can choose to restore the data at the location to the data that was present in the location at that most recent time.

FIG. 15 depicts an illustrative embodiment of a request 800 for a modification history for a location within a data store (e.g., the data store 643) that can be transmitted by a host (e.g., the host 634) to a storage management device (e.g., the storage management device 638) in accordance with the invention. In one embodiment, as illustrated, the request 800 is in the form of a data packet 804. The data packet 804 may include at least a portion of an I/O command, which may be in a standard I/O command format, such as a SCSI command format.

In one embodiment, the data packet 804 includes 16 bytes of request data. In byte 0, an operation code identifies the type of request (e.g., providing a modification history for a location within the data store 643) that is to be executed. For example, the operation code may be associated with a request for at least one time at which at least a portion of data stored at a location within the data store 643 was modified or with a request for a list of every time from which the entire data, and not simply some portion of the data, stored at a location within the data store 643 was modified. An exemplary operation code is C1h, which is a code allocated to a vendor-specific request in the SCSI protocol.

The three most-significant bits (i.e., bits 5-7) of byte 1 are reserved for future use. Optionally, the remaining 5 least-significant bits (i.e., bits 0-4) of byte 1 provide for a service action field (e.g., a field containing a coded value that identifies a function to be performed under the more general request specified in the operation code of byte 0). Alternatively, in another embodiment, bits 0-4 of byte 1 are also reserved for future use.

Bytes 2-9 are for the LBA, which identifies the first unit of storage (i.e., the first block) of the location for which the modification history is requested. Bytes 10-13 are for the length, which indicates the number of the units of storage, including the first unit of storage identified by the LBA, that sequentially form the location within the data store 643. In one embodiment, the LBA and the length form an address range.

Byte 14 is reserved for future use. For example, byte 14 could be used as a Relative Check field for indicating whether the one or more times which will be returned by the storage management device 638 are to be relative or absolute. If, for example, the Relative Check field is 0, the one or more times returned by the storage management device 638 are to be relative to the present time. In other words, a 0 in the Relative Check field indicates that the one or more times to be returned by the storage management device 638 are to be past times measured from the current time. On the other hand, if, for example, the Relative Check field is non-zero, the one or more times returned by the storage management device 638 are to be specified absolutely, i.e., without reference to another time.

Byte 15 is the control field of the data packet 804. For example, in one particular embodiment where the data packet 804 is implemented in a typical SCSI command format, bit 0 of byte 15 may be used (e.g., may be set) to specify a request for continuation of the task across two or more commands (i.e., to link successive commands), bit 1 of byte 15 can provide a way to request interrupts between linked commands, bit 2 of byte 15 may be used to specify whether, under certain conditions, an auto condition allegiance shall be established, bits 3-5 of byte 15 cab be reserved, and bits 6-7 can be vendor-specific bits.

FIG. 16 depicts an illustrative embodiment of a response 900, specifically, a response 900 to a request 800 for a modification history for a location within the data store 643, that can be transmitted by the storage management device 638 to the host 634 in accordance with the invention. In one embodiment, as illustrated, the response 900 is in the form of a data packet 904. The data packet 904 may include at least a portion of an I/O response, which may be in a standard I/O response format, such as a SCSI response format.

In one embodiment, as illustrated, the data packet 904 includes at least 30 bytes of response code, and may include, as described below, additional bytes of response code. FIG. 16 identifies each bit that may be included in the exemplary bytes of response code. Bytes 0-1 are reserved for future use.

Bytes 10-13 are for an LBA that identifies a first unit of storage (i.e., a first block) in a set that includes at least a portion of the location specified in the request 800. In other words, the LBA represented in bytes 10-13 identifies the first unit of storage of, for example, a subset of the location specified in the request 800, an intersecting set of the location specified in the request 800, a superset of the location specified in the request 800, or the whole set of the location specified in the request 800. Bytes 14-21 are for a length that indicates the number of units of storage, including the first unit of storage identified by the LBA in bytes 10-13, that sequentially form the set. In one embodiment, the LBA and the length form an address range for the set. As indicated by this information, data stored at the identified address range of the set was modified prior to the point in time at which the storage management device 638 received the request 800. As such, bytes 22-29 are for a determined time of change, which indicates the time at which the data stored at the address range of the set identified in bytes 10-21 was modified.

Together, bytes 10-29 (i.e., the LBA, the length, and the determined time of change) constitute a tuple. The data packet 904 may include any number of tuples (e.g., one, two, or more tuples). Bytes 30-n of the data packet 904 are for the repeat of tuples. In one embodiment, the number of tuples included within the data packet 904 is, or is responsive to, the number of times at least a portion of data stored at the location specified in the request 800 was modified according to the information available to the storage device. Bytes 2-9 are for the indicator, which represents the number of tuples included within the data packet 904.

In one embodiment, the determined time of change represented in bytes 22-29 is a relative time. Alternatively, in another embodiment, the determined time of change is an absolute time. In one embodiment, each tuple could, for example, include an additional byte that is used as a Relative Check field for indicating whether the determined time of change contained within that tuple is relative or absolute. Alternatively, in another embodiment, all of the determined times of change included within the n tuples of the data packet 904 are either all relative or all absolute; there is no variance from one tuple to the next. In one such embodiment, by way of example, one of the reserved bytes 0-1 could be used as a Relative Check field for indicating whether the all of the determined times of change included within the n tuples of the data packet 904 are relative or absolute. As above, if, for example, the Relative Check field is 0, the one or more determined times of change are relative to the present time. On the other hand, if, for example, the Relative Check field is non-zero, the one or more determined times of change returned by the storage management device 638 are specified absolutely, i.e., without reference to another time.

In one embodiment, if the determined time of change included within a tuple is relative, the actual modification time for the data stored at the address range of the set specified by that tuple is calculated by subtracting the determined time of change from the time at which the response 900 was generated. In such an embodiment, the response 900 may be time stamped. If, on the other hand, the determined time of change included within a tuple is absolute, the actual modification time for the data stored at the address range of the set specified by that tuple is simply the determined time of change.

Figure 17:
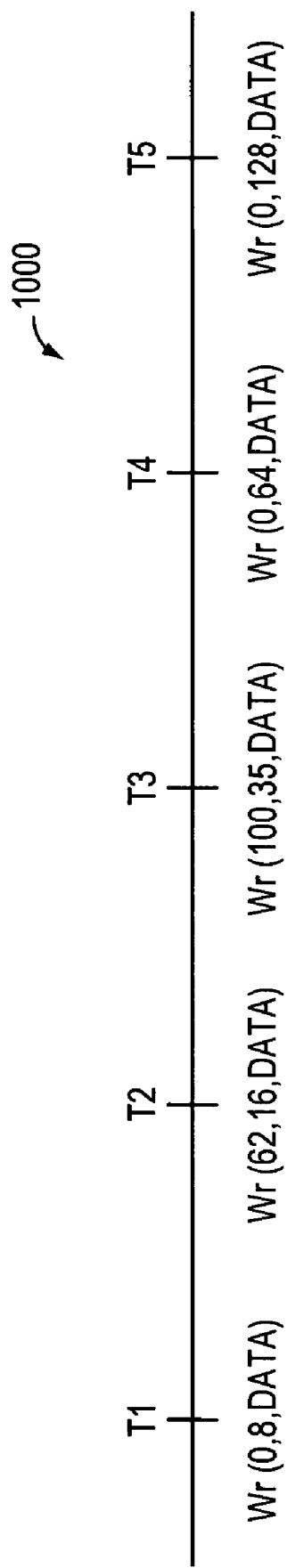
FIG. 17 is a timeline depicting a series of write operations directed to a data store in an embodiment of the invention.

FIGS. 17-20 present one example of how a modification history for a location within the data store 643 may be obtained. FIG. 17 depicts a timeline 1000 for the example. The timeline 1000 illustrates a different write operation being directed to the data store 643 at each of the times T1, T2, T3, T4, and T5. Each write operation is represented as "Wr (LBA, length, data)," where (LBA, length) represents the address range at which the data is written. Accordingly, at time T1, data is written to the address range (LBA 0, lenth 8); at time T2, data is written to the address range (LBA 62, lenth 16); at time T3, data is written to the address range (LBA 100, lenth 35); at time T4, data is written to the address range (LBA 0, lenth 64); and, at time t5, data is written to the address range (LBA 0, length 128).

Figure 18:
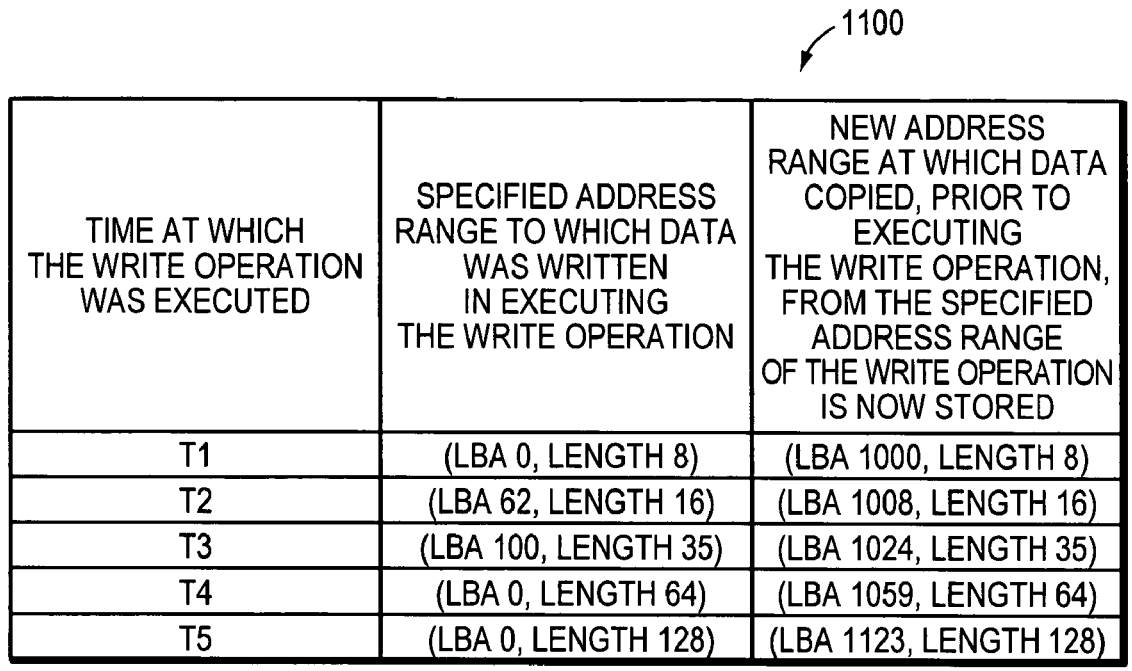
FIG. 18 is a diagram depicting an embodiment of a historical index generated by a storage management device in accordance with the invention.
Figure 19:
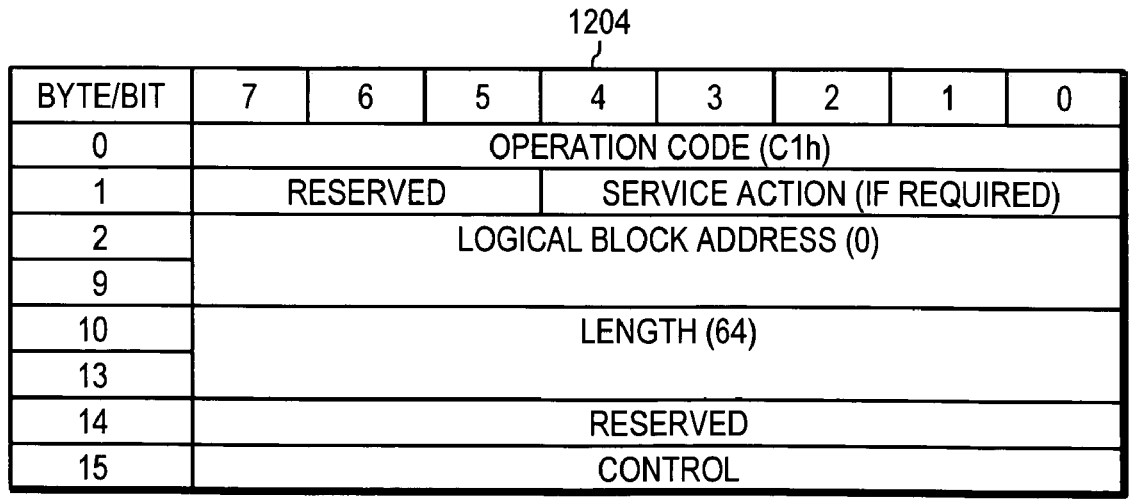
FIG. 19 is a diagram depicting an embodiment of an I/O request sent by a host to a storage management device.

FIG. 18 depicts an exemplary embodiment of a historical index 1100 for this example. As described above, after receiving, but prior to executing, a particular write operation, the storage management device 638 copies the data stored at the address range specified by the write operation and saves it to a new destination. The storage management device 638 then executes the write operation and updates the historical index 1100 as described above. For example, after executing the write operation at time T1, the storage management device 638 records, as shown in the second row of the historical index 1100, the time T1 at which the write operation was executed, the address range (LBA 0, lenth 8) to which the data was written, and the new address range (LBA 1000 lenth 8) at which the data stored at the address range (LBA 0, lenth 8) just prior to time T1 is now stored. As shown in FIG. 18, the historical index 1100 is similarly updated after executing each one of the write operations at times T2, T3, T4, and T5.

In accordance with the example, at some time after time T5, the host 634 requests, from the storage management device 638, a modification history for a location within the data store 643. For example, with reference now to FIG. 19, the host 634 transmits a data packet 1204, which is in the form of the data packet 804 described above with reference to FIG. 15, to the storage management device 638. In this example, the host 634 requests at least one time at which at least a portion of the data stored at the address range (LBA 0, lenth 64) was modified. Accordingly, the operation code of byte 0 of the data packet 1204 is associated with that request, bytes 2-9 of the data packet 1204 are set to indicate that the LBA is 0, and bytes 10-13 of the data packet 1204 are set to indicate that the length is 64.

After processing this request for the modification history for the address range (LBA 0, lenth 64) within the data store 643 (e.g., after parsing the historical index 1100 listing the write operations performed on the data store 643), the storage management device 638 responds to the host 634. For example, with reference now to FIG. 20, the storage management device 638 transmits to the host 634 the data packet 1304, which is in the form of the data packet 904 described above with reference to FIG. 16. In this example, the data packet 1304 includes four tuples, as specified by the indicator in bytes 2-9 of the data packet 1304. With reference now to both FIGS. 18 and 20, bytes 10-29 (i.e., the first tuple of the data packet 1304) indicate that the address range (LBA 0, lenth 8) (i.e., a subset of the requested address range (LBA 0, lenth 64)) was modified at time T1; bytes 30-49 (i.e., the second tuple of the data packet 1304) indicate that the address range (LBA 62, lenth 16) (i.e., an intersecting set of the requested address range (LBA 0, lenth 64)) was modified at time T2; bytes 50-69 (i.e., the third tuple of the data packet 1304) indicate that the address range (LBA 0, lenth 64) (i.e., the whole set of the requested address range (LBA 0, lenth 64)) was modified at time T4; and bytes 70-89 (i.e., the fourth tuple of the data packet 1304) indicate that the address range (LBA 0, length 128) (i.e., a superset of the requested address range (LBA 0, lenth 64)) was modified at time T5. The host 634, by receiving the data packet 1304, is thereby provided with the times at which at least a portion of the data stored at the address range (LBA 0, lenth 64) within the data store 643 was modified, and the corresponding address ranges that were modified at those times.

It should also be noted that, because the write operation that occurred at time T3 of the timeline 1000 was directed to the address range (LBA 100, lenth 35), which does not overlap the requested address range (LBA 0, lenth 64), the data packet 1304 does not include any information relating to that write operation.

Storage Buffer Selection

In general, in another aspect, the invention relates to methods and apparatus for optimally selecting one or more storage buffers for the storage of data. In brief overview, in one embodiment of this aspect of the invention, a first computing device (e.g., a storage management device as described above) receives data requiring temporary or permanent storage. For example, the first computing device receives from a second computing device (e.g., a host as described above) a write operation that includes a data payload requiring temporary or permanent storage. The first computing device initially stores the received data at a first storage buffer and then optimally identifies one or more additional storage buffers within the first computing device at which to store redundant copies of the received data. A storage buffer may be, for example, located on one of several processor modules present in the first computing device.

In one embodiment of this aspect of the invention, the first computing device evaluates one or more cost equations in order to optimally identify the one or more additional storage buffers for redundantly storing the copies of the received data. Moreover, in one embodiment, the first computing device stores a first copy of the received data in a first optimally identified additional storage buffer, and may also store second and further copies of the received data in second and further optimally identified additional storage buffers. Accordingly, the first computing device can provide redundant storage capabilities.

Figure 21:
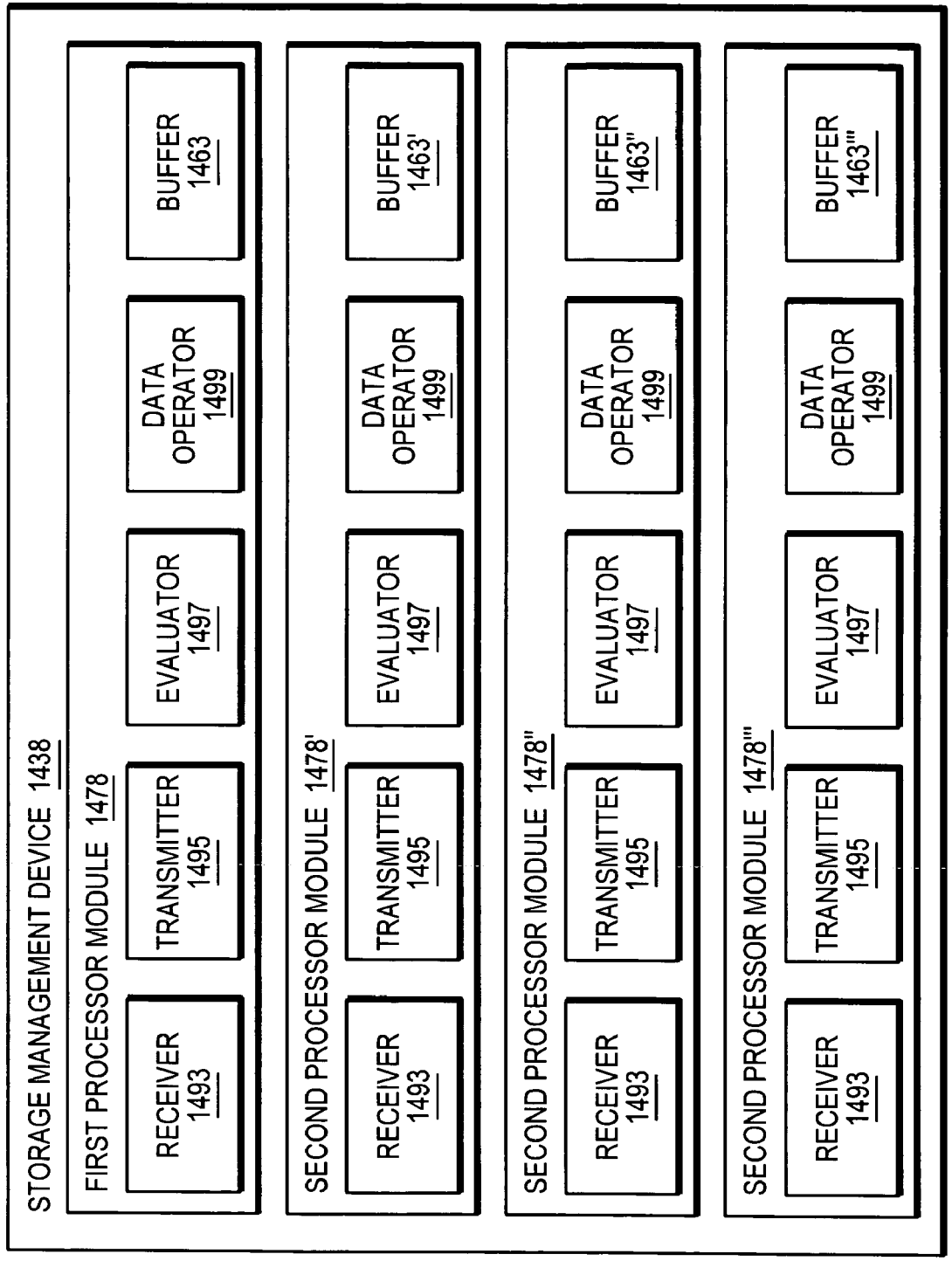
FIG. 21 is a block diagram of a storage management device according to an embodiment of the invention.

FIG. 21 illustrates one embodiment of a storage management device 1438 that optimally identifies one or more storage buffers according to this aspect of the invention. Generally speaking, the storage management device 1438 may have the capabilities of, and may be implemented as, the storage management devices described above, with the additional functionality described here. It should be understood that other implementations are also possible.

In one embodiment, the storage management device 1438 includes a plurality of processor modules, for example a first processor module 1478 and at least one second processor module, for example three second processor modules 1478', 1478'', 1478''' (generally 1478'). The first processor module 1478 and the three second processor modules 1478' depicted in the storage management device 1438 of FIG. 21 are, however, merely illustrative. More generally, the storage management device 1438 can include any number of processor modules 1478, 1478'. The quantity of processor modules 1478, 1478' can be increased or decreased based on, for example, considerations such as scalability, performance, and cost. Again, generally speaking, the processor modules 1478, 1478' may have the capabilities of, and may be implemented as, the processor modules described above (for example, the processor modules 378 described with respect to FIG. 10), with the additional functionality described here.

In one embodiment, the storage management device 1438 is a device for storing data (e.g., for temporarily storing data). Accordingly, in one such embodiment, the storage management device 1438 includes a plurality of storage buffers 1463, 1463', 1463'', 1463''' (generally 1463) for storing data. In one embodiment, as illustrated for example in FIG. 21, each processor module 1478, 1478' of the storage management device 1438 includes at least one storage buffer 1463. In another embodiment, some, but not all, of the processor modules 1478, 1478' of the storage management device 1438 include a storage buffer 1463. In yet another embodiment, the storage management device 1438 includes one or more storage buffers 1463 that stand alone on the storage management device 1438 and that are not part of a processor module 1478, 1478'. In still another embodiment, a single processor module 1478, 1478' can include two or more storage buffers 1463. Generally speaking, the storage buffers 1463 may have the capabilities of, and may be implemented as, the storage buffers described above (for example, the storage buffers 363 described with respect to FIG. 10), with the additional functionality described here. For example, a storage buffer 1463 may be contained within the memory 296 (see FIG. 9) of a processor module 1478, 1478'. In one embodiment, the entire memory 296 forms the storage buffer 1463. In another embodiment, a smaller, but contiguous, block within the memory 296 forms the storage buffer 1463. In yet another embodiment, several separated blocks are linked, for example by pointers, within the memory 296 to form the storage buffer 1463. The address space within the memory 296 that forms the storage buffer 1463 may be static, or, alternatively, it may be dynamically allocated at runtime.

In one embodiment, at least one processor module (e.g., the first processor module 1478 and/or at least one second processor module 1478') of the storage management device 1438 includes at least a receiver 1493, a transmitter 1495, an evaluator 1497, and a data operator 1499. The receiver 1493 and the transmitter 1495 can each be implemented in any form, way, or manner that is useful for receiving and transmitting, respectively, communications, such as, for example, requests, commands, and responses. In one embodiment, the receiver 1493 and the transmitter 1495 are implemented as software modules with hardware interfaces, where the software modules are capable of interpreting communications, or the necessary portions thereof. In another embodiment, the receiver 1493 and the transmitter 1495 are implemented as a single transceiver (not shown). A processor module 1478, 1478' uses the receiver 1493 and the transmitter 1495 to communicate with one or more of the other processor modules 1478, 1478', and/or to communicate with one or more computing devices (not shown) other than the storage management device 1438. The receiver 1493 and the transmitter 1495 may be implemented as multiple devices for different protocols, such as, for example, a target mode driver 382 of FIG. 10, a transceiver associated with the internal network 380 of FIG. 10, or some combination thereof.

For their part, the evaluator 1497 and/or the data operator 1499 may be implemented in any form, way, or manner that is capable of achieving the functionality described below. For example, the evaluator 1497 and/or the data operator 1499 may be implemented as a software module and/or program running on a microprocessor, and/or as a hardware device, such as, for example, an application specific integrated circuit (ASIC) or a field programmable gate array (FPGA). In one embodiment, the evaluator 1497 and the data operator 1499 are implemented as part of a host interface 361 described above, for example as part of the target mode driver 382 (see FIG. 10).

Figure 22:
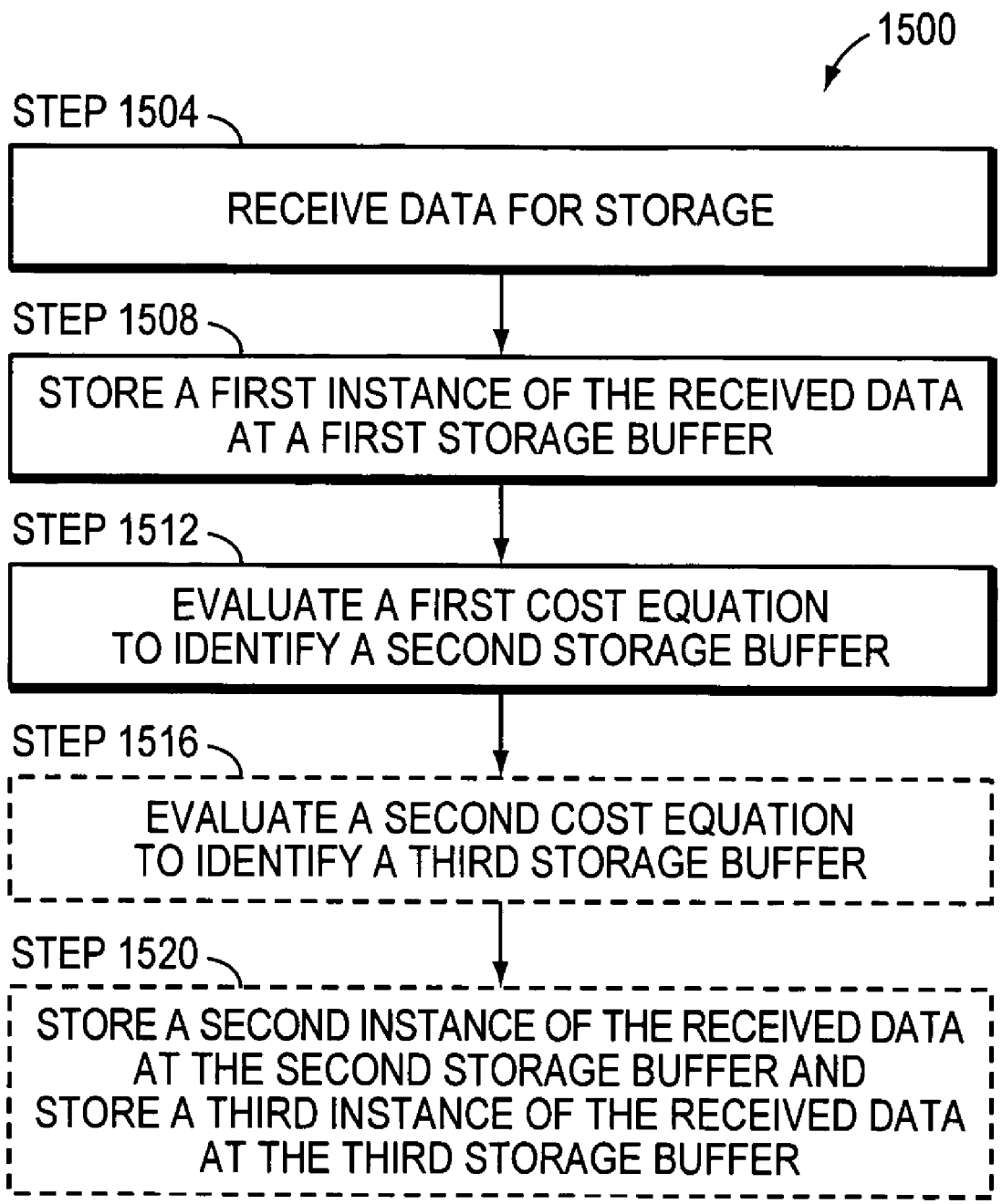
FIG. 22 is a flow diagram of an illustrative embodiment of a method for storing data in accordance with the invention.

Referring now to FIG. 22, in brief summary of one embodiment of a method 1500 for storing data, for example using the exemplary storage management device 1438 of FIG. 21, a processor module 1478, 1478' from amongst the plurality of processor modules 1478, 1478' of the storage management device 1438, say the first processor module 1478, receives, at step 1504, data for storage. The first processor module 1478 then stores, at step 1508, a first instance of the received data (e.g., the received data itself) at a first storage buffer 1463 on the first processor module 1478 and evaluates, at step 1512, a first cost equation to identify a second storage buffer 1463 from amongst the plurality of storage buffers 1463 at which to optimally store a second instance of the received data (e.g., a copy of the received data). Optionally, at step 1516, the first processor module 1478 evaluates a second cost equation to identify a third storage buffer 1463 from amongst the plurality of storage buffers 1463 at which to optimally store a third instance (e.g., another copy) of the received data. Again optionally, at step 1520, the second instance of the received data may be stored at the second storage buffer 1463 and the third instance of the received data may be stored at the third storage buffer 1463. Moreover, it should be understood that, at steps 1516 and 1520, any number of further cost equations (e.g., second, third, fourth, and fifth cost equations, etc.) may be evaluated to identify any number of storage buffers 1463 (e.g., third, fourth, fifth, and sixth storage buffers 1463, etc.) at which to optimally store any number of instances of the received data (e.g., third, fourth, fifth, and sixth instances of the received data, etc.) thereat. Advantageously, by optimally storing second and further instances of the received data at second and further storage buffers 1463 from amongst the plurality of storage buffers 1463, the received data may be quickly and efficiently stored with redundancy, thereby improving fault tolerance, and may be quickly and efficiently accessed, all without overloading the storage management device 1438.

In greater detail, in one embodiment, the receiver 1493 of the first processor module 1478 receives, at step 1504, a write operation that includes a data payload. The receiver 1493 of the first processor module 1478 may, for example, receive the write operation across a network (not shown) from a computing device (not shown) other than the storage management device 1438. At step 1508, the received write operation is initially stored in a first (and in some embodiments only) buffer 1463 of the first processor module 1478. In one embodiment, after the first processor module 1478 has received the write operation and after it has stored the received write operation in its first buffer 1463, the data operator 1499 of the first processor module 1478 separates the data payload from the rest of the write operation such that the first instance of the data payload is created and stored, on its own, in the first buffer 1463 of the first processor module 1478. In one embodiment, the write operation includes, in addition to the data payload, at least some control information. In such an embodiment, the data operator 1499 of the first processor module 1478 operates to separate the data payload from this control information. Having separated the data payload from the rest of the write operation, the data operator 1499 of the first processor module 1478 then replicates the first instance of the data payload to create the second and, optionally, further instances of the data payload.

At step 1512, the evaluator 1497 of the first processor module 1478 evaluates a first cost equation to identify a second storage buffer 1463 from amongst the plurality of storage buffers 1463, but different from the first storage buffer 1463 in the first processor module 1478 at which the first instance of the data payload is initially stored, at which to optimally store the second instance of the data payload. In one embodiment, the evaluator 1497 identifies a second storage buffer 1463 that is located on a second processor module 1478'. In one such embodiment, storing the second instance of the data payload at that second storage buffer 1463, because the second processor module 1478' is a different processor module than the first processor module 1478, protects against losing the data payload in the event that the first processor module 1478 fails.

In evaluating the first cost equation at step 1512, the evaluator 1497 of the first processor module 1478 may consider a variety of factors. For example, in one embodiment, for each one of the plurality of storage buffers 1463 in the storage management device 1438 other than the first storage buffer 1463 in the first processor module 1478 at which the first instance of the data payload is initially stored, the evaluator 1497 of the first processor module 1478 assigns a value to the physical distance in the storage management device 1438 from the first processor module 1478 to that storage buffer 1463. In one such embodiment, the storage buffer 1463 closest in physical distance to the first processor module 1478 is identified by the evaluator 1497 as the second storage buffer 1463 at which to optimally store the second instance of the data payload. In another embodiment, for each one of the plurality of storage buffers 1463 in the storage management device 1438 other than the first storage buffer 1463 in the first processor module 1478 at which the first instance of the data payload is initially stored, the evaluator 1497 of the first processor module 1478 assigns a value to the available capacity of that storage buffer 1463. In one such embodiment, the storage buffer 1463 having the greatest available capacity is identified by the evaluator 1497 as the second storage buffer 1463 at which to optimally store the second instance of the data payload.

In yet another embodiment, in evaluating the first cost equation at step 1512, and for each one of the one or more second processor modules 1478' that includes a storage buffer 1463 (which is necessarily different from the first storage buffer 1463 in the first processor module 1478), the evaluator 1497 of the first processor module 1478 assigns a value to the load present at that second processor modules 1478'. In one embodiment, the load in question is the input/output load between the second processor module 1478' in question and a device other than the storage management device 1438 (e.g., a host as described above). Alternatively, in another embodiment, the load in question is the interconnect load of, for example, requests, commands, and responses between the second processor module 1478' in question and at least one other processor module 1478, 1478'. In these cases, the storage buffer 1463 of the second processor module 1478' that has the lowest load value is identified by the evaluator 1497 as the second storage buffer 1463 at which to optimally store the second instance of the data payload.

In some instances, the storage management device 1438 is implemented such that one or more of the plurality of storage buffers 1463 are only accessible by some subset of the plurality of processor modules 1478, 1478'. For example, in such a storage management device 1438 (not shown) that includes processor modules A, B, C, and D having storage buffers W, X, Y, and Z, respectively, it may be the case that only processor modules A, B, and C are able to access storage buffer W, that only processor modules B and C are able to access storage buffer X, that only processor modules A and C are able to access storage buffer Y, and that only processor modules A and D are able to access storage buffer Z. Accordingly, in still another embodiment, the evaluator 1497 evaluates the first cost equation at step 1512 to identify a second storage buffer 1463 at which to store the second instance of the data payload so that, when the second storage buffer 1463 is taken together with the first storage buffer 1463 at which the first instance of the data payload was initially stored, the number of processor modules 1478 having access to the first instance and/or the second instance of the data payload is maximized. Maximizing the number of processor modules 1478 having access to the first instance and/or the second instance of the data payload maximizes processing flexibility and device efficiency when a storage buffer 1463 storing one instance of the data payload, and/or the processor module 1478 on which that storage buffer 1463 is located, fails. In one implementation of this embodiment, for each one of the plurality of storage buffers 1463 in the storage management device 1438 other than the first storage buffer 1463 in the first processor module 1478 at which the first instance of the data payload is initially stored, the evaluator 1497 of the first processor module 1478 assigns a value to the number of processor modules 1478, 1478' in the storage management device 1438 that would be able to access at least one of the first instance and the second instance of the data payload if the second instance of the data payload were stored at that storage buffer 1463. In one such embodiment, the storage buffer 1463 that would maximize the number of processor modules 1478 having access to the first and/or second instance of the data payload if the second instance of the data payload were stored thereat is identified by the evaluator 1497 as the second storage buffer 1463 at which to optimally store the second instance of the data payload.

In still another embodiment, in order to determine the second storage buffer 1463 at which to optimally store the second instance of the data payload, the evaluator 1497 of the first processor module 1478 considers all of the factors described above, or some subset thereof, and applies a weight to each factor it considers. In one such embodiment, the second storage buffer 1463 at which to store the second instance of the data payload is the storage buffer 1463 that exhibits the best weighted combination of the factors considered. In practice, the weight of each factor may be varied to suit a particular application.

Additionally, in another embodiment, for one or more of the plurality of storage buffers 1463, the weight of one or more of the factors considered for those storage buffers 1463 may be pre-adjusted to make it less desirable to store a copy of the data payload thereat. This may be done, for example, to artificially limit the amount of data stored at those storage buffers 1463, thereby controlling/limiting the requests made to those particular storage buffers 1463, and/or capping their performance and, consequently, the performance of the storage management device 1438.

In one embodiment, the storage management device 1438 stores more than one copy of the received data payload. Accordingly, in one such embodiment, the evaluator 1497 of the first processor module 1438 evaluates, at step 1516, a second cost equation, and, optionally, third, fourth, and fifth cost equations, etc. Evaluation of the second cost equation identifies a third storage buffer 1463 from amongst the plurality of storage buffers 1463, which is different from the first and second storage buffers 1463 (e.g., the first, second, and third storage buffers may each be located on different processor modules 1478, 1478'), at which to optimally store a third instance of the data payload. In one embodiment, the second cost equation evaluated by the evaluator 1497 of the first processor module 1478 is the same as the first cost equation described above, except for the fact that both the first and the second storage buffers 1463 (the second storage buffer 1463 having already been identified through evaluation of the first cost equation) are not considered by the evaluator 1497. Alternatively, in another embodiment, the second cost equation is different from the first cost equation. For example, the factors considered in each of the first and second cost equations are the same, but the weights assigned to each of the factors considered are different. Alternatively, as another example, the factors considered in one of the cost equations may be some subset of the factors considered in the other of the cost equations.

In still another embodiment, only the first cost equation is evaluated and a third instance of the data payload is stored at any storage buffer 1463, other than at the first storage buffer 1463 in the first processor module 1478 at which the first instance of the data payload was initially stored and other than at the second storage buffer 1463 identified in evaluating the first cost equation.

In one embodiment, at step 1520, the second, third, and/or further instances of the data payload are stored at the second, third, and/or further storage buffers 1463, respectively, identified at steps 1512 and/or 1516. To enable this to occur, the transmitter 1495 of the first processor module 1478 transmits the second, third, and/or further instances of the data payload to the second, third, and/or further storage buffers 1463, respectively. Accordingly, the data payload of the received write operation is redundantly stored in one or more of the storage buffers 1463 of the storage management device 1438.

Clock Synchronization

In general, in another aspect, the invention relates to methods and apparatus for synchronizing the internal clocks of a plurality of processor modules. In brief overview, in one embodiment of this aspect of the invention, a multiprocessor system (e.g., a storage management device as described above) includes multiple processor modules, each one of which includes its own internal clock. Synchronization across the internal clocks of the multiple processor modules is performed by designating one of the processor modules as the master processor module having the master internal clock for the multiprocessor system, and by having each one of the other processor modules (designated as slave processor modules) in the multiprocessor system periodically compare its internal clock to the master internal clock and, if necessary, correct its internal clock. In one embodiment, the slave processor modules correct their internal clocks without ever causing them to move backwards in time.

Figure 23:
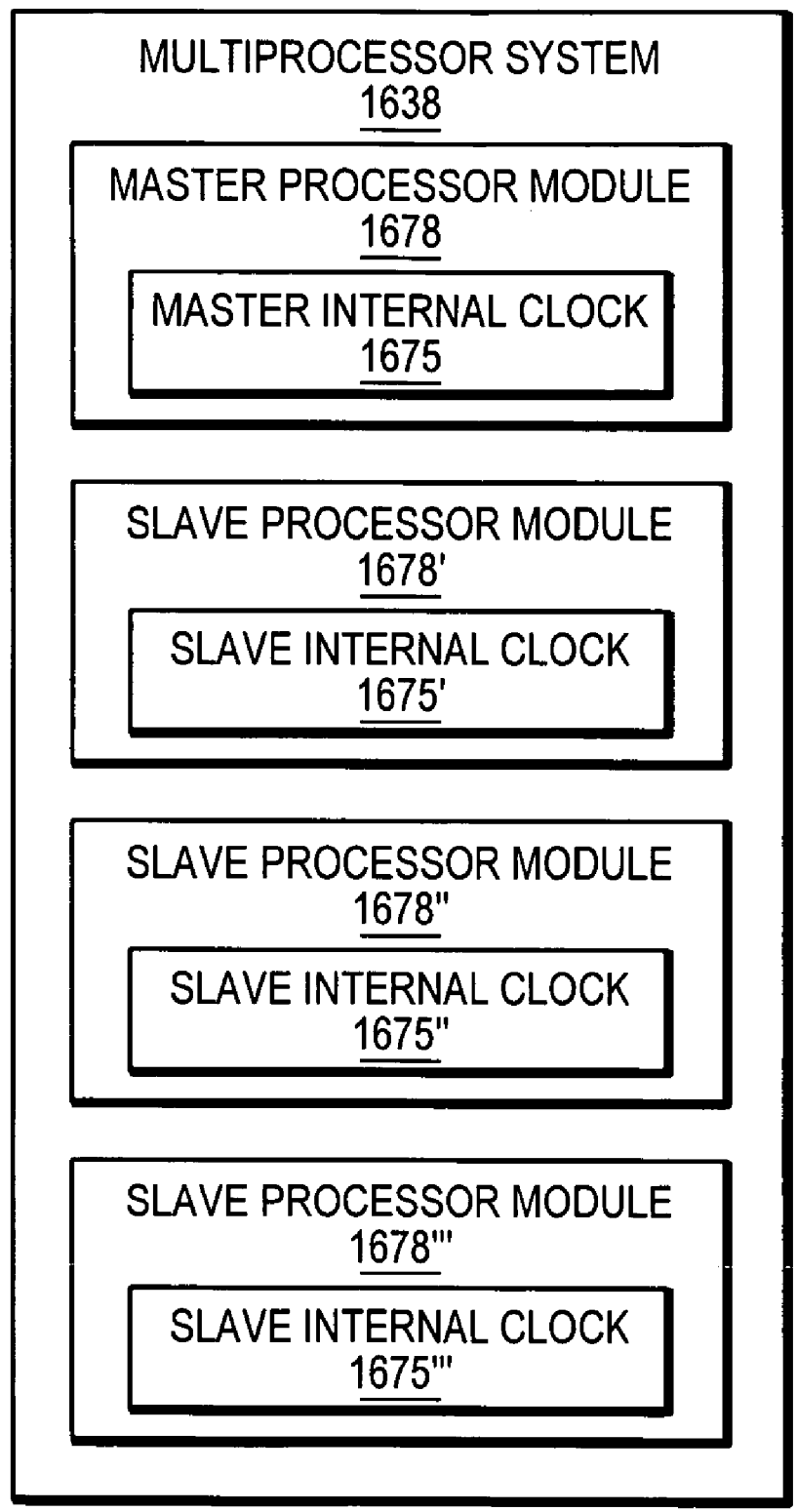
FIG. 23 is a block diagram of a multiprocessor system according to an embodiment of the invention.

FIG. 23 illustrates one embodiment of a multiprocessor system 1638 (e.g., a storage management device that, generally speaking, has the capabilities of, and is implemented as, the storage management devices described above, with the additional functionality described here) that maintains a substantially consistent running clock according to this aspect of the invention. The multiprocessor system 1638 includes a plurality of processor modules 1678, 1678', 1678", 1678''', each one of which includes its own respective internal clock 1675, 1675', 1675", 1675'''. Again, the four processor modules 1678, 1678', 1678", 1678''' depicted in the multiprocessor system 1638 of FIG. 23 are merely illustrative, and, more generally, the multiprocessor system 1638 can include any number or type of processor modules.

The internal clock(s) of one or more of the plurality of processor modules of the multiprocessor system 1638 may "drift" from the internal clocks of the other processor modules, for example due to temperature differences between the processor modules caused by one processor module heating up relative to the other processor modules. It may be the case, for example, that the internal clock 1675" of the processor module 1678" begins to run faster than, and drift apart from, the other internal clocks 1675, 1675', 1675''' of the multiprocessor system 1638. Accordingly, in order to synchronize the internal clocks 1675, 1675', 1675", 1675''' of the multiprocessor system 1638, and thereby maintain a reliable running clock for the multiprocessor system 1638, the internal clock 1675" is corrected as, for example, described here in accordance with this aspect of the invention.

In one embodiment of this aspect of the invention, a first processor module, for example, as illustrated, processor module 1678, is designated as the master processor module of the multiprocessor system 1638. The master process module 1678 includes the master internal clock 1675 for the multiprocessor system 1638. In one such embodiment, every other processor module (i.e., at least one other processor module) 1678', 1678", 1678''' is designated as a slave processor module of the multiprocessor system 1638. Each slave processor module 1678', 1678", 1678''' (generally 1678') includes its own respective slave processor module internal clock 1675', 1675", 1675''' (generally 1675'). The slave processor modules 1678', according to, in one embodiment, the method next described, periodically compare their internal clocks to the master internal clock 1675 and, if necessary, correct their internal clocks.

Figure 24:
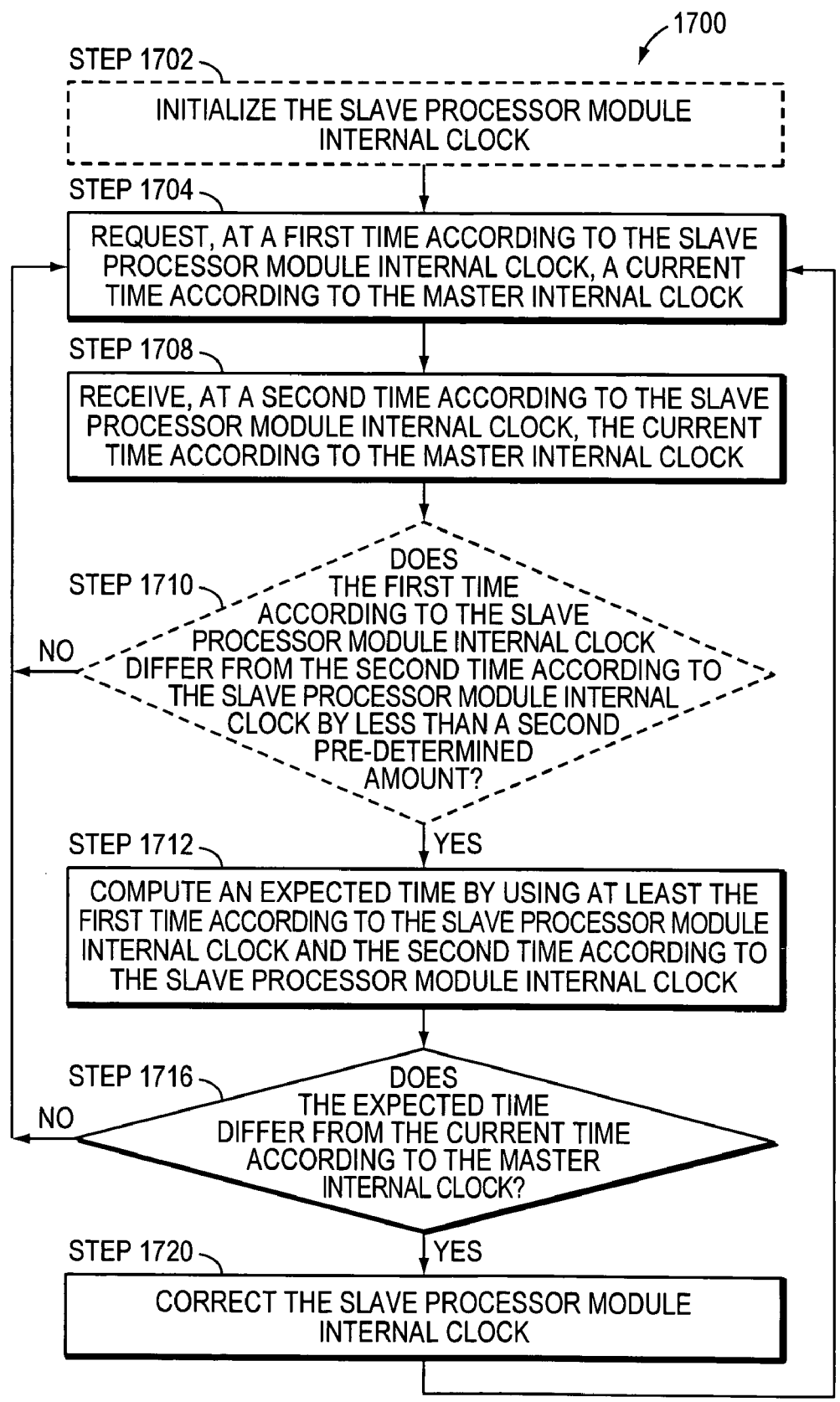
FIG. 24 is a flow diagram of an illustrative embodiment of a method for maintaining a substantially consistent running clock for a multiprocessor system in accordance with the invention.

Referring now to FIG. 24, in one embodiment of a method 1700 for maintaining a substantially consistent running clock for the multiprocessor system 1638, a slave processor module 1678' synchronizes the slave processor module internal clock 1675' with the master internal clock 1675 by iteratively performing steps 1704, 1708, 1712, 1716, and, if necessary, 1720 of the method 1700. Optionally, step 1710 may also be performed after steps 1704 and 1708, but before steps 1712, 1716, and 1720. In one embodiment, the iteration through steps 1704, 1708, 1710 (optionally), 1712, 1716, and, if necessary, 1720 of the method 1700 is performed by the slave processor module 1675' periodically, for example every fraction of a second (e.g., half-second) or other amount of time. Moreover, in some embodiments, prior to iteratively performing steps 1704, 1708, 1710 (optionally), 1712, 1716, and, if necessary, 1720, the slave processor module 1678' initializes, at step 1702, the slave processor module internal clock 1675'.

In one embodiment, to initialize the slave processor module internal clock 1675' at step 1702, the slave processor module 1678' requests the current time at the master internal clock 1675 and receives, some period of time later, the current time at the master internal clock 1675. In one embodiment, if the period of time between the slave processor module's request for and receipt of the current time at the master internal clock 1675 is less than a first pre-determined amount of time, the slave processor module 1678' initializes the slave processor module internal clock 1675' to the sum of the received current time at the master internal clock 1675' and one half the period of time between the slave processor module's request for and receipt of the current time at the master internal clock 1675. Otherwise, if the period of time between the slave processor module's request for and receipt of the current time at the master internal clock 1675 is greater than the first pre-determined amount of time, the slave processor module 1678' discards the received current time at the master internal clock 1675' and requests a new current time at the master internal clock 1675. In some embodiments, the slave processor module 1678' continues to discard the received current time at the master internal clock 1675 and to request a new current time at the master internal clock 1675 until it receives a current time at the master internal clock 1675 within the first pre-determined amount of time. The slave processor module 1678' then initializes the slave processor internal clock 1675' as described above.

In one embodiment, the first pre-determined amount of time is pre-stored in the memory 296 (see FIG. 9) of the slave processor module 1675'. Moreover, the first pre-determined amount of time may be configurable based on the hardware layout of the multiprocessor system 1638. In one embodiment, the first pre-determined amount of time is set to a specific time that falls between approximately 26 microseconds and approximately 35 microseconds.

In an alternative embodiment, rather than initialize the slave processor module internal clock 1675 as described above, step 1702 is not performed and the slave processor module 1678' instead calculates, as described below, an offset between the slave processor module internal clock 1675' and the master internal clock 1675.

In brief summary, to synchronize the slave processor module internal clock 1675' to the master internal clock 1675, the slave processor module 1678' first requests at step 1704, and at a first time according to the slave processor module internal clock 1675', a current time according to the master internal clock 1675. The request can be communicated in any form or manner that is useful for making the request. In one embodiment, for example, the request is communicated in the form of a data packet. The slave processor module 1678' also records the first time according to the slave processor module internal clock 1675' at which the request is made. Some time later, at step 1708, the slave processor module 1678' receives, at a second time according to the slave processor module internal clock 1675', the current time according to the master internal clock 1675. The current time according to the master internal clock 1675 may be transmitted to, and received by, the slave processor module 1678' in any form or manner that is useful for communicating such information. For example, the current time according to the master internal clock 1675 may be transmitted to, and received by, the slave processor module 1678' in a data packet. Again, in a similar to fashion to step 1704, the slave processor module 1678' records the second time according to the slave processor module internal clock 1675' at which the current time according to the master internal clock 1675 is received.

Optionally, after completing steps 1704 and 1708, but before performing steps 1712, 1716, and, if necessary, 1720, the slave processor module 1678' determines, at step 1710, whether the first time according to the slave processor module internal clock 1675' (recorded by the slave processor module 1678' at step 1704) differs from the second time according to the slave processor module internal clock (recorded by the slave processor module 1678' at step 1708) by less than a second pre-determined amount of time. In one such embodiment, as illustrated in FIG. 24, steps 1712, 1716, and, if necessary, 1720, are only performed when the slave processor module 1678' determines that the first time according to the slave processor module internal clock 1675' differs from the second time according to the slave processor module internal clock 1675' by less than the second pre-determined amount of time. Otherwise, the slave processor module 1678' reverts back to step 1704. By proceeding as such, the slave processor module 1678' eliminates from consideration all received current times at the master internal clock 1675 that were received after inordinate delay, and thereby protects against erroneous clock synchronization.

In a similar fashion to the first pre-determined amount of time described above with respect to step 1702, the second pre-determined amount of time may be pre-stored in the memory 296 (see FIG. 9) of the slave processor module 1675', and may be configurable based on the hardware layout of the multiprocessor system 1638. In one embodiment, like the first pre-determined amount of time, the second pre-determined amount of time is set to a specific time that falls between approximately 26 microseconds and approximately 35 microseconds.

Following completion of steps 1704, 1708 and, optionally, 1710, the slave processor module 1678' computes, at step 1712, an expected time by using at least the first time according to the slave processor module internal clock 1675' (recorded by the slave processor module 1678' at step 1704) and the second time according to the slave processor module internal clock 1675' (recorded by the slave processor module 1678' at step 1708). Optionally, in some embodiments, the slave processor module 1678' also uses an offset, for example as described below, in computing the expected time. In one embodiment, the computed expected time represents what the slave processor module 1678' expects to receive, from the master processor module 1678, in response to the slave processor module's request for the current time according to the master internal clock 1675. In other words, in one embodiment, the slave processor module 1678' assumes that the master internal clock 1675 and the slave processor module internal clock 1675' run at the same speed. As such, the slave processor module 1678' expects to be able to calculate the current time according to the master internal clock 1675' based on the request time (recorded by the slave processor module 1678' at step 1704), the response time (recorded by the slave processor module 1678' at step 1708), and, optionally, any previously determined offset (described below) between the slave processor module internal clock 1675' and the master internal clock 1675.

At step 1716, the slave processor module 1678' determines whether the expected time differs from the received current time according to the master internal clock 1675. If so, the slave processor module internal clock 1675' and the master internal clock 1675 are, contrary to the slave processor module's assumption at step 1712, running at different speeds (i.e., the salve processor module internal clock 1675' is drifting from the master internal clock 1675). Optionally, in one embodiment, the slave processor module 1678', in performing step 1716, determines whether the expected time differs from the received current time according to the master internal clock 1675 by more than a third pre-determined amount of time. In one such embodiment, the slave processor module 1678' only performs step 1720 when the slave processor module 1678' determines that the expected time differs from the received current time according to the master internal clock 1675 by more than a third pre-determined amount of time. Otherwise, as illustrated in FIG. 24, the slave processor module 1678' reverts back to step 1704. By proceeding as such, the slave processor module 1678' does not correct minor, often insignificant, deviations between the slave processor module internal clock 1675' and the master internal clock 1675.

Again, the third pre-determined amount of time may be pre-stored in the memory 296 (see FIG. 9) of the slave processor module 1675', and may be configurable. A lower third pre-determined amount of time results in tighter synchronization between the slave processor module internal clock 1675' and the master internal clock 1675. In one embodiment, the third pre-determined amount of time is set to approximately 5 microseconds.

Upon determining, at step 1716, that the expected time differs from the received current time according to the master internal clock 1675, or, optionally, that the expected time differs from the received current time according to the master internal clock 1675 by more than the third pre-determined amount of time, the slave processor module 1678' corrects, at step 1720, the slave processor module internal clock 1675'. In one embodiment, the correction is implemented by effectively "slowing down" or "speeding up" the slave processor module internal clock 1675', as described further below, although other correction techniques could be used as well. Having completed step 1720, the slave processor module 1678' then returns to perform step 1704 in the next iteration through the steps of the method 1700. If, on the other hand, the expected time does not differ from the received current time according to the master internal clock 1675, or, optionally, does not differ from the received current time according to the master internal clock 1675 by more than the third pre-determined amount of time, the slave processor module 1678' does not perform step 1720, but, rather, returns from step 1716 to step 1704 to begin the next iteration through the steps of the method 1700.

Generally speaking, in a multiprocessor system such as the multiprocessor system 1638 depicted in FIG. 23, the internal clocks of any two processor modules, say the master processor module 1678 and the slave processor module 1678', will not, even though they may not be drifting away from one another, be exactly synchronous in time, but will instead differ from one another, at a given point in time, by some amount. In one embodiment, rather than initialize the slave processor module internal clock 1675' in step 1702 as described above, the slave processor module 1678' instead calculates the difference, or offset, between the master internal clock 1675 and the slave processor module internal clock 1675'. The offset is calculated at a point in time during a first iteration through the steps of the method 1700, and is thereafter used by the slave processor module 1678' in correcting the slave processor module internal clock 1675'.

Thus, in one such embodiment, in a first iteration through the steps of the method 1700, after having completed steps 1704, 1708, and, optionally, 1710, but before completing steps 1712, 1716, and, if necessary, 1720, the slave processor module 1678' computes the offset. For example, in one embodiment, the slave processor module 1678' computes the offset by subtracting the received current time according to the master internal clock 1675 (received by the slave processor module 1678' at step 1708) from one half the sum of the first time according to the slave processor module internal clock 1675' (recorded by the slave processor module 1678' at step 1704) and the second time according to the slave processor module internal clock 1675' (recorded by the slave processor module 1678' at step 1708'). Practically speaking, in such an embodiment, it is assumed by the slave processor module 1678' that the time taken to transmit the request for the current time according to the master internal clock 1675 to the master processor module 1678 is equal to the time taken to transmit a response by the master processor module 1678 back to the slave processor module 1678'. Accordingly, if, in such an embodiment, the time according to the internal clock 1675' of the slave processor module 1678' is exactly equal to the time according to the master internal clock 1675 of the master processor module 1678, then one half the sum of the first time according to the slave processor module internal clock 1675' (recorded by the slave processor module 1678' at step 1704) and the second time according to the slave processor module internal clock 1675' (recorded by the slave processor module 1678' at step 1708') should be equal to the received current time according to the master internal clock 1675 (received by the slave processor module 1678' at step 1708). If this is not in fact the case, then the internal clock 1675' of the slave processor module 1678' is offset from the master internal clock 1675.

Moreover, in another such embodiment, after having calculated the offset, the slave processor module 1678' then uses the offset in computing the expected time both at step 1712 of a first iteration through the steps of the method 1700 and at step 1712 in subsequent iterations through the steps of the method 1700. In one embodiment, as the slave processor module 1678' iterates through the steps of the method 1700, it does not again compute the offset subsequent to the first iteration through the steps of the method 1700.

In another embodiment of the method 1700 where the slave processor module calculates the offset, the slave processor module 1678' does not adjust the slave processor module internal clock 1678' so that its time is exactly equal to the time according to the master internal clock 1675, but, rather, the slave processor module 1678' corrects, at step 1720 as explained below, the slave processor module internal clock 1675' so that the offset does not drift. In other words, the slave processor module 1678' attempts to keep the slave processor module internal clock 1675' offset by a set amount from the master internal clock 1675. In one such embodiment, the target mode driver 382 (see FIG. 10) of each slave processor module 1678' time stamps the control information of received I/O requests with the time that the I/O request was received according to that slave processor module's internal clock 1678', plus or minus the computed offset for that slave processor module's internal clock. Accordingly, in such an embodiment, each slave processor module 1678' in the multiprocessor system 1638 time stamps received I/O requests with a time that is substantially equivalent to the time according the master internal clock 1675 at which the I/O request was received. Note, however, that because of the clock drift phenomenon described herein, the time with which the received I/O request is stamped may not be exactly equivalent to the time according the master internal clock 1675 at which the I/O request was received. This latter issue is, however, addressed by the multiprocessor system 1638 as described below, and it does not affect the proper operation of the multiprocessor system 1638.

In greater detail of the method 1700, in one embodiment, for each iteration through the steps of the method 1700, the slave processor module 1678', in computing the expected time at step 1712, first computes a round trip time for the iteration by subtracting the first time according to the slave processor module internal clock 1675' (recorded by the slave processor module 1678' at step 1704) from the second time according to the slave processor module internal clock 1675' (recorded by the slave processor module 1678' at step 1708). Moreover, the slave processor module 1678' may store the computed round trip time for each iteration through the steps of the method 1700 in, for example, its memory 296 (see FIG. 9). Accordingly, in any current iteration through the steps of the method 1700 subsequent to a first iteration through the steps of the method 1700, the slave processor module 1678' may compute an average round trip time by using the computed round trip time for the then current iteration through the steps of the method 1700, and by using the round trip time for one or more of the previous iterations through the steps of the method 1700.

In one embodiment, the average round trip time computed by the slave processor module 1678' is simply the average of the round trip time of the then current iteration through the steps of the method 1700 and of the round trip times of all the previous iterations through the steps of the method 1700. In another embodiment, the average round trip time computed by the slave processor module 1678' is a moving average of the round trip time of the then current iteration through the steps of the method 1700 and of the round trip times of one or more of the most recent previous iterations through the steps of the method 1700. In yet another embodiment, the average round trip time computed by the slave processor module 1678' is a weighted moving average round trip time.

In one embodiment, on the first and each subsequent iteration through the steps of the method 1700, the slave processor module 1678' computes the expected time at step 1712 by computing the sum of the first time according to the slave processor module internal clock 1675' (recorded by the slave processor module 1678' at step 1704 of the current iteration) and one half the round trip time for that iteration through the steps of the method 1700, and, optionally, by subtracting the offset therefrom. In another embodiment, on an iteration through the steps of the method 1700 subsequent to the first iteration through the steps of the method 1700, the slave processor module 1678' computes the expected time at step 1712 by computing the sum of the first time according to the slave processor module internal clock 1675' (recorded by the slave processor module 1678' at step 1704 of that iteration) and one half the average round trip time computed, for example, as described above, and, optionally, by subtracting the offset therefrom.

Once the slave processor module 1678' has computed the expected time, it then determines, at step 1716, whether the expected time differs from the current time according to the master internal clock 1675, or, optionally, whether the expected time differs from the current time according to the master internal clock 1675 by more than the third pre-determined amount. In one embodiment, to make this determination, the slave processor module 1678' first computes, for each iteration through the steps of the method 1700, a drift value for the iteration by subtracting the expected time (computed by the slave processor module 1678' at step 1712 of that iteration) from the then current time according to the master internal clock 1675 (received by the slave processor module 1678' at step 1708 of that iteration). Moreover, the slave processor module 1678' may store the computed drift value for each iteration through the steps of the method 1700 in, for example, its memory 296 (see FIG. 9). Accordingly, as before, in any current iteration through the steps of the method 1700 subsequent to a first iteration through the steps of the method 1700, the slave processor module 1678' may compute an average drift value by using the computed drift value for the then current iteration through the steps of the method 1700, and by using the drift value for one or more of the previous iterations through the steps of the method 1700.

In one embodiment, the average drift value computed by the slave processor module 1678' is simply the average of the drift value of the then current iteration through the steps of the method 1700 and of the drift values of all the previous iterations through the steps of the method 1700. In another embodiment, the average drift value computed by the slave processor module 1678' is a moving average of the drift value of the then current iteration through the steps of the method 1700 and of the drift values of one or more of the most recent previous iterations through the steps of the method 1700. In yet another embodiment, the average drift value computed by the slave processor module 1678' is a weighted moving average drift value.

In one embodiment, on the first and each subsequent iteration through the steps of the method 1700, the slave processor module 1678' determines, at step 1716, that the expected time differs from the received current time according to the master internal clock 1675 (received by the slave processor module 1678' at step 1708 of the current iteration) when the drift value for that iteration is non-zero. In another embodiment, on an iteration through the steps of the method 1700 subsequent to the first iteration through the steps of the method 1700, the slave processor module 1678' determines that the expected time differs from the received current time according to the master internal clock 1675 (received by the slave processor module 1678' at step 1708 of that iteration) when the average drift value computed, for example, as described above is non-zero.

Upon determining that the expected time differs from the received current time according to the master internal clock 1675, or, optionally, upon determining that the expected time differs from the received current time according to the master internal clock 1675 by more than the third pre-determined amount of time, the slave processor module 1678' corrects, at step 1720, the slave processor module internal clock 1675'. In one embodiment, where the expected time is greater than the received current time according to the master internal clock 1675 (or, optionally, greater than the received current time according to the master internal clock 1675 by more than the third pre-determined amount of time), meaning that the slave processor module internal clock 1675' has been running faster than the master internal clock 1675, the slave processor module 1678' corrects the slave processor module internal clock 1675' by slowing down the slave processor module internal clock 1675'. In another embodiment, where the received current time according to the master internal clock 1675 is greater than the expected time (or, optionally, greater than the expected time by more than the third pre-determined amount of time), meaning that the slave processor module internal clock 1675' has been running slower than the master internal clock 1675, the slave processor module 1678' corrects the slave processor module internal clock 1675' by speeding up the slave processor module internal clock 1675'.

In one embodiment, the multiprocessor system 1638 includes a free-running counter, which may be incremented on each execution of a single CPU instruction, and the slave processor module 1678' is configured to implement the slave processor module internal clock 1675' by calibrating the counts of the free-running counter to microseconds. The slave processor module 1678' may, for example, be initially configured to consider a microsecond as being equivalent to 2800 counts of the free-running counter (e.g., the slave processor module 1678' may, for example, be initially configured to consider a microsecond as being equivalent to the time required to execute 2800 CPU instructions, as might be the case with a 2.8 GHz CPU clock and a CPU that executes one instruction per clock cycle). Accordingly, in one embodiment, to slow down the slave processor module internal clock 1675', the slave processor module 1678', without affecting the free-running counter, increases the number of counts of the free-running counter that it considers there to be in a given time interval. Similarly, to speed up the slave processor module internal clock 1675', the slave processor module 1678', without affecting the free-running counter, may decrease the number of counts of the free-running counter that it considers there to be in a given time interval. Importantly, in some such embodiments, the slave processor module 1678' corrects the slave processor module internal clock 1675' in such a fashion that it never goes backwards in time. Rather, the slave processor module internal clock 1675' continually moves forwards in time, being slowed down or sped up for correction as described above.

Figure 25:
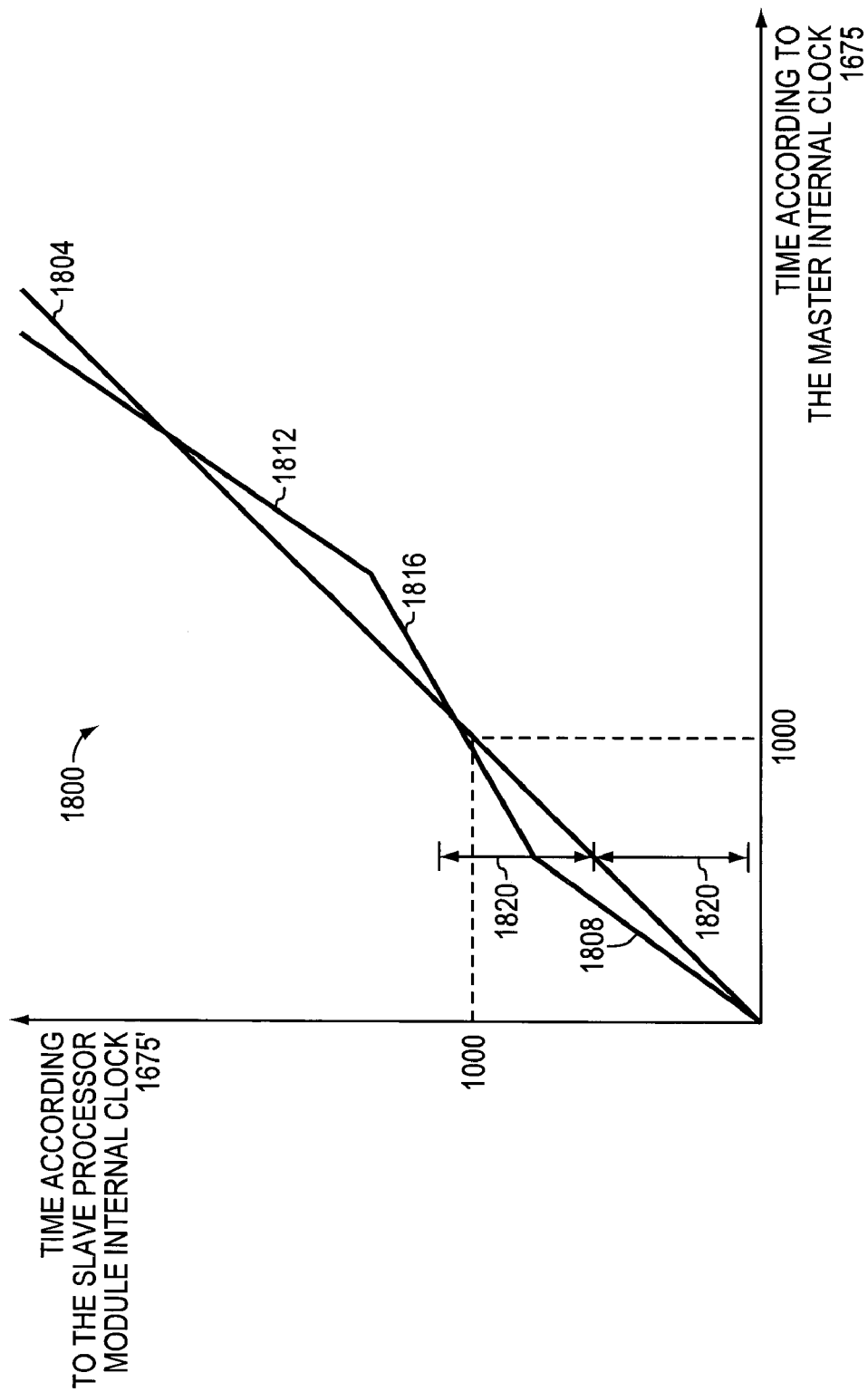
FIG. 25 is a graph of the time according to an internal clock of a slave processor module within a multiprocessor system versus the time according to an internal clock of a master processor module within the multiprocessor system.

FIG. 25 depicts an exemplary graph 1800 of the time according to the slave processor module internal clock 1675' versus the time according to the master internal clock 1675. In the exemplary graph, it is assumed, for simplicity of explanation, that the offset, if calculated as described above, is zero, although it would not necessarily be zero if it was in fact calculated as described above. Thus, ideally, as represented by line 1804, the time according to the slave processor module internal clock 1675' is always equal to the time according to the master internal clock 1675. In practice, however, the slave processor module 1678' may drift relative to the master processor module 1678 (for example due to temperature variation), such that the slave processor module internal clock 1675' runs faster than the master internal clock 1675 (as represented by line segments 1808 and 1812). Alternatively, the master processor module 1678 may drift relative to the slave processor module 1678' (for example due to temperature variation), such that the master internal clock 1675 runs faster than the slave processor module internal clock 1675' (as represented by line segment 1816). As such, the slave processor module 1678' corrects the slave processor module internal clock 1675', in accordance with the method 1700 described above, to "slow down" the slave processor module internal clock 1675' relative to the master internal clock 1675 (as represented by the exemplary line segment 1816), or, alternatively, to "speed up" the slave processor module internal clock 1675' relative to the master internal clock 1675 (as represented by the exemplary line segment 1812). As described, the slave processor module 1678' corrects the slave processor module internal clock 1675' in such a fashion that it never goes backwards in time.

In another embodiment, the multiprocessor system 1638 of FIG. 23 is a server in a network (not shown). Accordingly, a processor module, say the slave processor module 1678', may receive one or more write operations from another computing device in the network (e.g., a host). In one such embodiment, the slave processor module 1678' may determine, at step 1716 of an iteration through the steps of the method 1700, that the expected time differs from the received current time according to the master internal clock 1675 (received by the slave processor module 1678' at step 1708 of that iteration through the steps of the method 1700) by less than a specified amount of time 1820, which is represented on the graph 1800 of FIG. 25 and which is greater than the aforedescribed third pre-determined amount of time. In such a case, the slave processor module 1678' acknowledges the received write operation before a write is actually completed. Alternatively, the slave processor module 1678' may determine that the expected time differs from the received current time according to the master internal clock 1675 by more than the specified amount of time 1820. In such a case, the slave processor module 1678' refrains from acknowledging the received write operation until the expected time, through correction of the slave processor module internal clock 1675' as described above with reference to the method 1700, is once again determined to differ from the received current time according to the master internal clock 1675 by less than the specified amount of time 1820. Similarly, in this latter case, all other processor modules in the multiprocessor system 1638 may also refrain from acknowledging received write operations until the expected time, as computed by the slave processor module 1678', is once again determined to differ from the received current time according to the master internal clock 1675 by less than the specified amount of time 1820. In these embodiments, the most extreme case in which the multiprocessor system 1638 will continue to acknowledge received write operations occurs when the internal clock of a first slave processor module runs faster than the master internal clock 1675 and drifts up to the specified amount of time 1820 in the positive direction, while the internal clock of a second slave processor module runs slower than the master internal clock 1675 and drifts up to the specified amount of time 1820 in the negative direction.

In one embodiment, the specified amount of time 1820 is one-half the minimum amount of time in which a host in the network can request that the multiprocessor system 1638 process a first write operation, thereafter receive an acknowledgement of the request from the multiprocessor system 1638, and thereafter request that the multiprocessor system 1638 process a second write operation. In such an embodiment, assuming the extreme case described above, a host may transmit a first write operation to the first slave processor module whose internal clock has drifted up to the specified amount of time 1820 in the positive direction, thereafter receive an acknowledgement of the first write operation from the multiprocessor system 1638, and thereafter immediately send a second write operation to the second slave processor module whose internal clock has drifted up to the specified amount of time 1820 in the negative direction, and still be guaranteed that the target mode driver 382 (see FIG. 10) of the second slave processor module will time stamp the received second write operation with a later time than the target mode driver 382 (see FIG. 10) of the first slave processor module will time stamp the received first write operation with. Alternatively, in still other embodiments, the specified amount of time may be otherwise set to any amount of time that guarantees the correct order of processing received write operations in the multiprocessor system 1638.

In yet another embodiment, where the multiprocessor system 1638 includes a free-running counter and the master processor module 1678 is configured to implement the master internal clock 1675 by calibrating the counts of the free-running counter to microseconds, as described above for the slave processor module internal clock 1675', the master processor module 1678 maintains a calibration table relating the master internal clock 1675 to a real world clock. In one embodiment, as described above, 2800 counts on the free-running counter is equivalent to one microsecond on a real world clock. In one such embodiment, when the multiprocessor system 1638 is to present a time to a user at a host in the network, the calibration table at the master processor module 1678 is first consulted to convert the running time kept by the multiprocessor system 1638 to the real world time.

Map Generation and Use

In general, additional aspects of the invention relate to systems, methods, and articles of manufacture for generating an image of a data store at a past time by using a map (e.g., a time map) of the locations of data stored in the data store at the specified past time. The map allows the data storage system to quickly and efficiently determine the locations of data stored in a data store at a past time, without searching of the entire index of records concerning the locations of the past data.

In brief overview, in one embodiment of the invention, a data storage system includes a storage management device that includes a receiver for receiving a specification for a past time, and an I/O processor which processes I/O requests directed to one or more target units of storage in a data store. As previously described, in one embodiment, a unit of storage is a single or multi-byte group of blocks of the data store. The storage management device also includes an indexing module which records write requests processed by the I/O processor. The indexing module includes a memory that stores, for each write request, a record that can include: 1) identification of target units of storage; 2) locations of data previously stored in the target units of storage; and 3) a write time denoting a time at which a write request was received. Additionally, the storage management device includes a mapping module that uses one or more records to generate a map of the locations of data stored in the target units of storage at the specified past time. An image generation module, included in the storage management device, presents an image of the data store at the past time based, at least in part, on the map generated by the mapping module.

Figure 26:
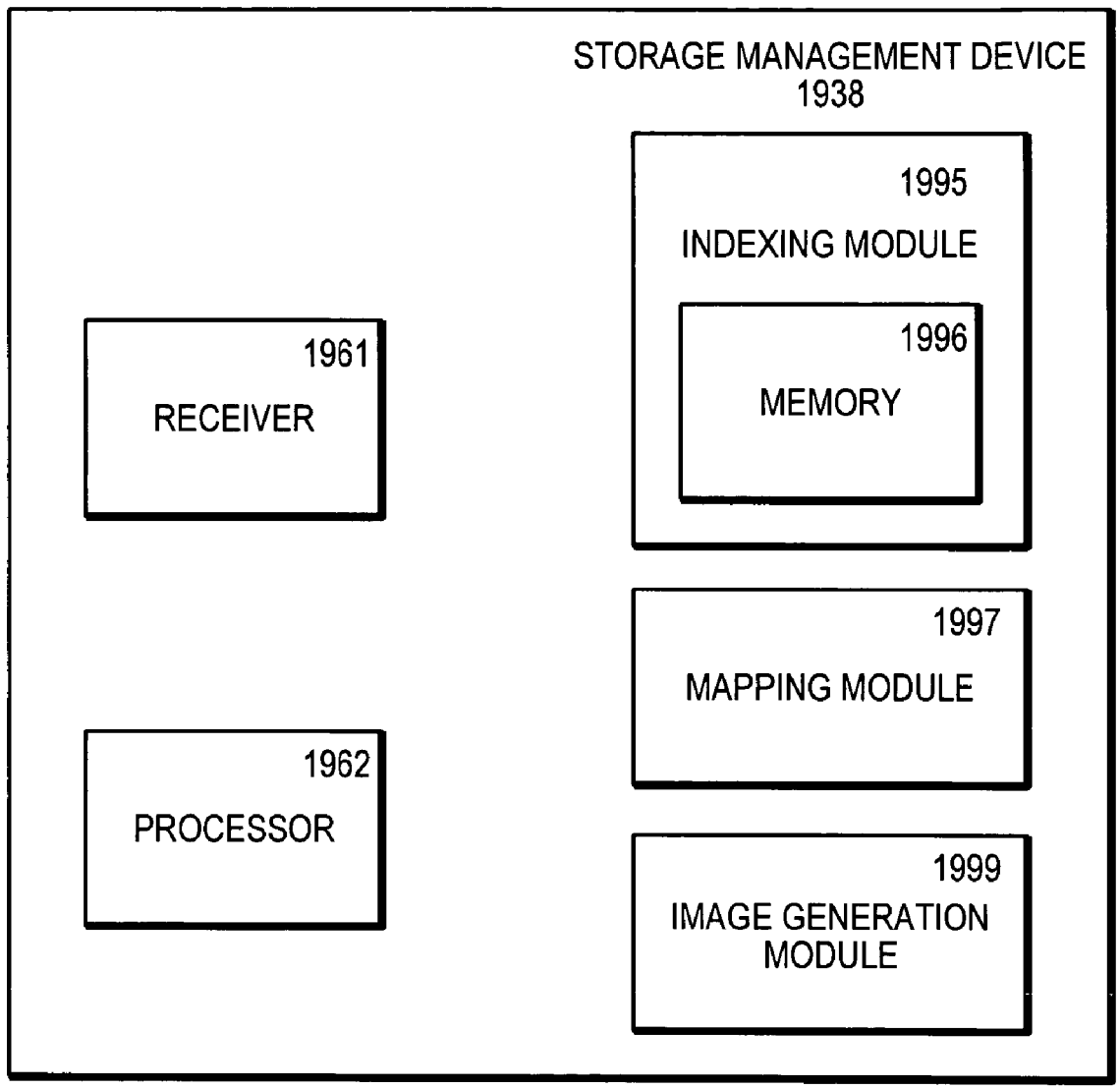
FIG. 26 is a block diagram of a storage management device according to an embodiment of the invention.

FIG. 26 illustrates a storage management device 1938 in accordance with an embodiment of this aspect of the invention. The storage management device 1938 can be integrated in the data storage systems described herein, for example, with reference to FIGS. 1, 4, 5, and 13. As one example, the storage management device 1938 can communicate with a host and a physical store to provide the host with access to data stored in a physical store. Additionally, the data stored in the physical store can be organized and presented to the host using a variety of approaches. For example, the storage management device 1938 can present one or more volumes, including logical volumes, to the host. Also, as previously discussed above, the storage management device 1938 can provide the host with access to both one or more current stores and one or more time stores associated with a plurality of data stores. Additionally, the images presented to the host may be either fixed or dynamic images as described previously. The storage management device 1938 can also implement additional functionality attributed to the storage management devices of the previously described aspects and embodiments.

In one embodiment, the storage management device 1938 includes a receiver 1961, a processor 1962, an indexing module 1995, a mapping module 1997, and an image generation module 1999 that are in communication with each other. Each of these elements may be implemented in software, hardware, or some combination of both software and hardware. Receiver 1961, for example, can be implemented as part of one or more host interfaces 361 of FIG. 10. The receiver 1961, in one embodiment, is implemented in the target mode drivers 382 of FIG. 10. The receiver 1961 communicates with the host and receives a specification for a past time. The past time is part of a request from the host for the storage management device to present an image of a data store at the past time. The request can also include the identification of a specific data store, and in some cases a logical block address and a length.

In one embodiment, the request for the image of the data store at the past time is received in-band by the receiver 1961, that is, from the host through the same communication protocol that the host uses when it communicates data commands (e.g., read requests and write requests). In another embodiment, the receiver 1961 receives the request out-of-band. For example, the receiver 1961 receives the request via a different communication protocol than that used by the host when it communicates data commands, via a different channel (e.g., via a user interface, a physical interface, or command line console that is different from the host, for example, a system administrator's interface), or via some combination thereof.

The processor 1962 processes I/O requests directed to one or more target units of storage. The processor 1962 can be implemented in one of the elements previously described herein. For example, the processor 1962 can be implemented in one or more elements shown in the processor modules 378 of FIG. 10. In one embodiment, the processor 1962 is implemented in the I/O managers 362 shown in FIG. 10. The processor 1962 processes I/O requests directed to units of storage in the data store, for example, a logical block. A unit of storage that is the target of a read or write request is also referred to as a target unit of storage.

As described earlier, write requests are often directed to a plurality of units of storage. In one embodiment, the storage management device 1938 performs a copy-on-write operation on target units of storage prior to overwriting the data stored in the target units of storage prior to execution of the write request. The copied data (i.e., past data) is then moved to another location by the storage management device 1938. As described, it may be that an actual copy of data is not performed upon the occurrence of a write operation in a particular instance because, for example, the data that will be overwritten is already saved elsewhere, or because the data is temporarily saved in memory before it is written, or because the data is not moved, but instead a pointer to the data is modified. For example in one embodiment, each write request directed to a target unit of storage can result in data being written to both the current store and the time store. As a result, it is unnecessary to perform an actual copy-on-write for the immediately subsequent write directed to the same target unit of storage because the past data is already stored in the time store. Thus, here copy-on-write operation can mean actual copying, but can also include optimizations that allow for the effect of a copy-on-write. As before, the examples described below generally present the operation of the storage management device 1938 as if a copy-on-write were always performed, with the understanding that optimizations can be used in practice.

The storage management device 1938 also includes an indexing module 1995 that stores records of the locations of the past data in the storage management system in order to facilitate the later retrieval of past data for, among other purposes, the presentation of images of the data store at past times. The indexing module 1995 can also be implemented in software, hardware, or some combination thereof, and for example, in one of the elements previously described herein. For example, in one embodiment, the indexing module 1995 is implemented in one or more of the I/O managers 362 of FIG. 10. The indexing module 1995 includes memory 1996 for storing the location records. In a version of this embodiment, the memory 1996 is integral to the indexing module 1995. In another version, the memory is not integral with indexing module 1995 but is elsewhere within the storage management device 1938, for example, elsewhere in the processor module 378 of FIG. 10. Functionally, the indexing module 1995 records write requests processed by the I/O processor 1962, and stores, in memory 1996, a record for each write request that is processed. The record includes an identification of the target units of storage, locations of data previously stored in the target units of storage, and a write time denoting the time at which the corresponding write command was received. Each write request may be directed to a single unit of storage, for example, a block, or a plurality of units of storage. However, the records stored by the indexing module provide a mechanism by which the data stored in each unit of storage at the specified past time can be located. In one embodiment, the time is the time that the storage management device 1938 received the write command.

The storage management device 1938 also includes a mapping module 1997 that uses the records stored by the indexing module 1995 to map the current location of past data for the units of storage in the data store with the specified past time. The mapping functionality allows for the rapid generation of past images of the data store. The mapping module 1997 can be implemented in one or more elements shown in the processor modules 378 of FIG. 10. For example, in one embodiment, the mapping module 1997 is implemented in one or more of the I/O managers 362 shown in FIG. 10. Functionally, the mapping module 1997 creates a list of pointers to locations in the storage management system, for example, a location in the physical store where the past data is located for the specified past time. Once a map is created it can be stored by the storage management device 1938 where it can be rapidly accessed in the future to again present the image of the data store at the past time. In one embodiment, for example, one or more of the I/O managers 362 of FIGS. 10 and 11 manage the map.

The map can be dynamic, for example, it can be updated as additional write requests are processed by the processor 1962. Generally, such updates are necessary to ensure that the map remains accurate as copy-on-write operations are executed after the time at which the map is generated. The dynamic nature of the map is explained further with reference to FIGS. 27 and 28.

The storage management device 1938 also includes an image generation module 1999 that presents the image of the data store at the past time based, at least in part, on the map generated by the mapping module 1997. The image generation module 1999 can also be implemented in one or more elements shown in the processor modules 378 of FIG. 10. For example, in one embodiment, the image generation module 1999 is implemented in the host interfaces 361 shown in FIG. 10.

The receiver 1961, processor 1962, indexing module 1995, mapping module 1997, and image generation module 1999 can be implemented in a distributed architecture such as that shown in FIG. 10. In such an approach, each processor module 378 is responsible for processing and indexing write commands directed to specific units of storage in one or more data stores. As a result, the indexing module 1995 included in each processor module 378 stores a record for each write command directed to the units of storage that the indexing module 1995 is responsible for. When an image of a data store at a past time is requested, each mapping module 1997 generates a map for the specified past time for the portion, if any, of the data store for which it is responsible. The map is generated using the records stored in the corresponding indexing module 1995. Based, at least in part, on the map, the image generation module 1999 in each processor module 378 then presents the portion of the image of the data store for which it is responsible, if any. In one embodiment, each processor module 378 includes an indexing module 1995, a mapping module 1997, and an image generation module 1999 that are responsible for common portions of the data store, e.g., the same units of storage.

The above-described approach also allows the storage management device 1938 to include built-in redundancy that increases the reliability of the data storage system. For example, two separate processor modules 378 can be assigned to perform the above-described operations of receiving, processing, indexing, mapping, and image generation for the same units of storage. In one embodiment, a first processor module 378 is used as a primary processing module and a second processor module 378' operates as a backup, for example, in the event of a problem with the first processor module 378.

FIG. 27 illustrates an index 2009 of records for a small set of write requests directed to a data store, processed by the processor 1962 and recorded by indexing module 1995. Index 2009 includes four records 2010, 2010', 2010", and 2010''' each identified by unique write-request identifiers 1287, 1288, 1290, and 1291, respectively. Each record 2010 identifies the target logical unit ("LUN") to which the associated write command was directed, i.e. the target LUN identification. Additionally, each record includes the location(s) of the units of storage on the target LUN, the location of the past data that was overwritten, and the time at which the storage management device 1938 received the write command. In the embodiment shown in FIG. 27, the location of the units of storage are indicated by the logical block address ("LBA") and the length associated with the write request (i.e., the number of LBA's comprising the target units of storage). Although each record 2010 in FIG. 27 includes a target LUN identification, the identification can be eliminated from the records where the index itself is restricted to a single LUN. Also, in FIG. 27, a LUN identification is included in the location of the past data for each record 2010. The target LUN and the LUN where the past data is stored differ in each of the records 2010 shown in FIG. 27. For example, each of the write-requests 1287, 1288, 1290, and 1291 of FIG. 27 are associated with a target LUN identified as LUN 2502 while the past data associated with write-requests 1287, 1288, and 1291 are stored in LUN 2500, and the past data associated with write request 1290 is stored in LUN 2501. Although, these examples present a copy-on-write operation in which different LUNs are used to store the new data and the past data, in practice, the new data and the old data can be stored on the same LUN. When the target LUN is also used to store past data, all LUN identification can be eliminated from each of the individual records, for example, where the index itself is restricted to a single LUN.

As for the location values in the index 2009, the first value on the left in the "new data" column, is the logical block address (i.e., the unit of storage) at which the corresponding write operation begins. The second value, the entry on the right in the "new data" column, is the length, that is, the number of units of storage that the write operation is directed to. In the embodiment shown in FIG. 27, the leftmost entry in the "past data" column is the LUN identification of the LUN where the past data is written. The center entry, appearing in the "past data" column, is the logical block address where the past data begins to be stored as a result of the associated copy-on-write operation. The rightmost entry, appearing in the "past data" column, is the number of units of storage that the past data occupies when copied and written to the location. Thus, the index 2009 provides enough information to allow the system to identify the specific locations of the newly-written data and the past data associated with each record 2010.

In one embodiment, the unit of storage is a specific 512-byte block that is part of the LUN, and so the length indicates how many 512-byte blocks the write request will operate on. For example, write-request 1287 occurred at time ("t") 6100. It was directed to the target units of storage, in LUN 2502, beginning at LBA 0 for a length of 17 blocks. The past data that was stored at blocks 0-16 is copied and re-written to blocks 64-80 (i.e., location 64, 17) of the LUN 2500. It should be understood that other block lengths can be used.

Similarly, write-request 1288 results in data in blocks 16-20 of LUN 2502 being copied to locations 85-89 of LUN 2500. Following the execution of write-request 1288, block 16 has been the target of two write operations, at t=6100 and at t=6117, while each of blocks 0-15 and 17-20 have been the target of a single write operation. Write-request 1290 is the next recorded write request. Following its execution, data in blocks 6-9 of LUN 2502 is copied and written to blocks 37-40 of LUN 2501 and the new data is written in blocks 6-9 of LUN 2502. At this point, blocks 6-9 and block 16 have each been the target of two write operations, while each of blocks 0-5, 10-15, and 17-20 have been the target of a single write operation. Write-request 1291 was processed following the processing of write-request 1290. As a result of write-request 1291, the data in blocks 7-10 was written to blocks 46-49 of LUN 2500 as past data and new data is stored in blocks 7-10 of LUN 2502. Following the execution of write-request 1291, blocks 7-9 have been the target of three write operations, blocks 6, 10, and 16 have been the target of two write operations, and blocks 0-5, 11-15, and 17-20 have each been the target of a single write operation.

Figure 28:
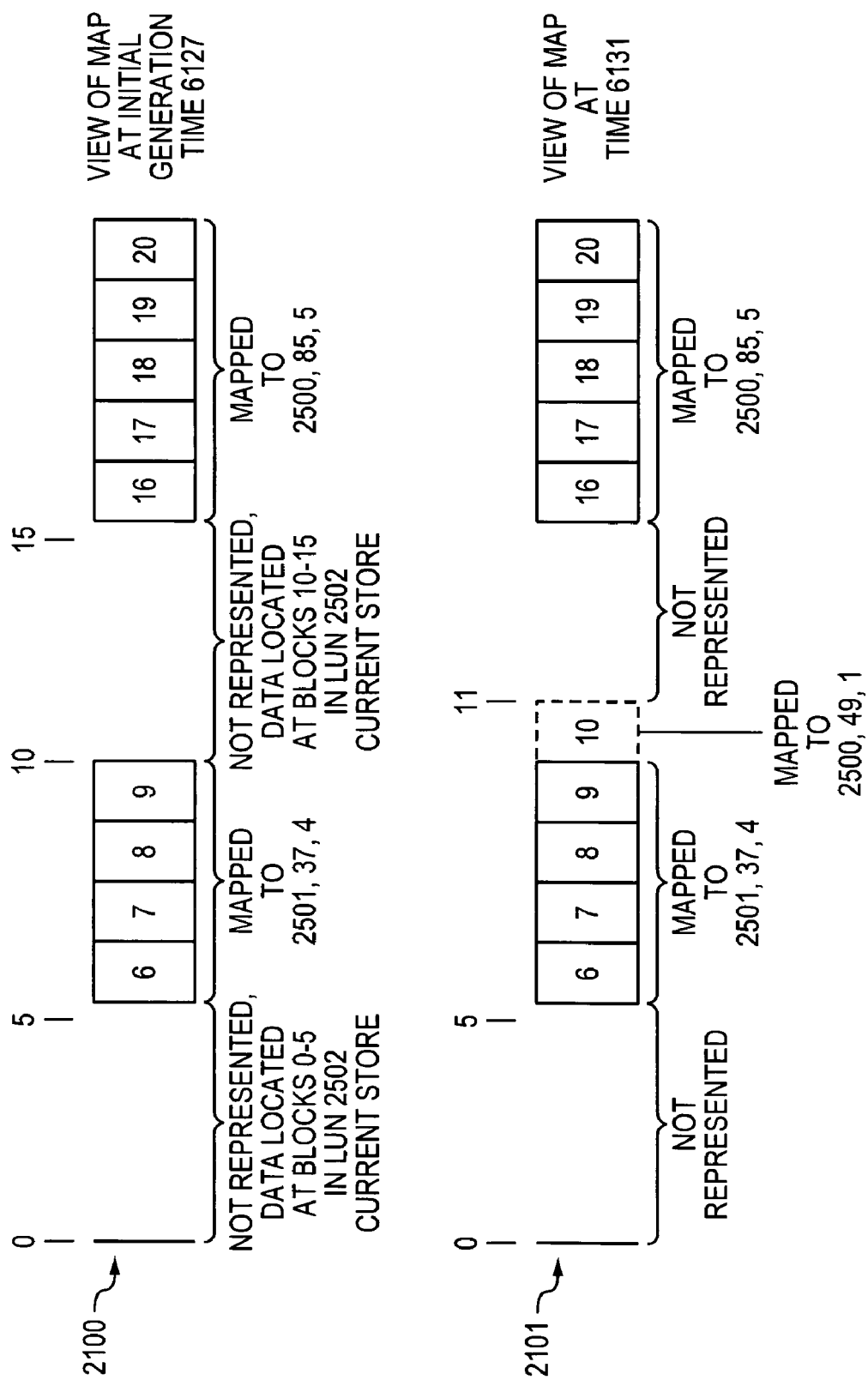
FIG. 28 depicts maps generated in accordance with an embodiment of the invention.

FIG. 28 illustrates two simplified, exemplary maps 2100, 2101 generated by the mapping module 1997 from the records 2010 stored by the indexing module 1995 in index 2009. The maps demonstrate how the information provided by the records 2010 is employed by the mapping module 1997 to map the locations of data that were stored in a data store at a specified past time. The maps are directed to 20 units of storage in a data store, for ease of explanation. The storage management device 1938 can be used with any size data store, or any number of data store, and so it should be understood that a data management system that employs the storage management device 1938 would not be limited to a single data store of 20 units of storage as in this demonstrative example.

In general, maps 2100, 2101 are generated for a specified past time and are shown at a generation time. To accurately reflect write requests that occur following the map's initial generation, a map may be regenerated or modified following its initial generation. Herein, the term "initial generation time" refers to the time when the map is first created. The term "generation time" refers to the points in time, following the initial generation time, at which the map is updated. Map 2100 is a view of the map at the initial generation time t=6127. The map 2100 is created in response to the receiver 1961 receiving a request for an image of the data store at the specified past time of t=6106. In the approach shown in FIG. 28, the maps 2100, 2101 only include information concerning units of storage that have been the subject of a write request since the specified past time. The data in the other units of storage can be located without mapping because such data still resides in the unit of storage into which it was originally written (i.e., the current store). Although not limited to this approach, such an implementation is advantageous because it allows for more rapid map generation and, as a result, more rapid image generation.

In one embodiment, the specification of the past time is supplied from the host at a request time and is received substantially simultaneously by the receiver 1961. In a version of this embodiment, the mapping module 1997 begins generating the map 2100 substantially simultaneously with the receipt of the request by the receiver 1961.

Referring to the times stored in the index 2009 of FIG. 27, write request 1287 occurred prior to the specified past time (t=6106). These location records 2010 are not of interest in generating map 2100 because, for example, the location of the past data associated with write-request 1287 was already overwritten as of the specified past time. However, mapping is employed for each write request that occurred after the specified past time and before the initial generation time (and in the case of updated maps, before the map generation time). For example, each of write-requests 1288 and 1290 occurred after the past time and before the initial generation time. Thus, the mapping module 1997 will use the records 2010 associated with write-requests 1288 and 1290 to generate the map 2100. Those write requests that occur after the generation time, of course, may not yet be in existence when the map 2100 is generated. This is true, for example, where the map 2100 is generated substantially simultaneously with the request, because in such situations, the write request has not yet occurred. However, as is described in greater detail below, the mapping module 1997 can update an existing map 2101 to reflect the processing of write requests (and associated copy-on-write operations) occurring after the initial generation time of the map.

In FIG. 28, map 2100 includes pointers to locations of past data for the units of storage that have been the subject of a write request since the specified past time t=6106. Thus, blocks 6-9 are mapped to blocks 37-40 of LUN 2501, and blocks 16-20 are mapped to blocks 85-89 of LUN 2500. The mapping module 1997 uses the information stored in the index 2009 (FIG. 27) to generate the map. In the embodiment shown in FIG. 28, the units of storage at blocks 0-5 and 10-15 are not included in the map because those units of storage have not been the target of a write command since the specified past time t=6106, and so they are still available directly from the current store.

A second map 2101 illustrates generally how a map can change over time to reflect the processing of write requests subsequent to the initial generation time. For example, a pointer is added to the map for those units of storage that are the target of the subsequent write request if the unit of storage had not previously been mapped. In this example, the map 2101 has a generation time of 6131 that reflects write request 1291. Write request 1291 affects blocks 7, 8, 9, and 10 in LUN 2502. Block 10, thus, provides an example of a location to which a map update applies. Block 10 represents the addition of a pointer that is required as a result of write-request 1291. The pointer reflects the fact that the data that was stored in Block 10 at the specified past time t=6106 has been moved, and is now stored in block 49 of LUN 2500. The remainder of the map 2101, including the mapping of blocks 6-9, remains unchanged from the first map 2100. The mapping of blocks 6-9 remains unaffected because although, at time t=6130, a copy-on-write operation was performed on blocks 6-9 it did not affect the location of the data that was stored in blocks 6-9 at the specified past time t=6106. That data remains stored in blocks 37-40 of LUN 2501.

The maps 2100 and 2101 can be stored in any structure that allows for efficient retrieval of the mapped data ranges. In one embodiment, maps 2100 and 2101 are stored in binary trees to allow for rapid identification of the blocks that are included in the map, and to locate the source (current location) of data for units of storage that have been overwritten since the specified past time. In another embodiment, maps are stored in B+trees. In versions of each of these embodiments, each node of the search tree includes a pointer that points to the data source for that range. Databases, files, and other structures could also be used to store the maps.

For ease of explanation, the second map 2101 is referred to as being generated at t=6131. It should be recognized, however, that map 2101 need not be newly generated in its entirety. Map 2101 can be newly generated, but it can also be the result of an update or modification to map 2100. Thus, map 2100 and map 2101 can exist separately and concurrently, or map 2101 can replace map 2100. Further, the storage management device 1938 can automatically generate map updates in response to write requests that are indexed after the initial generation times. Additionally, the preceding description concerning FIGS. 26-28 describes the use of a single target LUN for storing the data included in a data store. Again, it should be understood that a data store can in some implementations include data on a plurality of LUNs that are the target of write requests, store past data, or a combination thereof. In addition, the data store can include a time store and a current store that each includes data stored on multiple LUNs.

In one embodiment, the storage management device 1938 begins to process the map where the image at the specified past time is requested. Generating the map can be time-consuming, however, and so in one embodiment, the storage management device 1938 uses the map to respond to requests for units of storage that are included in the map, and searches the index 2009 for locations of units of storage that are not included in the map. If the units of storage are included in an index record 2010, the information is included in the map for future reference. If the units of storage are not included in the index, a notation can be made in the map as well.

When the map is complete, such that all appropriate index records 2010 have been added to the map, the storage management device 1938 no longer need consult the index 2009, and can refer only to the map. Likewise, explicit entries in the map indicating that data is in the current store can be removed from the map, making it more efficient.

In another embodiment, a flag or other indicator is used to identify a completed map. In a version of this embodiment, until the map 2100 is built, the index 2009 is used as the source for locations of data that will be used to generate the image. Once the map 2100 is completed, it is used as the source for locations of data that will be used to generate the image and the index is no longer used. In a version of this embodiment, notations are not made for units of storage not included in the map.

Systems for Processing I/O Requests

In general, additional aspects of the invention relate to systems and methods for processing I/O requests. In brief overview, in one embodiment of the invention, a system processes I/O requests directed to at least one logical unit of storage. The system includes an operation memory for storing a plurality of ordered sets of operations, each set associated with an I/O request. The system also includes a processor in communication with the operation memory, for queuing the operations stored in the operation memory in a first queue or a second queue. The first queue and the second queue are in communication with the processor. The first queue is for queuing the operations based on an identification of a target logical unit. The second queue is for queuing the operations based on an operation type.

In general, in one embodiment, the first operation associated with a request is placed on a queue associated with one or more LUNs, or a portion of a LUN. The operation is queued on the LUN queue until there are no other operations in process for requests directed to overlapping units of storage as the queued request is directed to (overlapping, for example, can be where two requests are directed to one or more of the same units of storage). In other words, in this embodiment, an operation is taken off of a LUN queue and processed only if there are no operations for overlapping units of storage then in process. The first and remaining operations associated with the request can then be subsequently processed without concern as to overlap with other operations. Operations for multiple requests can be, for example, batch-processed for efficiency. Remaining operations are placed on operation-specific queues in order, to facilitate such batch processing. Thus, the two types of queues described facilitate processing of requests without address collisions.

Figure 29:
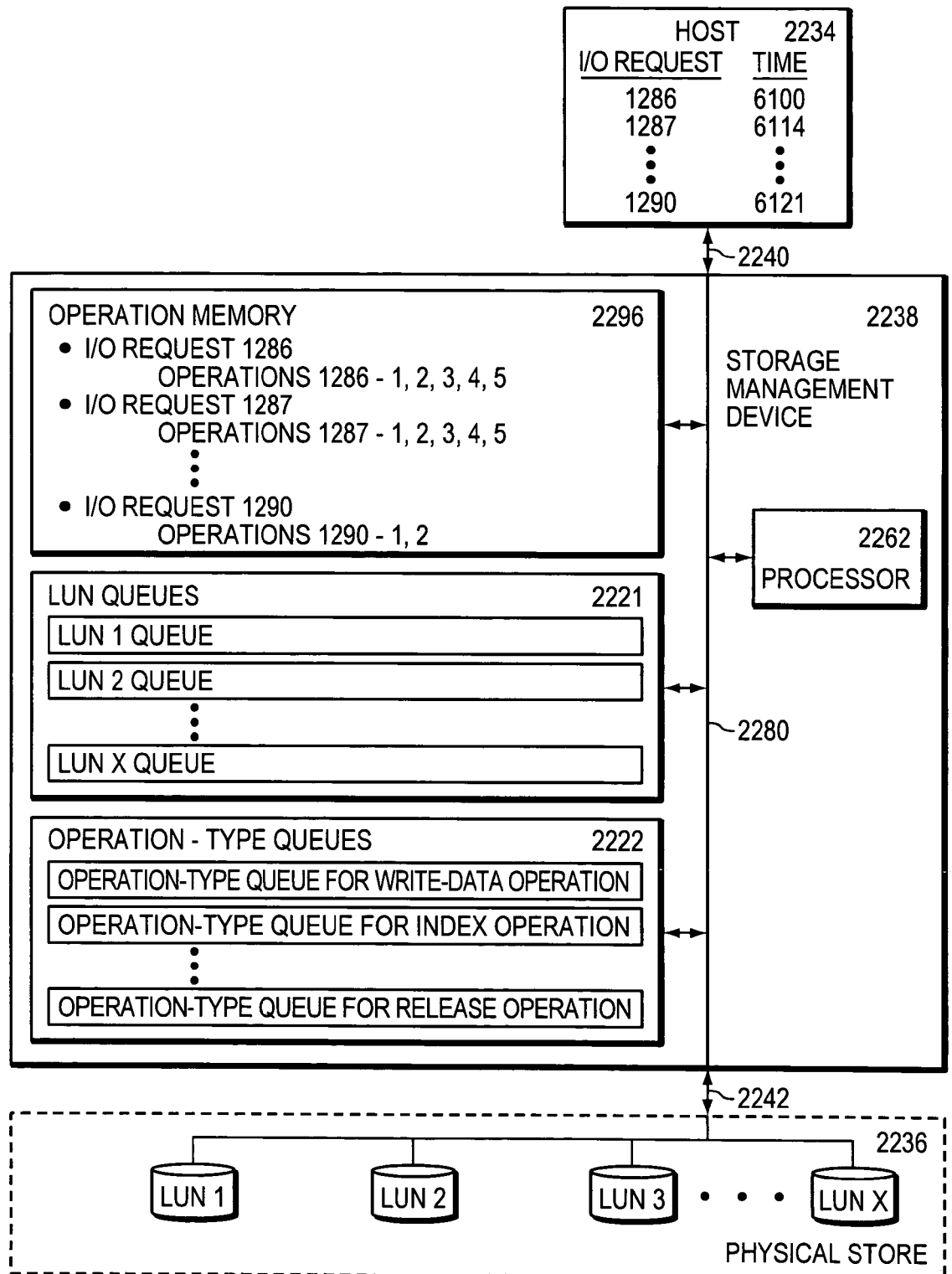
FIG. 29 is a block diagram of a system for processing I/O requests according to an embodiment of the invention.

FIG. 29 illustrates a system for processing I/O requests in accordance with this aspect of the invention. A host 2234 communicates with a physical store 2236 via a storage management device 2238. The physical store 2236 can include one or more logical units ("LUNs"), for example, LUN 1 through LUN X. Data stored in these LUNs can be presented to the host 2234 via the storage management device 2238. The storage management device 2238 communicates with the host 2234 over a first communication link 2240. The storage management device 2238 communicates with the physical store 2236 over a second communication link 2242. As with the previously described aspects, the first communication link 2240 can be any sort of data communications link, such as a LAN, storage network or bus including a Fiber Channel and Small Computer Systems Interface ("SCSI"). Ethernet (e.g., Gigabit Ethernet) and wireless communication are other possibilities for the first communication link 2240. In one embodiment, the storage management device communicates SCSI protocol at the logical layer, and is able to communicate using one or more of a variety of physical layers, including SCSI bus, Fiber Channel, Fiber Channel 2, or iSCSI over Ethernet. In response to the host 2234 I/O requests, over the communication link 2240, the storage management device 2238 acts as if it was the physical store 2236. The host's 2234 I/O requests can include both read and write requests to units of storage.

Upon receipt of an I/O request from the host 2234, the storage management device 2238 generates an ordered set of operations that are processed, in order, to execute the I/O request. In one embodiment, for example, a write request directed to a unit of storage results in an ordered set of five operations including: 1) reading the existing data stored in the target unit of storage; 2) writing the existing data to another location; 3) indexing the operation performed in step 2; 4) writing new data to the target unit of storage; and 5) releasing the write request, e.g., generating an acknowledgement that the write request is complete. Another example, is a read request that results in an ordered set of two operations. The first operation is reading the data stored in the target unit of storage, and the second step is releasing the read request. In other embodiments, the above-described I/O requests are modified to include additional operations that are advantageous for some system configurations. For example, a write request can include an operation directed to updating a time-map, as described above. In other embodiments, the number of operations associated with an I/O request may be reduced or re-ordered as part of an optimization.

The hardware and software architecture of the storage management device 2238 is advantageous for efficiently processing the ordered sets of operations. The storage management device 2238 includes an operation memory 2296, a processor 2262, LUN queues 2221 and operation-type queues 2222 that are in communication with one another over an internal network 2280. In one embodiment, the LUN queues 2221 include a separate queue for each of the corresponding LUNs included in the physical store 2236, e.g., LUN 1 through LUN X. The operation-type queues 2222 include separate queues for organizing operations based on the type of operation to be queued. For example, an indexing queue is used to store the index operations from a plurality of ordered sets. Additionally, the operation-type queues are not dedicated to a single LUN; therefore, the indexing queue, and other operation-type queues, can store operations directed to a plurality of LUNs. Functionally, in one embodiment, the first operation in each set of ordered operations is queued in the appropriate LUN queue. Operations subsequent to the first operation in each set of ordered operations are not queued in a LUN queue. Instead, the subsequent operations are queued in the operation-type queues.

Figure 30:
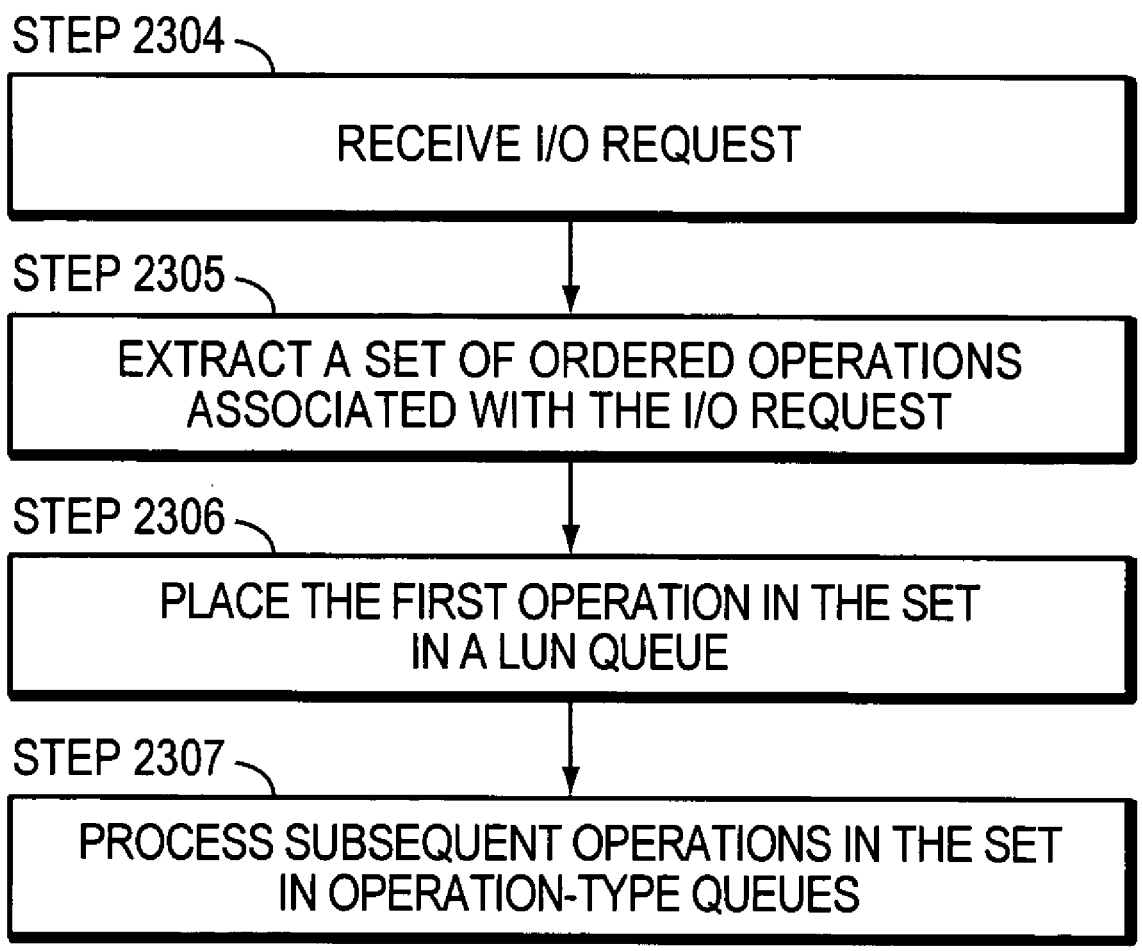
FIG. 30 is a flow diagram of an illustrative embodiment of a method for processing I/O requests in accordance with the invention.

FIG. 30 illustrates the general process employed by one embodiment of the system. In step 2304, the storage management device 2238 receives an I/O request from the host 2234. For example, in one embodiment, the host interface 361 (FIG. 10) receives the I/O request. In step 2305, the storage management device 2238 generates a set of ordered operations associated with the I/O request. Then, at step 2306, the first operation from the ordered set of operations is placed in the LUN queue responsible for the LUN that is the target of the received I/O request. The first operation is taken off of the queue and processed. At step 2307, subsequent operations in the ordered set are processed. In one embodiment, execution of these steps can be accomplished with the embodiments previously described herein. For example, generally, each of the steps can be executed in the processor modules 378 (FIG. 10). More specifically, in a version of this embodiment, the I/O manager 362 performs step 2305 and generates the ordered set of operations and the LUN queues and operation-type queues are implemented in memory 296 (FIG. 9) that may or may not be included in the I/O manager 362. In one embodiment, the operations of the ordered set that are subsequent to the first operation are stored in memory while the first operation is stored in the LUN queue. Once the first operation is processed, the second operation from the ordered set is pulled from memory and placed in the operation-type queue for the operation type that corresponds to the second operation. Once the second operation is processed, the third operation from the ordered set is pulled from memory and stored in the operation-type queue for the operation type that corresponds to it. The steps of pulling an operation from the operation memory 2296, storing it in the appropriate queue, processing the operation, and pulling the subsequent operation in the ordered set into an appropriate queue is repeated for each operation associated with the I/O request until all the operations generated by the I/O request are complete.

Referring now to FIG. 31, a table 2407 of entries 2410 that correspond to I/O requests is illustrated. Each entry includes the time that the storage management device 2238 received the I/O request, the identification of the I/O request, the identification of the target LUN (e.g., the LUN #), the logical block addresses (or other units of storage) affected by the I/O request (e.g., the target units of storage), the type of I/O request, and the set of ordered operations that were generated as a result of the I/O request. The storage management device 2238 is capable of processing the huge volumes of I/O requests associated with data storage systems of 1 terabyte or larger. The demonstrative table, however, presents a small set of information for purposes of explanation. Entries in the table 2407 cover a period of time, at least, from t=6100 to t=6130. Two types of I/O requests are include in the table 2407, i.e., a read request (1290) and write requests (1286, 1287, 1288, 1289, and 1291). However, the system can process a variety of I/O requests such as requests for a modification history. Additionally, I/O requests have been directed to two different LUNs during the time period covered by the table 2407, i.e., LUN 2502 and LUN 2503.

The table 2407 includes the set of ordered operations associated with each I/O request. The sets of operations appear in the columns labeled 1-5 in the order that they are processed. For example, I/O request 1288 is a write request which includes five ordered operations: 1) reading the existing data in the target unit of storage; 2) writing the existing data to another location; 3) indexing the operation performed in step 2; 4) writing the new data to the target unit of storage; and. 5) releasing the write request. In another embodiment, a write request includes a different set of ordered operations. For example, in systems where time maps are used, the write request can include six ordered operations: 1) reading the existing data in the target units of storage; 2) writing the existing data to another location; 3) indexing the operation performed in step 2; 4) writing the new data to the target unit of storage; 5) updating one or more time maps, if necessary; and 6) releasing the write request. Further, the quantity of ordered operations in an I/O request-type may be expanded by dividing one or more of the ordered operations into sub-operations. For example, operation 5 of the immediately preceding ordered set could be divided into one operation directed to determining whether a time map has previously been generated, and another operation directed to the map update. Additionally, the steps can be performed out of order, for example, as described herein with reference to the optimizations.

Figure 32:
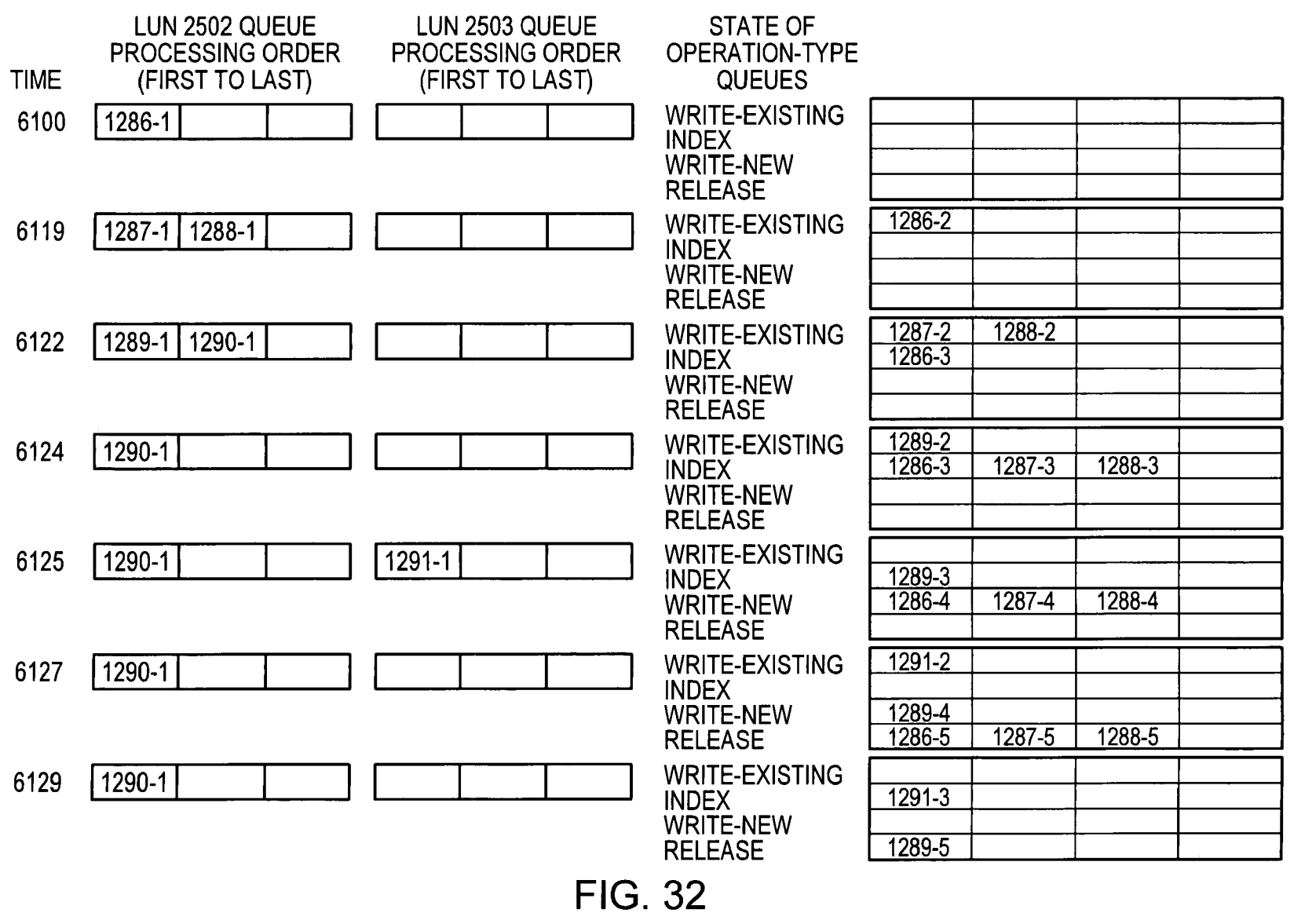

FIG. 32 provides a simplified diagram that will now be used to explain the operation of a storage management device 2238 which includes LUN queues and operation-type queues through use of the simplified example of FIG. 31. The data in the table of FIG. 32 corresponds to the information in table 2407 of FIG. 31. Information in the leftmost column represents the time that the storage management device 2238 received an associated I/O request. The columns labeled LUN 2502 and LUN 2503 represent two LUN queues. The right half of the FIG. 32 depicts the operation-type queues. Four types of operation-type queues are shown: 1) a queue for operations which write the existing data from the target units of storage to another location (these queues are also referred to as "write-existing" queues); 2) an index queue for queuing the operations that record the location resulting from completion of the preceding write operation; 3) a write new data queue for queuing operations which write the new data to the target units of storage; and 4) a release queue for queuing operations that indicate that the preceding operations in the ordered set were completed.

The contents of the queues represent individual operations from the ordered sets of operations shown in table 2407. Each operation is represented by the identification of the I/O request that generated it and, to the right of the hyphen, the number of the place the operation holds in the ordered set that it is a part of. Thus, the fourth operation in an ordered set of operations generated from I/O request 1286 (i.e., the write new data operation) appears as 1286-4 in FIG. 32. As a further example, the first operation in the order set of operations generated as a result of I/O request 1288 is represented as 1288-1.

At time t=6100, I/O request 1286 is received by storage management device 2238. The storage management device 2238 generates an ordered set of operations as a result of I/O request 1286 (i.e., 1286-1, 1286-2, 1286-3, 1286-4, and 1286-5) corresponding to the set of operations shown at t=6100 in FIG. 31. The operations from the ordered set are stored in operation memory 2296. Beginning with the first operation in the ordered set, each of the operations of the ordered set are moved into a queue, one at a time, and processed. Thus, at t=6100, operation 1286-1 is placed in the LUN 2502 queue while operations 1286-2, 1286-3, 1286-4, and 1286-5 are stored in operation memory 2296. The first operation (operation 1286-1) is stored in the LUN 2502 queue because I/O request 1286 is directed to LUN 2502.

The processing status of the storage management device 2238 is next viewed at t=6119 in FIG. 32. By this time, the storage management device 2238 has received two additional I/O requests, i.e., 1287 and 1288 (at t=6114 and t=6117, respectively). Also, operation 1286-1 (i.e., read data present in the target units of storage) has been processed. As a result, operation 1286-2 has been identified and stored in the write-existing queue. Because operation 1286-1 was processed, it is no longer stored in the LUN 2502 queue. However, both requests 1287 and 1288 are directed to LUN 2502. Therefore, the LUN 2502 queue now includes the first operation from each of these two pending I/O requests. These two operations will be executed in the order in which they were received by the storage management device 2238, i.e., 1287-1 followed by 1288-1 so long as there are no requests in process for overlapping units of storage.

The storage management device 2238 can include such search trees, algorithms and other systems and methods, described in greater detail herein, to process the I/O requests efficiently and accurately. In one embodiment, the storage management device 2238 uses an overlap detection process to determine whether a newly-received I/O request is targeting any units of storage which are also the target of one or more I/O requests that are currently being processed. If so, the first operation of the newly-received I/O request in the ordered set will be kept in the appropriate LUN queue until all the operations of the preceding I/O requests are processed. However, where, as here, the newly-received I/O requests (i.e., 1287 and 1288) do not target any of the same target units of storage as the previously-received I/O request(s) (e.g., 1286), the storage management device 2238 can process, together, the operations subsequent to the first operation in a plurality of ordered sets (e.g., 1286, 1287, and 1288). To facilitate the previously described processing, the storage management device 2238 can include systems and methods, described in greater detail herein, to batch process the operations that are queued in the operation-type queues. Thus, operations can be held in the operation-type queues until they are joined in the queue by other operations of the same type in order to increase the overall processing speed and efficiency of the storage management device 2238.

At time t=6122, the storage management device 2238 has processed operation 1286-2 (write existing data), determined that requests 1286, 1287, and 1288 are directed to non-overlapping portions of target LUN 2502, sequentially processed operations 1287-1 and 1288-1, and received two more I/O requests (i.e., 1289 and 1290). The first operation from each of the newly-received I/O requests (i.e., 1289-1 and 1290-1) is stored in the LUN 2502 queue. Operations 1287-1 and 1288-1 were removed from the LUN queue when they were processed. Operation 1286-2 has been removed from the write-existing queue and operation 1286-3 has been pulled from the operation memory 2296 and stored in the index queue. Similarly, operations 1287-2 and 1288-2 have been pulled from the operation memory 2296 and stored in the write-existing queue.

A view of the queues at t=6124 demonstrates a simplified example of the batch processing approach described above. Between t=6122 and t=6124, operations 1287-2 and 1288-2 were removed from the write-existing queue and processed together. As a result, operations 1287-3 and 1288-3 are pulled from the operation memory 2296 and stored in the index queue where they join operation 1286-3, which is not yet processed. Regarding the operations in the LUN queues, operation 1289-1 was processed, and as a result, operation 1289-2 was pulled from operation memory 2296 and stored in the write-existing queue. However, because there is overlap in the units of storage that are the target of I/O requests 1289 and 1290 (i.e., blocks 26-28 as listed in FIG. 31), operation 1290-1 will not be processed until all the operations of I/O request 1289 are processed. In the meantime, operation 1290-1 will remain in the LUN 2502 queue, and operations 1290-2, 1290-3, 1290-4, and 1290-5 will remain in the operation memory 2296.

The three operations in the index queue (i.e., 1286-3, 1287-3, and 1288-3) are now processed together. After the three index operations are complete, the corresponding write new data operations (i.e., 1286-4, 1287-4, and 1288-4, respectively) are pulled from the operation memory 2296 and are stored in the write-new queue at t=6125. Also at t=6125, I/O request 1291, directed to LUN 2503, is received by the storage management device 2238. The first operation from the ordered set generated as a result of request 1291 is stored in the LUN 2503 queue. Further, at t=6125, there are no other operations directed to LUN 2503 that are in queue; therefore, operation 1291-1 is stored as the first operation in the LUN 2503 queue. The subsequent operations (i.e., 1291-2, 1291-3, 1291-4, and 1291-5) are stored in the operation memory 2296. At this time, each of the two LUN queues shown in FIG. 32 includes a single operation. Although operation 1291-1 was received later in time, it can be processed before operation 1290-1 because there are no operations that precede 1291-1 in the LUN 2503 queue and, in this example, there are no operations for LUN 2503 in process. In contrast, operation 1290-1 will remain in queue until all of the operations associated with I/O request 1289 are complete (i.e., 1289-2, 1289-3, 1289-4, and 1289-5).

At time t=6127, operation 1291-1 has been processed as have each of the operations stored in the operation-type queues at t=6125. As a result of this processing, operations 1286-5, 1287-5 and 1288-5 are pulled from the operation memory 2296 and moved to the release queue. At this time, operations associated with I/O requests 1286, 1287, and 1288 are no longer stored in the operation memory 2296. Also, operation 1289-4 is pulled from the operation memory and stored in the write-new queue, and operation 1291-2 is pulled from the operation memory and stored in the write-existing queue. It should be understood from this example, that the operation-type queues can be used to service multiple LUNs. For example, operation 1291-2 can be processed (including batch processed) with operations directed to LUN 2502 or any other combination of LUNs that the storage management device 2238 is servicing.

By time t=6129, the first of the example I/O requests are completed. Release operations 1286-5, 1287-5, and 1288-5 are processed together. Each release operation provides a system acknowledgement that the associated I/O request is complete. Once a release operation is processed, the corresponding I/O request is complete and neither the LUN queues nor the operation-type queues store any operations associated with completed I/O request. As a result, at t=6129, the operation-type queues only include operation 1291-3 in the index queue, and 1289-5 in the release queue. Because the processing of I/O request 1289 is incomplete, operation 1290-1 remains in the LUN 2502 queue.

Figure 33:
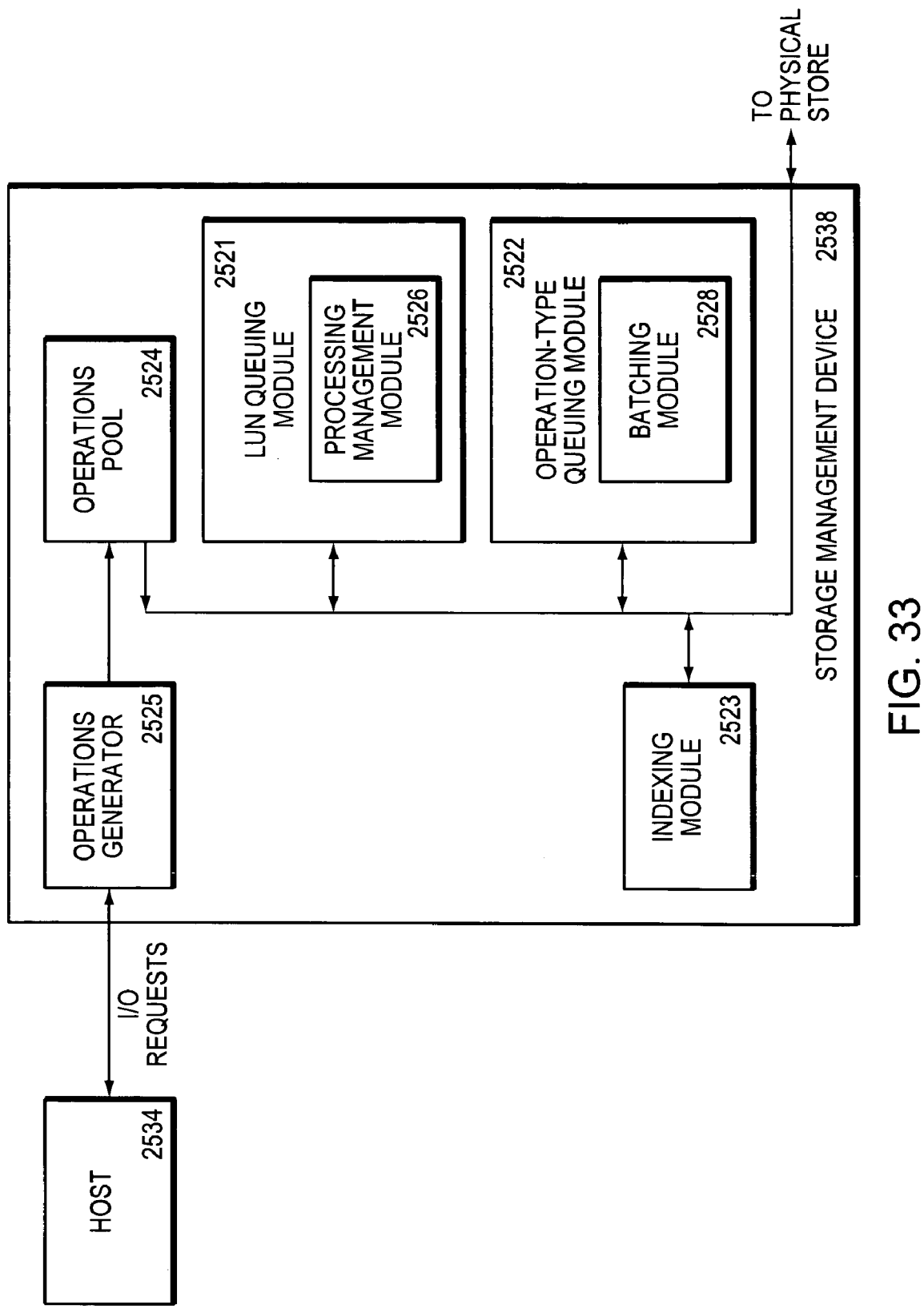
FIG. 33 is a block diagram of a system according to an embodiment of the invention.

Referring now to FIG. 33, in a functional depiction of system elements, storage management device 2538 includes an operations generator 2525. The operations generator 2525 receives I/O requests originating from the host 2534. As previously described, for each I/O request, a set of ordered operations is determined by the I/O request type. In one embodiment, the operations generator 2525 determines the I/O request type upon receiving the I/O request. Based on the I/O request type, the operations generator 2525 extracts a set of ordered operations from each I/O request that is received from the host 2534. In one embodiment, an operations generator 2525 is included in the processing modules 378 (FIG. 10) of the storage management device 2538. In a version of this embodiment, the operations generator is included in the target mode driver 382 of FIG. 10. The storage management device 2538 also includes an operations pool 2524 that stores each of the extracted operations prior to the operation being moved to a queue. In one embodiment, the operations pool 2524 is included in the operation memory 2296. In a version of this embodiment, the operation memory is included in the buffer 363 of FIG. 10.

The storage management device 2538 includes both a LUN queuing module 2521 and an operation-type queuing module 2522. The LUN queuing module 2521 receives the first operation, from each ordered set of operations, from the operations pool 2524 and stores it in the appropriate LUN where it is processed. In the embodiment shown in FIG. 33, the LUN queuing module 2521 includes a processing management module 2526. In one embodiment, in general, the processing management module 2526 manages the processing of the operations stored in the LUN queues. More specifically, the processing management module 2526 ensures that the operations stored in the LUN queues are processed in such a manner that when the subsequent operations in the ordered sets are pulled to the operation-type queues they are idempotent relative to any other operations stored in the operation-type queues. The processes used by the processing management module 2526 are described in greater detail elsewhere herein. However, in one embodiment, the processing management module 2526 employs a search tree data structure to organize the order of execution of the operations stored in the LUN queues 2221. In another embodiment, the processing management module employs a fairness algorithm to ensure that operations directed to LUNs that receive a low volume of I/O requests get processed in a timely manner. In a version of this embodiment, the processing management module 2526 monitors the amount of time that each pending operation is stored in a LUN queue.

The operation-type queuing module 2522 receives the operations subsequent to the first operation in each ordered set from the operations pool 2524 and stores them in the appropriate operation-type queue. The operation-type queuing module also includes a batching module 2528. The batching module 2528 can be used to optimize the processing of the operations stored in the operation-type queues. For example, two pending operations directed to adjacent units of storage can be processed in a single batch in order to reduce the quantity of read and write operations that must be performed by the physical store. Thus, in order to increase the overall processing speed, batching may involve delaying the processing of a pending operation until a larger batch is available.

The storage management device 2538 also includes an indexing module 2523. The indexing module 2523 generates a record of the location of data that is moved as a result of a copy-on-write operation. The indexing module 2523 can be included in the I/O manager 362 of FIG. 10. In one embodiment, an index queue (for example, as shown in FIG. 32) stores the operations that generate the creation of a record in the indexing module 2523.

Overlap Detection

A storage management device, implemented in accordance with at least some aspects of the disclosed technology, can improve the performance of an enterprise's information technology infrastructure by efficiently processing I/O requests directed to particular logical units of storage and/or parts thereof from host processors within the enterprise. In contrast to traditional storage interactions whereby requesting host processors (or processing threads) await completion of I/O requests to storage devices prior to moving on to other tasks, the disclosed technology enables a storage management device to acknowledge completion of I/O requests to host processors, where at least some of such I/O requests have not in fact been completed, but have rather been queued (based on, for example, their receipt time and on their targeted logical units of storage) and where a queued sequence of corresponding operations has been optimized so that execution of the operations minimizes the number of disk accesses and thus improves upon the performance of the enterprise's storage systems.

By way of non-limiting example of such an optimization, in response to receiving a write request directed at a particular location in a logical unit of storage followed by a read request directed at the same (or partially overlapping) location, a storage management device incorporating at least some aspects of the disclosed technology can determine that there is overlap between the requests, and hold the read request from execution until after the write request is complete. As another example, if overlap is detected, the read can be serviced before the write is complete, by using the data in temporary storage, for example, the stored data can be subsequently read from RAM (rather than from a relatively slow disk) thereby reducing the aggregate number of disk accesses.

Also, in some I/O request processing, such as that described elsewhere herein, the processing of I/O requests can be enhanced by limiting concurrent processing of I/O requests (e.g., other than as part of special optimizations) to I/O requests directed to non-overlapping units of storage (e.g., blocks). Such processing thus can be improved by efficiently determining whether there are I/O requests that are directed to overlapping units of storage, without, for example, review of all of the pending I/O requests, and using that information, determining whether a I/O request should be processed or queued. Thus, in addition to enabling optimizations as described above, a resource (such as a list, database, tree structure, linked list, or other resource) that efficiently provides information about the locations that are the targets of pending I/O requests can allow a storage management system to process I/O requests more efficiently, because the storage management system can restrict concurrent processing to I/O requests targeted to non-overlapping units of storage.

Figure 34:
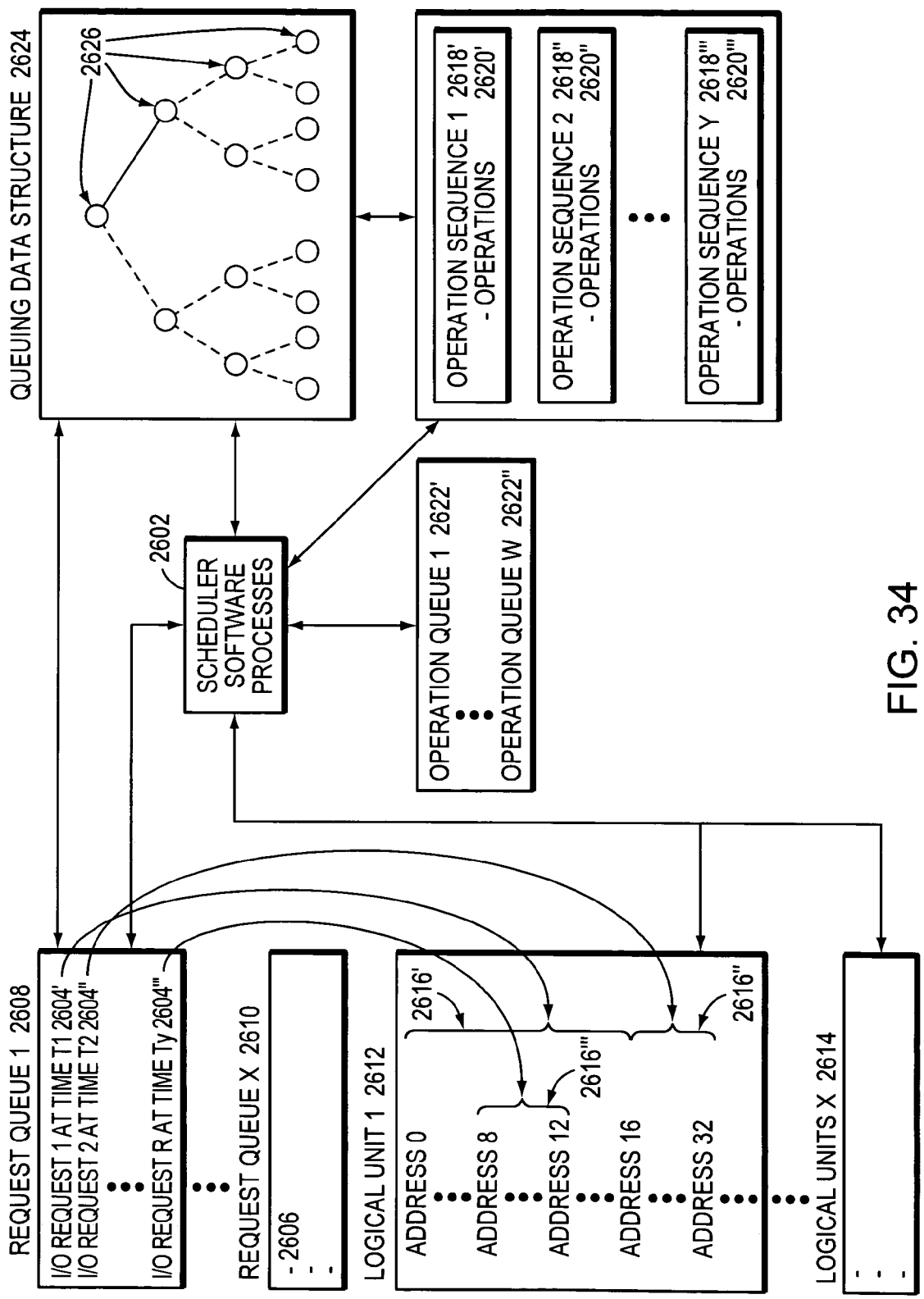
FIG. 34 is a block diagram of a system according to an embodiment of the invention.

With reference now to FIG. 34, an illustrative storage management device (not shown) can include one or more software processes 2602 (e.g., a scheduler software process) that receive and store I/O requests 2604, 2606 in request queues 2608, 2610 associated with particular logical units of storage 2612, 2614 or parts thereof targeted by such requests 2604, 2606. The I/O requests 2604 within a particular request queue 2608 are preferably organized to ensure that requests 2604 are processed (or positioned within the queue 2608) in the order in which they were received (e.g., I/O Request 1 2604' received at Time T1 is positioned ahead of I/O Request 2 2604" that was received at later Time T2). Request queues 2608, 2610 can also be configured, preferably, to store requests 2604, 2606 associated with particular logical units of storage 2612, 2614 or parts thereof. The I/O requests 2604 in a particular queue 2608 may be directed at various overlapping and/or non-overlapping address ranges in a logical unit of storage 2612. For example, an address range (Address 0 to Address 15) 2616' associated with an I/O request 2604' directed to a logical unit of storage 2612 may overlap another address range (Address 8 to Address 11) 2616''' associated with another I/O request 2604'''. Similarly, an address range (Address 0 to Address 15) 2616' associated with I/O request 2604' may be distinct from and thus not overlap an address range (Address 16 to Address 32) 2616" associated with another I/O request 2604".

The queued I/O requests 2604, 2606 can be further associated with one or more operation sequences 2618 that specify sequences in which certain operations 2620 should be performed in order to fulfill corresponding I/O requests 2604, 2606. The scheduler software process 2602 can organize the operations 2620 associated with the queued I/O requests 2604, 2606 in corresponding operation queues 2622 and can further execute such queued operations 2620 in a manner that optimizes the performance of the storage devices associated with the targeted logical units of storage 2612, 2614 (such as by, for example, minimizing disk accesses to such storage devices). In order to ensure that operations 2620 queued within one or more operation queues 2622 are executed in a manner that is consistent with the receipt time of the corresponding I/O requests 2604, 2606 and which results in performance optimizations, the scheduler software process 2602 can search a queuing data structure 2624 (e.g., a binary tree and/or other type of tree data structure) to determine whether the operations 2620 are associated with non-overlapping address ranges (e.g., 2616' and 2616") or whether one or more of the operations 2620 are associated with overlapping address ranges (e.g., 2616' and 2616'''). If the address ranges 2616 overlap, the scheduler software process 2602 splits one or more nodes 2626 within the binary tree 2624 so that each node 2626 is associated with non-overlapping address ranges.

In one illustrative embodiment, each node 2626 in a binary tree data structure 2624 that may be searched by a scheduler software process 2602 in accordance with at least some aspects of the disclosed technology may include: an identifier of a logical unit of storage 2612, a pointer to a list (e.g., a linked list) of I/O requests 2604, an identifier and/or pointer to one or more operation sequences 2618, identifiers and/or pointers to particular operations 2620 within the operation sequences 2618, a pointer to non-overlapping address ranges 2616 within the logical unit of storage 2612, a pointer to a parent node (if a parent node exists, otherwise to null), and/or pointers to child nodes (if child nodes exist, otherwise to null). The data and pointers associated with each node are used to form the relationships within the tree data structure 2624, as well as to facilitate searching and retrieval of relevant data by the scheduler software process 2602 when determining whether particular I/O requests 2604 and/or associated operations 2620 are directed to overlapping/non-overlapping address ranges 2616 within a logical unit of storage 2612 or parts thereof.

Figure 35:
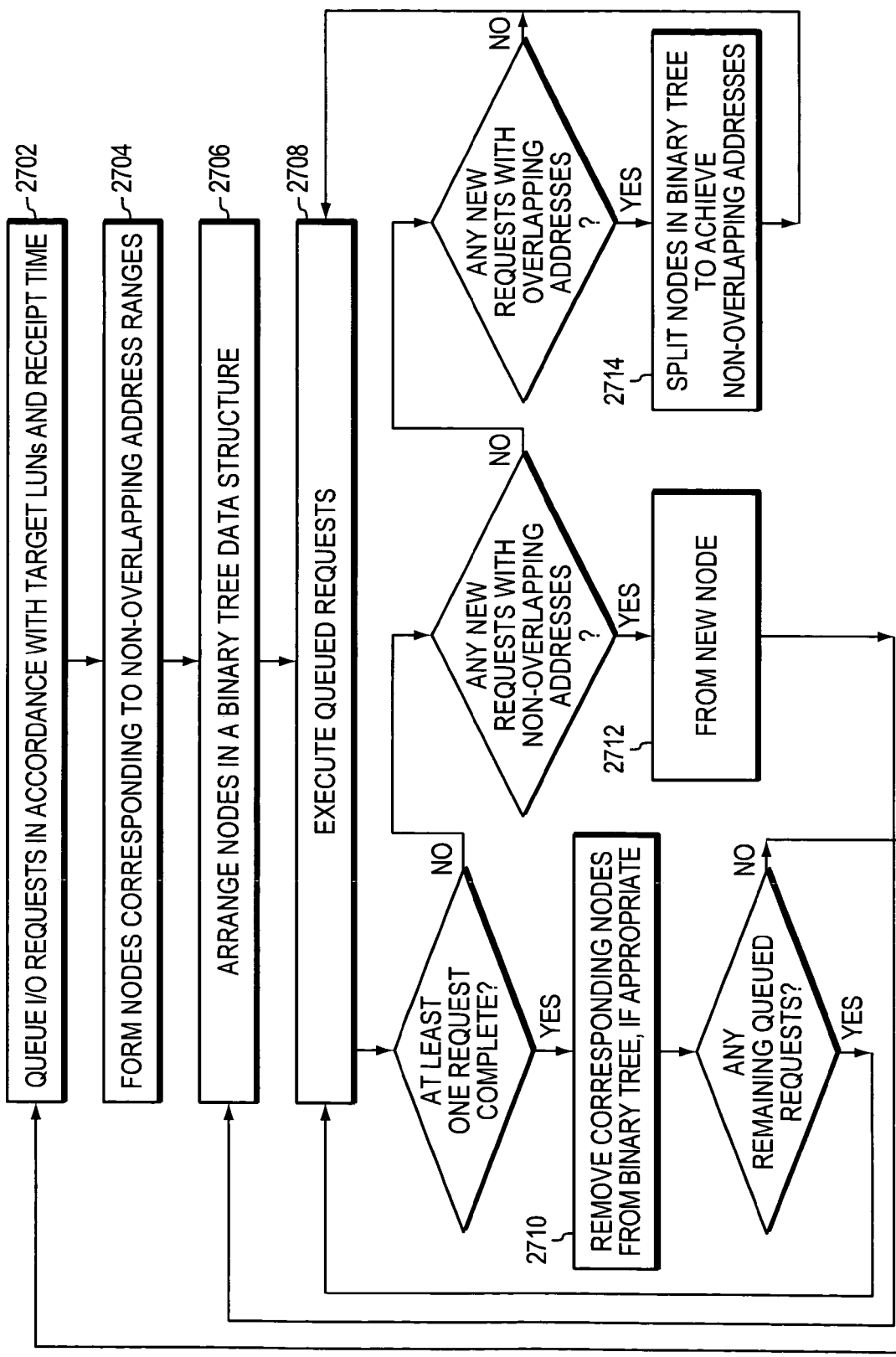
FIG. 35 is a block diagram of a method according to an embodiment of the invention.

In one illustrative operation and with reference now also to FIG. 35, a scheduler software process 2602 of a storage management device (not shown) receives I/O requests 2604, 2606 from one or more hosts directed to one or more logical units of storage or parts thereof 2612, 2614. The scheduler software process 2602 forms a request queue 2608 for each of the logical units of storage 2612, if such request queue 2608 does not already exist, and stores the I/O requests 2604 (or indicia associated therewith) targeted at such logical units of storage 2612 in accordance with the time that they were received (2702). The scheduler software process 2602 evaluates the queued I/O requests 2604 to obtain and/or form the data and pointers, discussed above, that are used to form the nodes 2626 of the queuing data structure 2624, such that each of the nodes 2626 are associated with non-overlapping address ranges 2616 (2704).

By way of non-limiting example, the scheduler software process 2602 can extract and/or form identifiers and/or pointers associated with one or more logical units of storage 2612, queued I/O requests 2604, operations 2620 and operation sequences 2618 associated with the I/O requests 2604, address ranges 2616 specified by the I/O requests 2604, and/or otherwise obtain any other information that is necessary or desirable to form the nodes 2626 of the binary tree data structure 2624. If two or more queued I/O requests 2604 are directed at overlapping address ranges 2616, the scheduler software process 2602 can form nodes 2626 that include corresponding non-overlapping address ranges. For example, if a first I/O request 2604' is directed at an address range 2616' (address 0 to 15) of a first logical unit 2612 and a second I/O request 2604''' is directed at an overlapping address range 2616" (address 8-12), then the scheduler 2602 can, for example, form three nodes whose associated address ranges do not overlap, i.e., a first node can be associated with addresses 0 to 7 (which is further associated with the first I/O request 2604'), a second node can be associated with addresses 8 to 12 (which is further associated with both the first and second I/O requests 2604', 2604'''), and a third node can be associated with addresses 13 to 15 (which is further associated with the first I/O request 2604'). In this manner, the scheduler 2602 ensures that each node corresponds to distinct non-overlapping address ranges within a logical unit of storage regardless of whether the I/O requests specify overlapping or non-overlapping address ranges. Once the nodes 2626 are formed, the scheduler 2602 arranges the nodes into a data structure 2624 (e.g., a binary tree) using, for example, parent and/or child pointers to other nodes, which may, but need not, exhibit substantially adjacent address ranges 2616 within a logical unit of storage 2612 (2706).

The scheduler 2602 can execute (2708) operations 2620 associated with the I/O requests 2604 by first searching the binary tree 2626 to confirm that no I/O requests with overlapping address ranges are contained within its nodes 2626 ahead of this request. Execution of the operations associated with the request can take place in stages, by queuing the operations in operation queues as described above. For example, a write operation associated with an I/O request can be executed, and another write operation directed to the same or overlapping address specified in a later-occurring I/O request can be executed after the first write operation is complete, such that the processing of the two requests occurs in an orderly manner.

In one embodiment, the operations 2620 queued by the scheduler 2602 are based on one or more batches of I/O requests 2604 that were received during particular time intervals. In another embodiment, the operations 2620 queued by the scheduler 2602 can occur in substantially real-time, as the I/O requests are received. In yet another embodiment, the scheduler 2602 may initially queue operations 2620 in a batch mode and then subsequently rearrange the operation queues 2620 based on I/O requests 2604 received in substantially real-time. Regardless of the particular queuing methodology implemented, the scheduler 2602 can maintain and update the binary tree data structure 2624 by adding, removing, and/or splitting nodes within the structure as corresponding I/O requests 2604 are added, processed, and/or removed. For example, the scheduler 2602 can remove one or more nodes 2626 from the binary tree 2624 if corresponding I/O requests are completed and such nodes are not further associated with other, as yet unperformed, I/O requests (2710). If a new I/O request is received and is not directed to an address that overlaps those already in the binary tree 2624, then the scheduler 2602 can expand the binary tree 2624 by forming a new node corresponding to the non-overlapping address of that new I/O request (2712) and can add such new node to the binary tree 2624, which may (but need not) subsequently result in a rearrangement of the operations within the operation queues 2622. If a new I/O request is received and is directed at addresses that overlap those already in the binary tree 2624, then the scheduler 2602 can split one or more of the existing nodes 2626 in the binary tree into multiple nodes to ensure that each node 2626 in the binary tree 2624 contains non-overlapping addresses (note that splitting nodes is faster than creating and integrating new nodes into the binary tree 2624) (2714).

In this manner, the binary tree 2624 remains substantially up-to-date and can support ongoing queuing operations by the scheduler 2602, particularly with respect to determining whether newly-received I/O requests are associated with addresses that overlap those of operations 2620 that may already be queued in one or more of the operation queues 2622. As new I/O requests are received, the scheduler 2602 can rapidly search through the nodes 2626 of the binary tree 2624 to determine whether there is any overlap in the address ranges specified by the new I/O request relative to the address ranges that are associated with already existing and/or already queued requests and/or operations. As previously discussed, operations associated with newly-received I/O requests with non-overlapping addresses relative to those in the binary tree 2624 can be queued without undue concern for executing such operation out of order, whereas overlapping addresses require more careful consideration to ensure that operations are performed in a proper order to avoid data corruption problems.

Figure 36A:
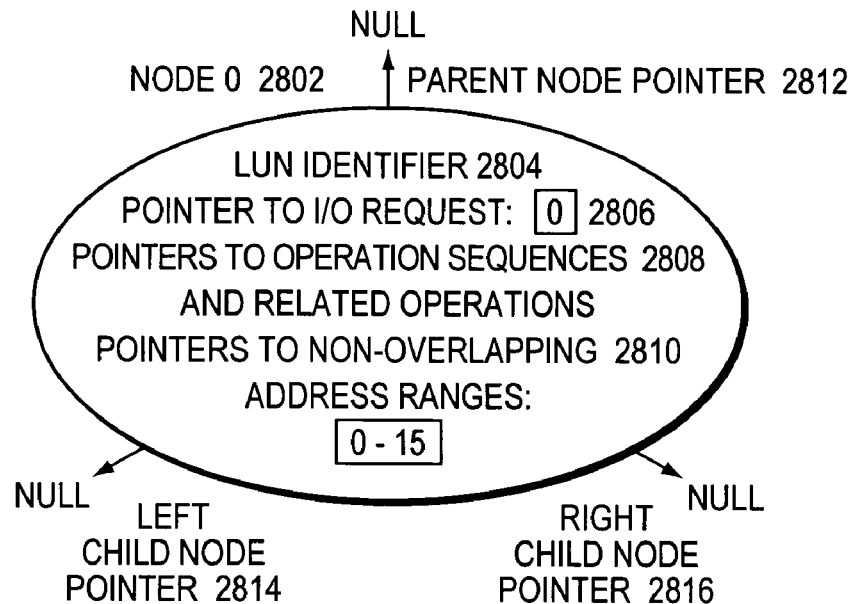
FIGS. 36A-36D depict an exemplary embodiment of a binary tree according to an embodiment of the invention.

With reference now also to the exemplary embodiment of a binary tree as illustrated in FIG. 36A, a scheduler software process 2602 can form a first node 2802 (i.e., Node 0) of a binary tree data structure 2624 (FIG. 34) by, for example, associating information pertaining to an I/O request that exhibits the earliest receipt time (i.e., I/O request 0) with the first node 2802. As above, the associated information may include the following: an identifier 2804 of a logical unit of storage targeted by the I/O request, one or more pointers 2806 to one or more I/O requests, one or more pointers 2808 to operations and/or operation sequences associated with the I/O requests, and/or one or more pointers 2810 to non-overlapping address ranges associated with the I/O requests. The node 2802 can also include a pointer 2812 to a parent node, if such parent node exists (otherwise to null), as well as, pointers 2814, 2816 to one or more child nodes, if such child nodes exist (otherwise to null). One of the child pointers 2814 may be subsequently redirected to a child node associated with a lesser address range, while the other child pointer 2816 may be redirected to a child node associated with a larger address range.

Figure 36B:
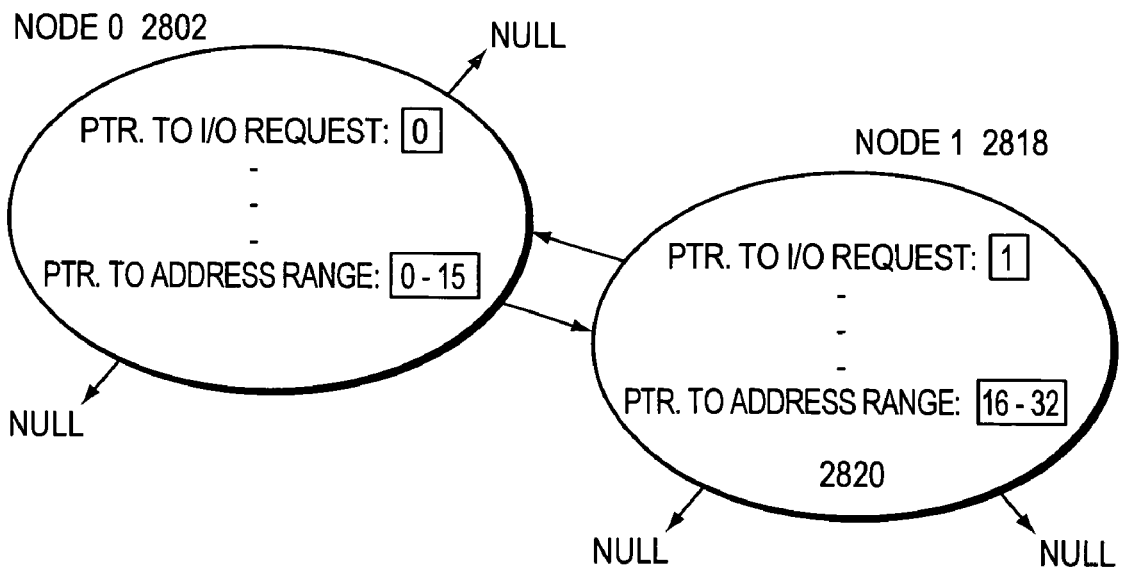

With reference now also to FIG. 36B, the scheduler 2802 can expand the binary tree by, for example, forming a new node 2818 associated with another, later-received, I/O request (i.e., I/O Request 1) that is directed at an address range 2820 (i.e., addresses 16-32) that does not overlap that of the existing node 2802 (i.e., addresses 0-15). In order to maintain the clarity of the figures, FIGS. 36B-36D do not repeat all of the information (previously described in connection with node 2802 in FIG. 36A) associated with the depicted nodes, but those skilled in the art will recognize that analogous information for each such node would exist.

Figure 36C:
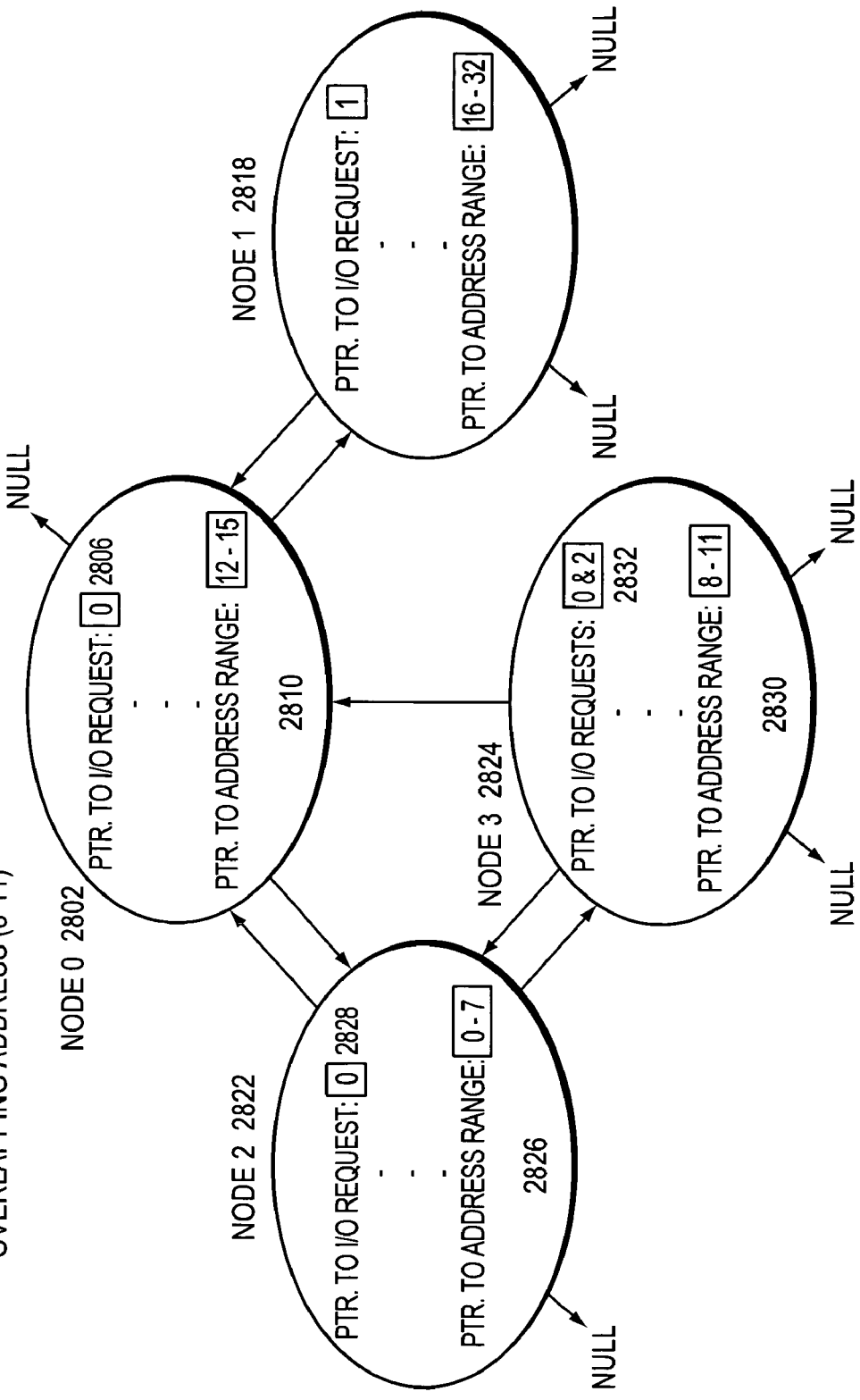

With reference now also to FIG. 36C, the scheduler 2602 can expand the binary tree by splitting one or more existing nodes 2802 in response to receiving a new I/O request that is directed at an address range (i.e., addresses 8-11) that overlaps the address ranges (i.e., addresses 0-15) associated with one or more of such existing nodes 2802, where each of the resulting nodes in the binary tree are organized such that they are associated with non-overlapping address ranges. For example, Node 0 2802 of FIG. 36B that was originally associated with addresses 0-15 can be split into two additional nodes 2822, 2824 (i.e., Nodes 2 and 3) whose address ranges (i.e., addresses 0-7 and 8-11, respectively) do not overlap the updated address range of Node 0 2802 (i.e., addresses 12-15). The pointers, identifiers, and/or other information associated with each of the nodes 2802, 2818, 2822, 2824 can be updated as necessary to reflect the updated tree structure. For example, the address range pointer 2810 in Node 0 2802 can be modified to point to address range 12-15 within a particular logical unit of storage, an address range pointer 2826 of Node 2 2822 can be formed and directed at address range 0-7 within the logical unit of storage, an I/O request pointer 2828 of Node 2 2822 can be formed and directed to a I/O request 0, an address range pointer 2830 in Node 3 2824 can be formed and directed at address range 8-11 within the logical unit of storage, and two I/O request pointers 2832 of Node 3 2824 can be formed and directed to a I/O Requests 0 and 2 (since both these requests are directed at addresses 8-11). Similarly, other node information, such as pointers and identifiers directed to associated operation sequences, operations, and/or parent or child nodes can be updated to form the updated binary tree data structure.

Figure 36D:
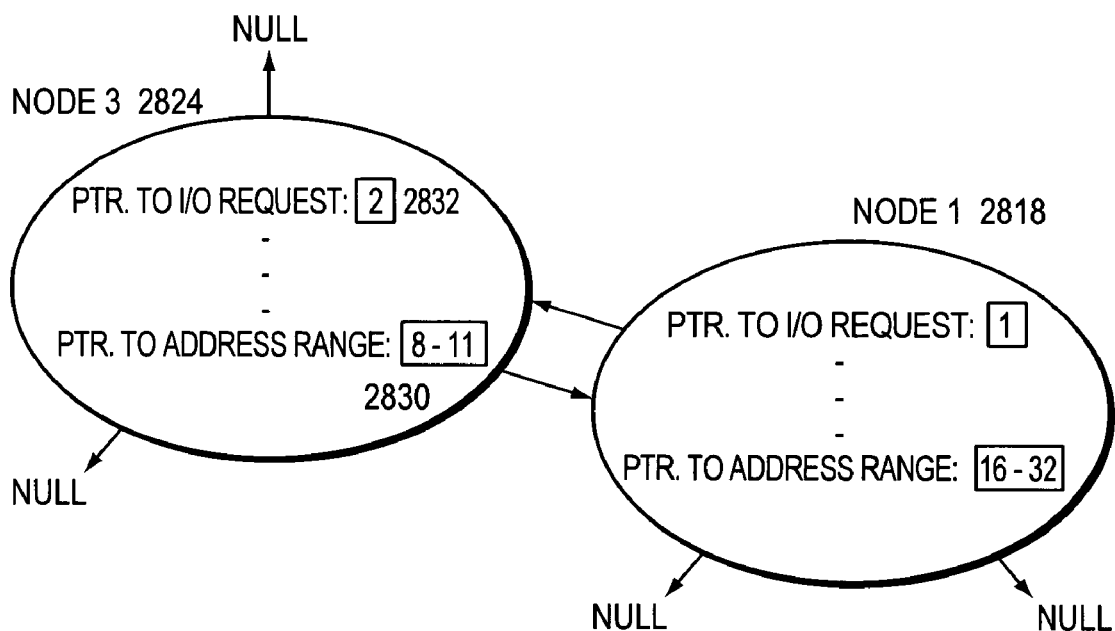

With reference now also to FIG. 36D, the scheduler 2602 can modify the binary tree by removing one or more nodes when a corresponding I/O request is completed. For example, Node 0 2802 and Node 2 2822 of FIG. 36C can be removed from the binary tree when I/O Request 0 is completed, since such nodes do not reference any other I/O requests (i.e., their I/O request pointers 2806, 2828 are directed only at I/O Request 0). The remaining nodes 2818, 2824 in the binary tree can be reorganized to reflect a new tree hierarchy and their associated information can be similarly updated to reflect their independence from the removed nodes 2802, 2822. For example, the I/O request pointers 2832 of Node 3 2824 can be updated to point only at I/O Request 2 and not at I/O Request 0, since I/O Request 0 has already been fulfilled, and the parent and child pointers of Nodes 1 and 3 2818, 2824 can be modified to reflect the new hierarchy of the binary tree.

Although the embodiments discussed above in connection with FIGS. 36A-36D are relatively simplistic to maintain the clarity of this disclosure, those skilled in the art will recognize that the disclosed technology can be applied to a large number of I/O requests that may exhibit various types of interactions affecting multiple logical units of storage, where each such logical unit of storage (or parts thereof) includes a set of nodes arranged in a distinct binary tree. As previously discussed, these binary trees enable one or more schedulers 2602 to quickly search the address range pointers of the binary tree for address ranges specified by newly-received I/O requests to ascertain whether any pending I/O requests, whose operations may be in process or queued for processing, overlap the address ranges of the newly-received I/O requests. The scheduler can thus use the search results to quickly determine whether it is possible to start execution of the operations associated with the request. For large number of requests, this efficiency can be beneficial for performance. The disclosed technology can also be applied to other types of queuing data structures and/or to other types of commands/requests.

Checkpointing

In one embodiment, the storage management device can be used to checkpoint copy-on-write operation sequences, and these checkpoints may be useful in real-time recovery from storage management device failures. For example, in a storage management device designed with redundancy, there may be one primary processing module assigned for processing I/O operations directed to a particular data store, and one or more secondary processing module that can complete processing of any in-process I/O operations of the primary processing module upon detection of an error or failure in the primary processing module. Embodiments of the disclosed technology enable such a secondary processing module, upon taking over for the primary processing module, information useful for successfully processing uncompleted I/O operations. At the same time, embodiments of the disclosed technology facilitate use of these checkpoints in a manner that is integrated with the storage of other transactional information, and lightweight and easy to communicate.

In addition, embodiments of the disclosed technology facilitate the use of processing optimizations by the primary processing module, because the secondary processing module need not be aware of any optimizations attempted by the primary processing module to successfully take the place of the primary processing module in the event of failure, and the secondary processing module can use the disclosed checkpointing information to determine what processing the secondary processor needs to complete for any outstanding I/O operations. This is particularly beneficial in a large system having multiple data stores in which there can be thousands, tens of thousands, or more, I/O transactions outstanding at any given time.

Figure 37:
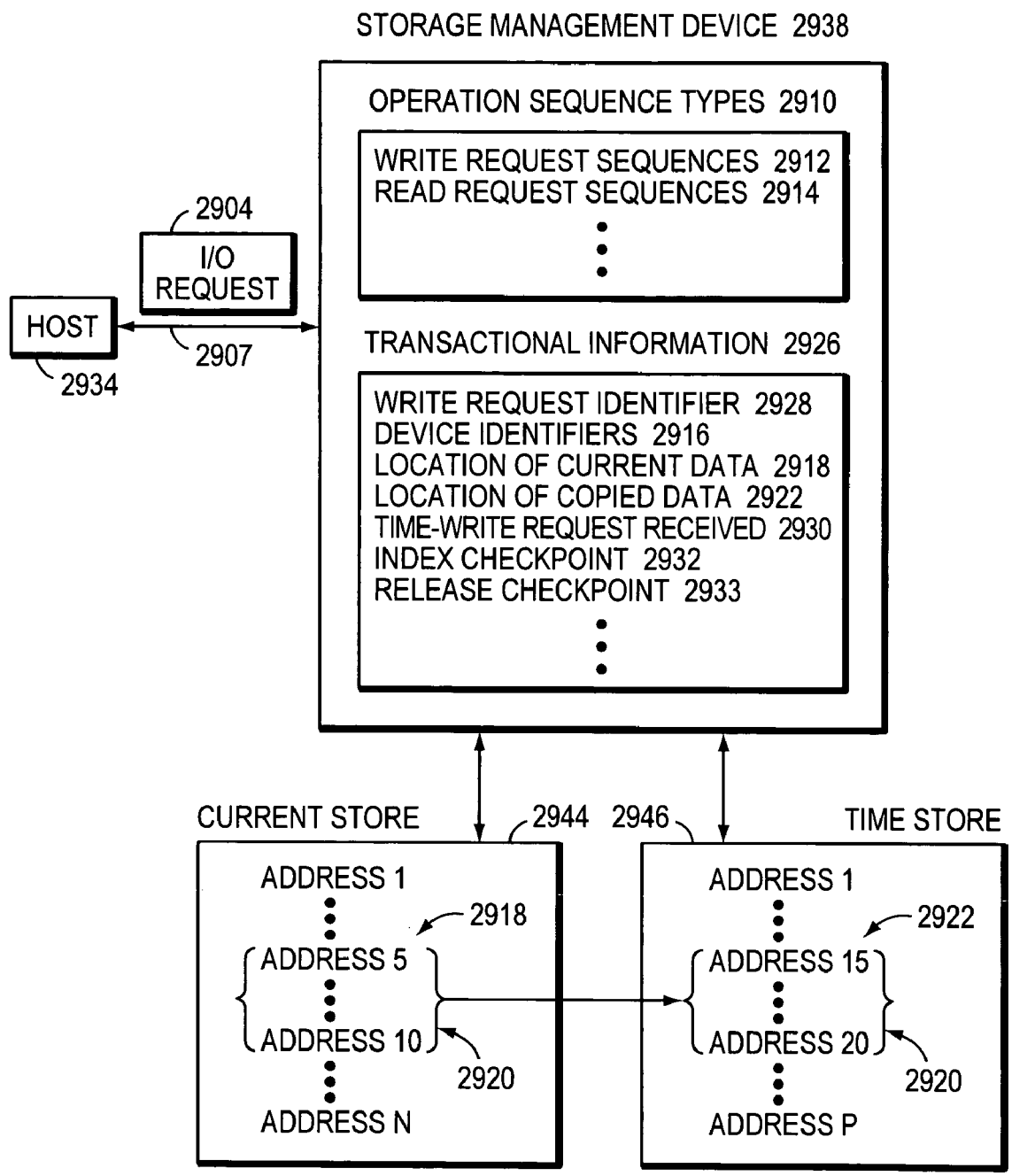
FIG. 37 depicts a block diagram of a storage management device according to an embodiment of the invention.
Figure 38:
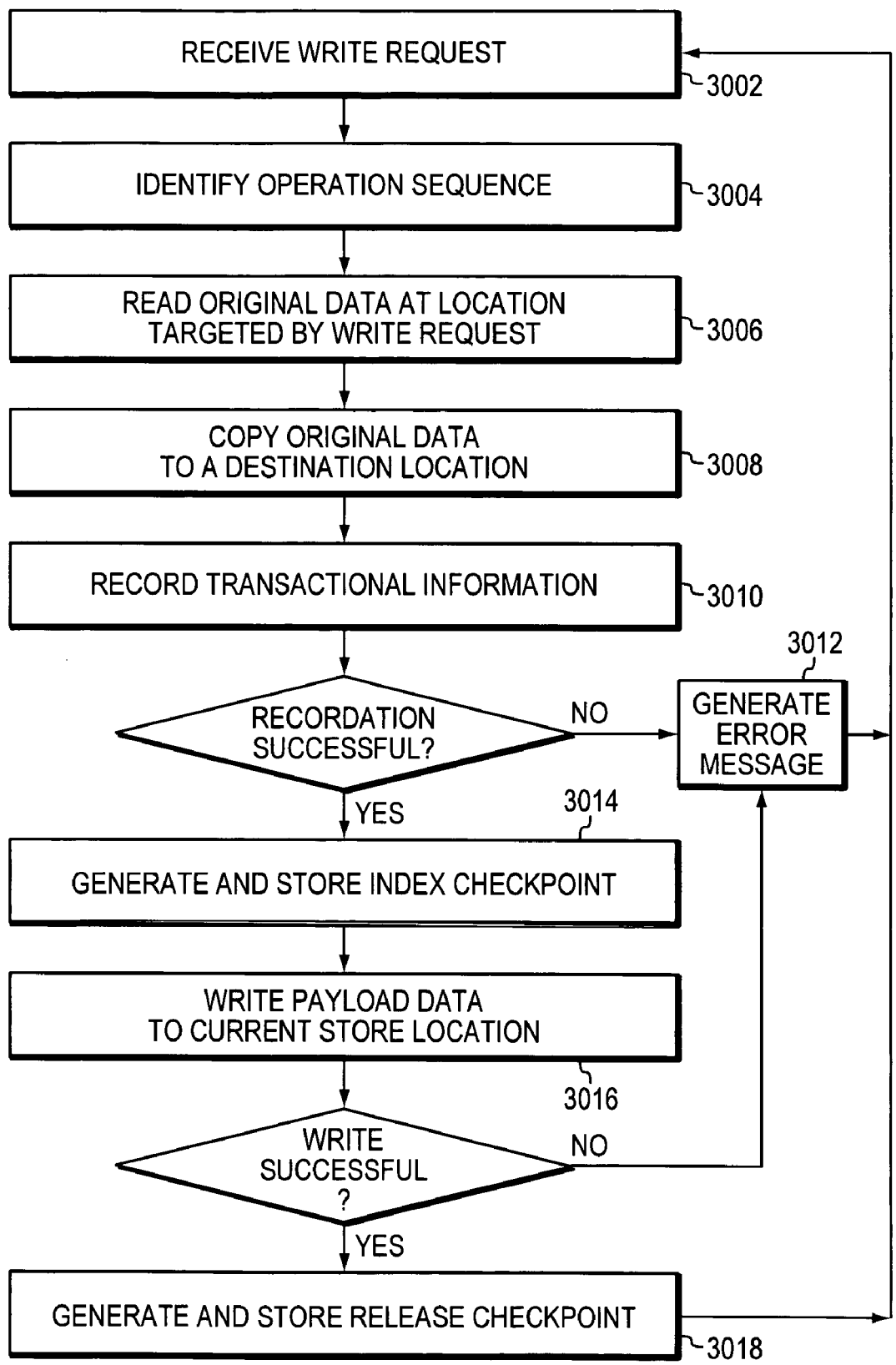
FIG. 38 depicts an exemplary method for checkpointing according to an embodiment of the invention.

In one illustrative embodiment and with reference to FIGS. 37 and 38, a storage management device 2938 can intercept/receive an I/O request 2904 (e.g., a write request, a read request, etc.) from a host 2934 that is targeted at a particular current store 2944 (3002) and can, in response thereto, identify a particular type of operation sequence from perhaps multiple such operation sequence types 2910 (e.g., write request sequences 2912, read request sequences 2914, etc.) that is associated with the I/O request 2904 (3004). By way of non-limiting example, an exemplary write request sequence 2912 can include the operations discussed below with respect to blocks 3006-3010 and 3014-3018 of FIG. 38.

The storage management device 2938 parses a write request 2904 to extract an identifier 2916 of a storage device, as well as, a location 2918 (including, for example, a particular beginning address and a data length) within the current store 2944 to which current data specified by and/or included with the write request 2904 is to be written. The storage management device 2938 reads data 2920 (referred to herein as "original data") stored within the current store 2944 at the location 2918 (3006) and copies such data 2920 to a destination location 2922 in a time store 2946 associated with a selected storage device (3008). Transactional information 2926 associated with the write request 2904 is recorded in one or more data structures, files, and/or databases (not shown) and may include, for example, device identifiers 2916 associated with the current store 2944 and/or time store 2946, a write request identifier 2928 that uniquely identifies the write request 2904, the locations 2918, 2922 within the current store 2944 and time store 2946 affected by the write request 2904, a time 2930 that the write request 2904 was received, and/or other types of information associated with the write request 2904 (3010). The transactional information 2926 can be recorded before, after, or at the same time as the copying of data 2920 to the destination location 2922.

If the original data 2920 is not successfully copied to the destination location 2922 and/or if the transactional information 2926 is not properly recorded, then the storage management device 2938 will generate an error message that may be communicated to a user of the storage management device 2938 and/or to other entities or software processes associated therewith (3012). Otherwise and upon a successful copy of data 2920 and recordation of transactional information 2926, the storage management device 2938 generates an indicator 2932 (referred to herein as an "index checkpoint"), which confirms that the data copy and transactional information recordation operations have completed successfully, and this index checkpoint 2932 is subsequently stored or recorded, for example, as part of the transactional information 2926 (3014).

Following the generation and storage of the index checkpoint 2932, the storage management device 2938 writes the current data (also referred to as "payload data") specified by the write request 2904 to the appropriate location 2918 within the current store 2944 (3016). If the current data is not successfully written, then an error message may be generated (3012). Otherwise, the storage management device 2938 generates an indicator 2933 (referred to herein as a "release checkpoint"), which confirms that the current data has been successfully written to the desired location 2918 in the current store 2944, and this release checkpoint 2933 is subsequently stored/recorded as part of the transactional information 2926 (3018). The index checkpoint 2932, release checkpoint 2933, and/or other transactional information 2926, can be generated for each write request and/or other type of storage transaction event and can thus be used to recover from storage transaction failures (e.g., power failures, hardware failures, data corruption events, etc.) with a granularity that enables data recovery, storage command queue regeneration/synchronization, and/or storage system reconfiguration to occur at a time that is, for example, substantially coincident with just prior to the occurrence of the storage transaction failure.

Index and release checkpoints 2932, 2933 can be used to enhance the fault tolerance of a storage system, particularly with respect to hardware failures and/or power failures that may affect a processor module or other type of device that writes to and/or reads from a storage unit. For example, fault tolerant systems that include a primary processor module and one or more standby processor modules can benefit from the disclosed technology in situations where the primary processor module fails and one of the standby processor modules assumes primary control over interactions affecting one or more storage units by enabling a storage command/operation queue within the standby processor module to be substantially identical with that of the primary processor module at a point in time just prior to or coincident with its failure. In this manner, the standby processor module can assume its responsibilities without having to re-execute commands or perform other operations, which may have been already performed by the primary processor module prior to its failure and which may not have been otherwise communicated to the standby processor module. The disclosed technology can also be used to replicate a history of queued I/O requests and/or associated operations for analysis or other purposes.

Figure 39:
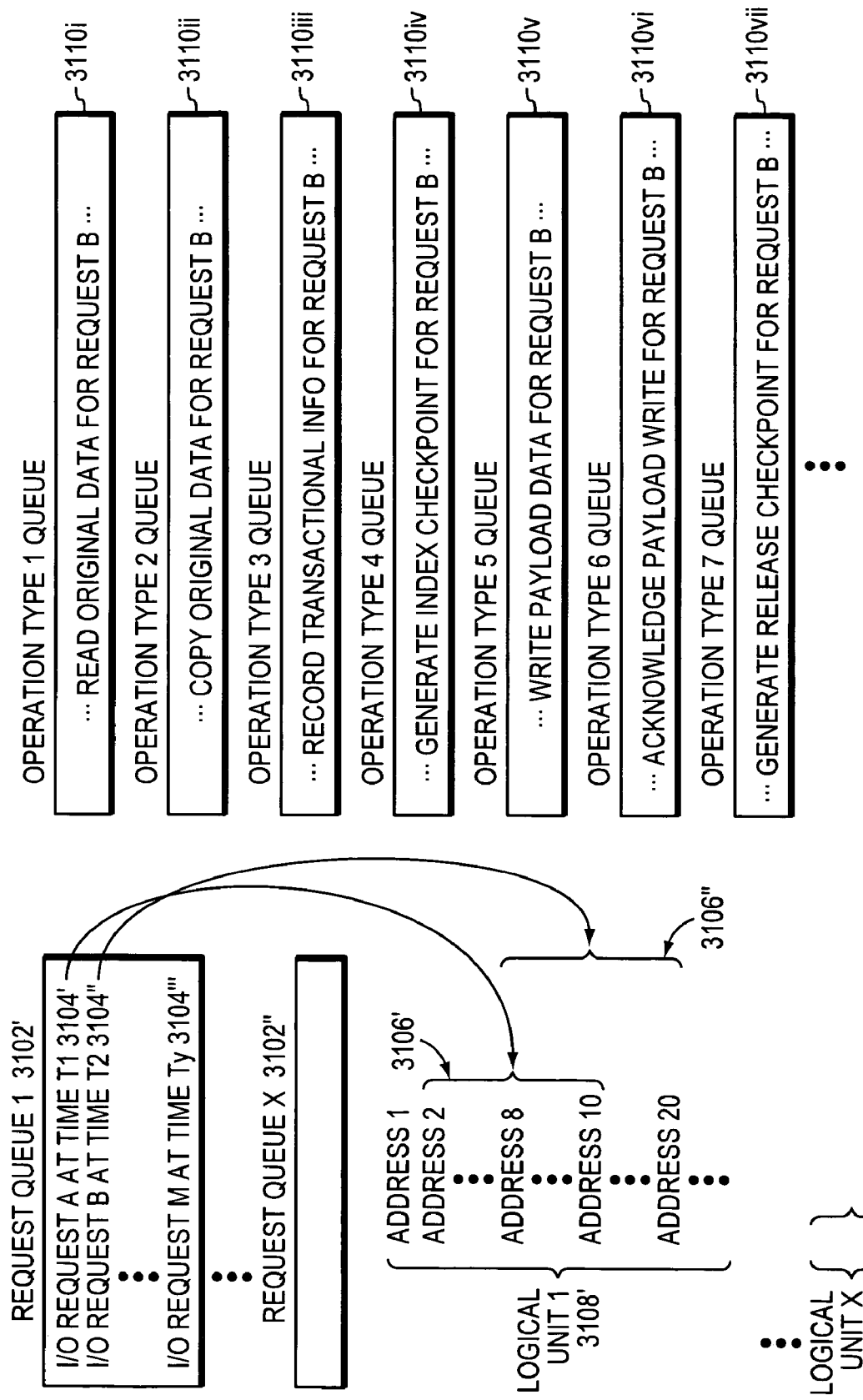
FIG. 39 depicts a block diagram of an exemplary embodiment of the invention.

In one illustrative embodiment and with reference now to FIG. 39, a standby processor module (not shown) can include one or more request queues 3102 containing, for example, I/O requests 3104 received at particular times and targeted at particular addresses and/or address ranges 3106 of one or more logical units of storage 3108. The I/O requests 3104 in a particular request queue 3102' may, but need not, be organized to affect the data stored at addresses in a particular logical unit 3108', while I/O requests in other request queues 3102" may be organized to affect data stored at addresses in a different logical unit 3108". The standby processor module can also include one or more operation type queues 3110 that may, for example, include operations associated with the I/O requests 3104 in one or more request queues 3102. Each operation queue 3110 may, but need not, contain only operations of a particular type. A first illustrative operation queue 3110$i$ may contain a number of operations where one or more of such operations are associated with I/O request 3104" (corresponding to, for example, a write request) and involve reading original data from a first address range 3106" of a logical unit of storage 3108' associated with a current store 2944 (FIG. 37). A second illustrative operation queue 3110$ii$ may contain a number of operations where one or more of such operations are associated with I/O request 3104" and involve copying original data from the first address range 3106" of the current store 2944 to a location in a time store 2946. A third illustrative operation queue 3110$iii$ may contain a number of operations where one or more of such operations are associated with I/O request 3104" and involve recording transactional information 2926 (FIG. 37). A fourth illustrative operation queue 3110$iv$ may contain a number of operations where one or more of such operations are associated with I/O request 3104" and involve generating an index checkpoint 2932. A fifth illustrative operation queue 3110$v$ may contain a number of operations where one or more of such operations are associated with I/O request 3104" and involve writing payload data to the address range 3106" of the logical unit 3108'. A sixth illustrative operation queue 3110$vi$ may contain a number of operations where one or more of such operations are associated with I/O request 3104" and involve acknowledging that the payload data was successfully written to the address range 3106" of the logical unit of storage 3108'. A seventh illustrative operation queue 3110$vii$ may contain a number of operations where one or more of such operations are associated with I/O request 3104" and involve generating a release checkpoint 2933.

Figure 40:
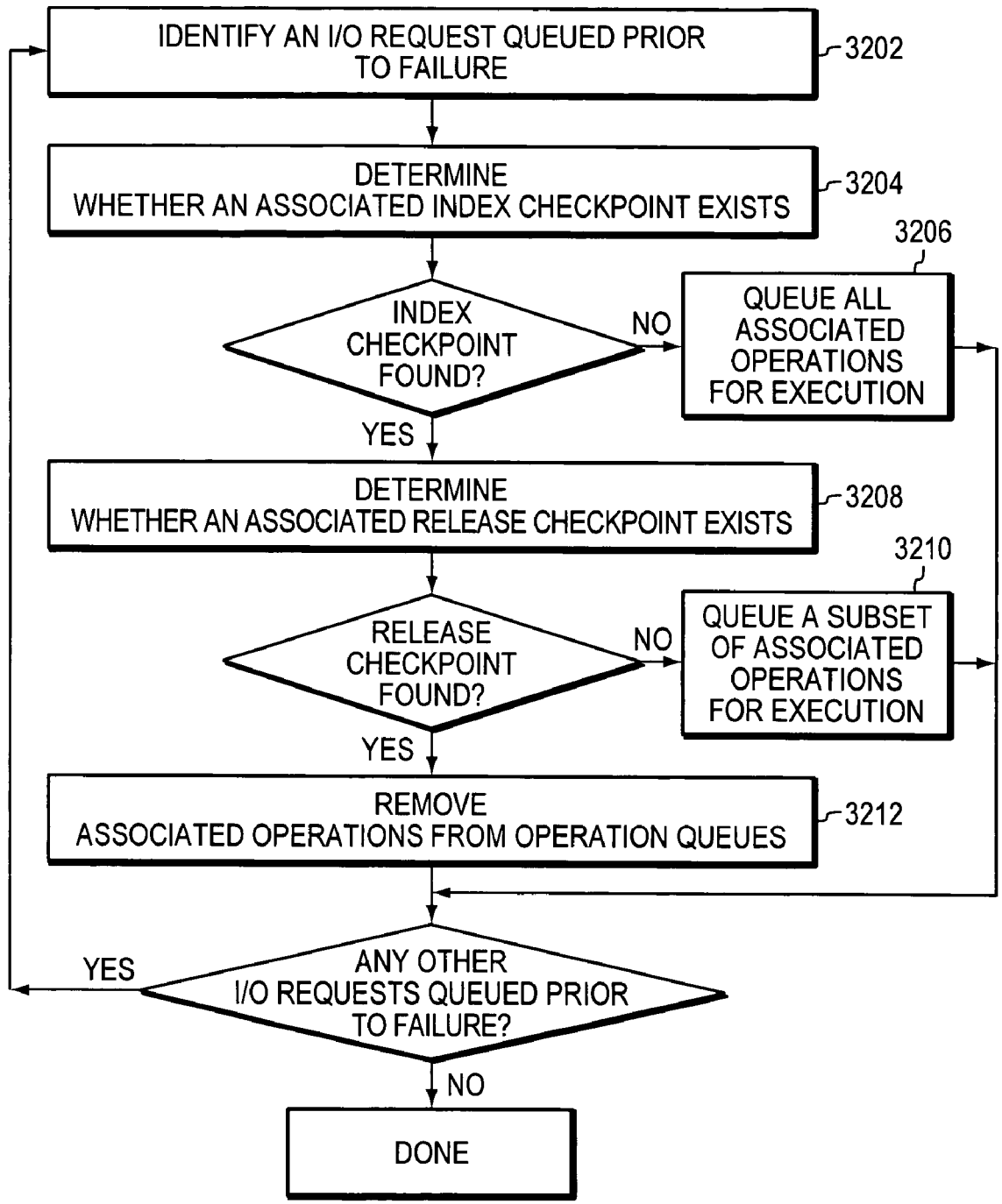
FIG. 40 depicts an exemplary method for checkpointing according to an embodiment of the invention.

In one illustrative recovery process that uses index checkpoints 2932 and/or release checkpoints 2933 to recover from a hardware/power failure and with reference now to FIGS. 39 and 40, a storage management device 2938, storage system administrator, and/or other type of entity tasked with monitoring and/or recovering from such failures can detect error messages and/or other types of error indicia, which are indicative of a hardware failure and/or power failure. In order to ensure that contents of the request queues 3102 and operation queues 3110 of a standby processor module conform to the content of corresponding queues of a now failed primary processor module, the storage management device 2938 can evaluate each of the I/O requests 3104 in its request queues 3102, based at least in part on corresponding index and/or release checkpoints 2932, 2933, to determine whether such I/O requests 3104 were previously fulfilled or partially fulfilled by the primary processor module prior to its failure. Upon making such determinations, the storage management device 2938 can modify the request queues 3102 and/or operation queues 3110 of the standby processor module so that they substantially conform to the I/O requests and associated operations that were queued in the primary processor module prior to its failure.

For example, the storage management device 2938 can search the request queues 3102 of the standby processor module to identify one or more I/O requests 3104 that were queued prior to a failure of the primary processor module (3202). For each of the identified I/O requests, the storage management device 2938 can determine whether an associated index checkpoint 2932 exists by, for example, searching for such index checkpoint 2932 in a data structure, file, database, and/or other type of data repository that is communicatively coupled to the storage management device 2938 (3204). In one embodiment, the checkpoints are recorded with other information about the write requests in the database storing the location of overwritten data and other information described above.

If an associated index checkpoint 2932 is not located (signifying in the case of a copy-on-write request that original data has not been successfully copied from a current store 2944 to a location within a time store 2946), then the storage management device 2938 can queue a complete set of operations associated with the I/O request 3104 within one or more of the operation queues 3110 of the standby processor module for subsequent execution (3206). Otherwise, the storage management device 2938 can determine whether an associated release checkpoint 2933 exists by, for example, searching for such release checkpoint 2933 in the aforementioned data repository (3208). If an associated release checkpoint 2933 is not located, then the storage management device 2938 can queue a subset of the operations associated with the I/O request 3104 within one or more of the operation queues 3110 of the standby processor module (3210). For example and in the case where the I/O request corresponds to a copy-on-write operation sequence, the subset of queued operations can include operations that write the payload data specified by the I/O request to a particular location within a logical unit of storage 3108, acknowledge that the payload data was successfully written, and/or generate a release checkpoint associated with such request. Otherwise and if the associated release checkpoint 2933 is located (signifying that the primary processor module completely fulfilled the I/O request prior to its failure), then the storage management device 2938 can remove the operations associated with such I/O request from the operation queues 3110 of the standby processor module (3212).

The aforementioned methodology can be repeated for each I/O request 3104 in the request queues 3102 of the standby processor module and thereby conforms the queues of the standby processor module to the corresponding queues of the now failed primary processor module. In this manner, the request and operation queues 3102, 3110 of the standby processor module are purged of outdated requests and operations, thereby minimizing, and perhaps entirely eliminating, the amount of unnecessary and/or otherwise undesirable operations that would otherwise need to be performed as a result of inconsistencies in the queues of the primary and standby processor modules upon a hardware/power failure event. Once the standby processor module's queues 3102, 3110 have been purged of undesirable operations and requests and/or loaded with desirable operations, as discussed above, the remaining operation sequences in such operation queues 3110 can be executed in accordance with the I/O request sequences in the request queues 3102. At this point, the hardware/power failure recovery effort has been completed and the standby processor module can resume normal queuing operations.

Those skilled in the art will recognize that the aforementioned methodology is merely illustrative and that a wide variety of analogous methods can be performed to produce substantially the same result. For example, the existence of an associated release checkpoint 2933 can be determined prior to determining the existence of an associated index checkpoint 2932.

Write Request Recordation for Enabling Map Generation

In general, in another aspect, the invention relates to methods and devices for recording write requests that are directed to a data store, which has associated with it a current store and a time store, and to methods and devices for enabling the generation of at least a portion of a time map of at least a portion of the data store (e.g., of the current store or some sub-portion thereof) for a past time. As mentioned above, a time map is a map that is generated at a present time and that has the current locations of data that was stored in at least one portion of the data store at a specified past point in time.

As also mentioned above, in one embodiment, a time map is generated by a computing device (e.g., a storage management device as described above) when, for example, a user requests at a present time an image of at least one portion of the data store (e.g., of the current store or some sub-portion thereof) at a past time. By generating the time map, the computing device eliminates the need, on each and every request for data covered by the image or a portion thereof, to search through an entire index for locations of old data. Rather, by referring to the time map, the computing device can quickly and efficiently determine the locations of the data stored in the at least one portion of the data store at the past time, and, therefore, quickly and efficiently respond to user requests. Accordingly, system efficiency is improved and user satisfaction increased.

While generating a time map improves upon the speed with which data stored in at least one portion of a data store at a past time can be accessed, the present aspect of the invention relates to methods and devices for recording write requests that are directed to the data store and that thereby improve upon the speed with which the time map itself can be generated. In addition, the present aspect of the invention facilitates the quick presentation of data stored in the data store at a past time, even if the time map is still being generated.

In one embodiment, upon a request for a prior image, a computing device begins to generate a time map. If, before the time map is complete, a user makes a request for data covered by a portion of the image and the data's location has not yet been entered into the time map, the system can search for the data quickly enough to provide a reasonable response time, even though the response will not be as fast as it would be if the time map were complete and used. As described herein, instead of searching through an entire index for the locations of the past data, only a portion, or portions, of the index need to be searched in order to respond to the user's request for the data covered by the portion of the image. The work done in generating this response (e.g., the determination of the data's location) can also be stored in the time map, such that the system's overall efficiency is improved.

Thus, in one embodiment, upon a request for creation of a prior image, a time map is generated, for example as a background process. If a request for data is directed to the prior image, but the location of the requested data is not yet indicated by the time map (e.g., the time map has not yet been fully generated), the techniques described herein are used to identify the location of the requested data, and to respond to the user's request for the data. The time map is then updated with the location of the requested data.

In brief overview, in one embodiment of this aspect of the invention, a first computing device (e.g., a storage management device as described above) receives multiple write requests from a second computing device (e.g., a host as described above). The first computing device stores a record of these write requests. In one embodiment, at least one first database table and a second database table are used to record information relating to the write requests and to track any changes effected by the write requests on the data store. More specifically, for each write request that is received, the first computing device records a write request entry in a first database table. The write request entry contains information relating to the received write request. Moreover, each time that a write request entry is recorded a first database table, the first computing device updates, if necessary, a record in a second database table. The data contained in the records of the second database table represents in summary form the write requests directed to the data store. In one embodiment, for example, the data contained in the records of the second database table specifies the particular units of storage in the data store that were overwritten as a result of implementing the write requests.

According to one feature of this aspect of the invention, the first computing device is able to rapidly and efficiently interpret the data stored in the records of the second database table to determine which particular units of storage have been overwritten. Moreover, in one embodiment, given a particular past point in time, and charged with the task of generating a time map, the first computing device is able to interpret the data stored in the records of the second database table to identify a subset of a plurality of first database tables to search for write request entries that are relevant to the generation of the time map. In other words, in one embodiment, the invention eliminates the need for the first computing device to search through all first database tables and through all write request entries when generating a time map. Accordingly, overall efficiency is improved, and rapid generation of the time map is made possible.

Additionally, in another embodiment, if, before the time map is complete, a user makes a request for data stored in the data store at the past time, whose current location is not yet indicated by the time map but would be if the time map were complete, the first computing device is still able to rapidly and efficiently identify the location of the data, without having to search through all of the first database tables, and to respond to the user. The work done in generating this response, moreover, may be used in completing the time map.

Figure 41:
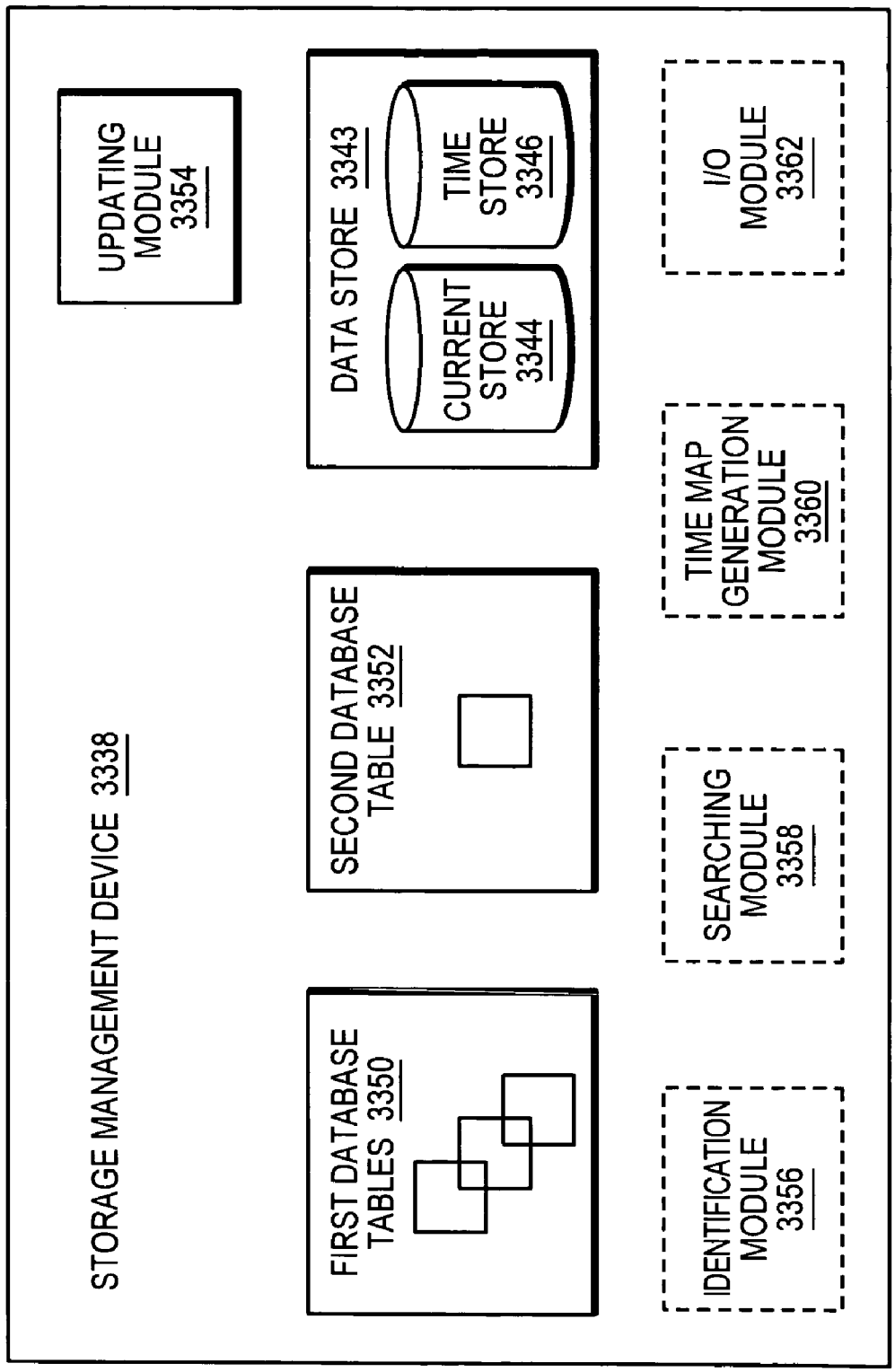
FIG. 41 is a block diagram of a storage management device according to an embodiment of the invention.

FIG. 41 illustrates one embodiment of a storage management device 3338 that records write requests directed to a data store and that enables the generation of at least a portion of a time map of at least one portion of the data store (e.g., of a current store of the data store or some sub-portion thereof) for a past time. Generally speaking, the storage management device 3338 may have the capabilities of, and may be implemented as, the storage management devices described above, with the additional functionality described here. It should be understood that other implementations are also possible.

In one embodiment, the storage management device 3338 uses at least one first database table 3350, but typically multiple first database tables 3350, for recording a plurality of write request entries. The storage management device 3338 also uses a second database table 3352, which includes at least one record for each first database table 3350 that is used by the storage management device 3338. Moreover, the storage management device 3338 also includes an updating module 3354 for updating at least one record in the second database table 3352 each time that a write request entry is recorded in a first database table. As previously described, the storage management device 3338 also manages at least one data store 3343 that has associated with it a current store 3344 and a time store 3346.

Optionally, the storage management device 3338 can also include an identification module 3356, a searching module 3358, a time map generation module 3360, and an I/O module 3362. In response to a request for data stored in at least one portion of the data store 3343 (e.g., in the current store 3344 or in some sub-portion thereof) at a past time, the storage management device 3338 may use the identification module 3356 to interpret the one or more records in the second database table 3352 and thereby identify one or more first database tables 3350 to search for relevant write request entries. The storage management device 3338 may then use the searching module 3358 to perform such search and, having found the relevant write request entries, may use the time map generation module to generate at least a portion of a time map of at least one portion of the data store for the past time. Moreover, the storage management device 3338 may use the I/O module 3362 to respond to a read request for data stored in at least one specified unit of storage located within the data store 3343 at a past time.

The first database tables 3350 and the second database table 3352 can be implemented in any form, way, or manner that is useful for recording write request entries and records, respectively. In one embodiment, for example, the first database tables 3350 and/or the second database table 3352 are implemented as spreadsheets. Alternatively, the first database tables 3350 and/or the second database table 3352 can be implemented as text or tabular delimited files, bitmaps, arrays, trees, indices, ledgers, or any other means useful for organizing data.

For their part, the updating module 3354, the identification module 3356, the searching module 3358, the time map generation module 3360, and the I/O module 3362 may be implemented in any form, way, or manner that is capable of achieving the functionality described below. For example, the updating module 3354, the identification module 3356, the searching module 3358, the time map generation module 3360, and/or the I/O module 3362 may be implemented as a software module or program running on a microprocessor, and/or as a hardware device, such as, for example, an application specific integrated circuit (ASIC) or a field programmable gate array (FPGA).

The data store 3343 may have the capabilities of the data stores described above, and may be implemented with the current stores and time stores described above, with the additional functionality described here. For example, the data associated with one or both of the current store 3344 and the time store 3346 may be stored in the memory of the storage management device 3338 or in a physical store (not shown), which for its part can be either directly stored, or virtualized, etc.

Typically, the storage management device 3338 receives multiple write requests from one or more other computing devices, such as, for example, the hosts described above. The write requests are directed to the data store 3343. In one particular embodiment, the write requests are directed to the current store 3344 of the data store 3343. In one such embodiment, each time that the storage management device 3338 receives a request to write new data to one or more specified blocks of the current store 3344, the storage management device 3338 performs, as previously described, a copy on write operation. In other words, the storage management device 3338 copies the existing data stored in the specified blocks of the current store 3344, writes the existing data to another location such as within the time store 3346, and then writes the new data to the specified blocks of the current store 3344. As part of this copy on write operation, information about the write request, including the new location of the overwritten data, may be recorded in a first database table 3350. The second database table 3352 is then updated to reflect the execution of the write request and the recordation of information associated with the write request in the first database table 3350.

Figure 42:
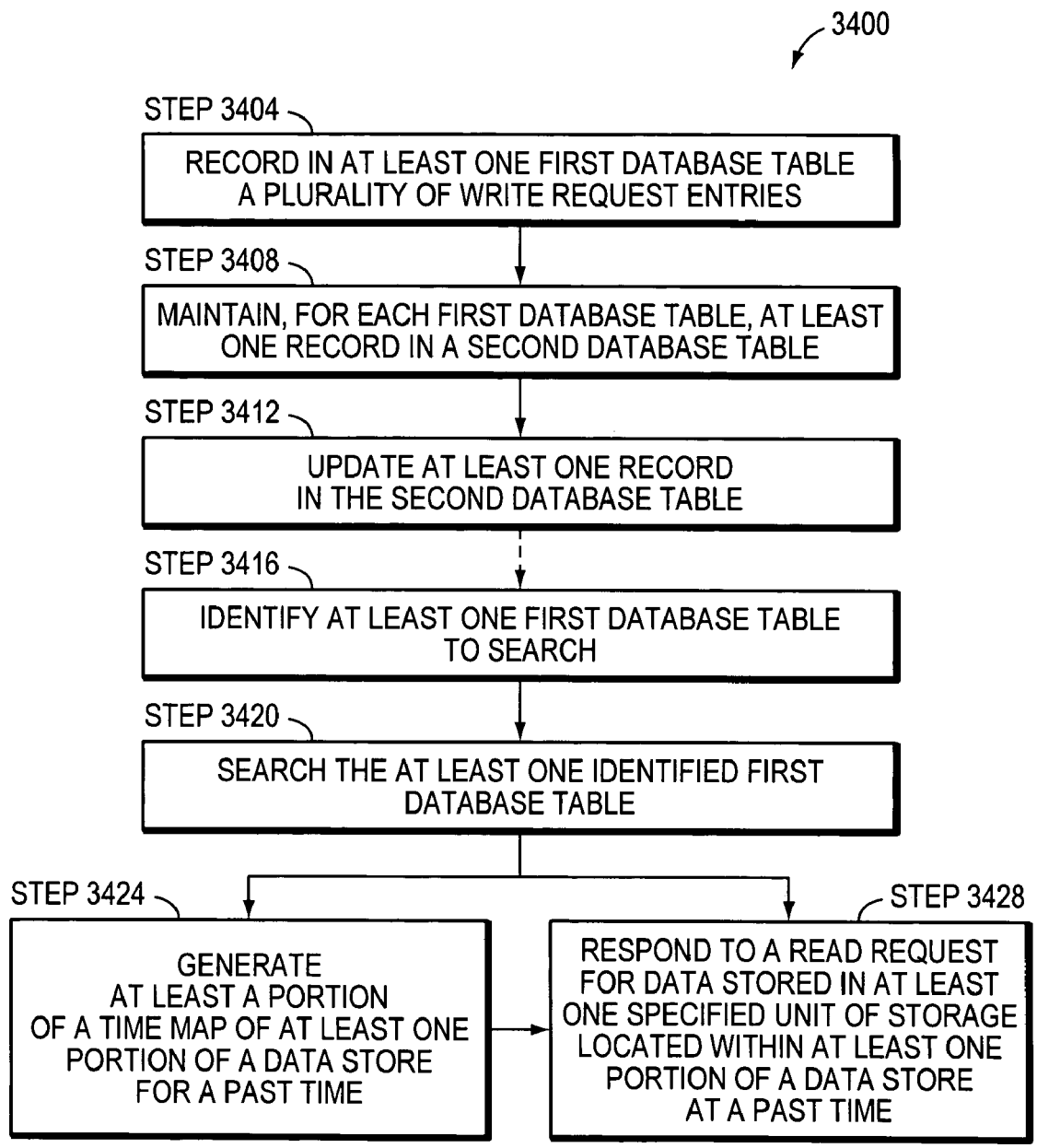
FIG. 42 is a flow diagram of an illustrative embodiment of a method for recording write requests directed to a data store and for enabling the generation of at least a portion of a time map of at least one portion of the data store for a past time.

Referring now to FIG. 42, in brief summary of one embodiment of a method 3400 for recording write requests directed to a data store, for example using the exemplary storage management device 3338 of FIG. 41, the storage management device 3338 records in at least one first database table 3350, following the execution of each write request (e.g., following each copy on write operation described above), a write request entry (step 3404). The storage management device 3338 also maintains, for each first database table 3350, at least one record in a second database table 3352 (step 3408), and updates at least one record in the second database table 3352 each time that a write request entry is recorded in a first database table 3350 (step 3412), for example by using the updating module 3354.

In one embodiment, when constructing a time map or otherwise determining the location of data that was stored in a specific unit of storage, and typically at a later time than steps 3404, 3408, and 3412, the storage management device 3338 uses the identification module 3356 to interpret one or more records in the second database table 3352 to identify at least one first database table 3350 to search (step 3416), and uses the searching module 3358 to search the at least one identified first database table 3350 (step 3420). The storage management device 3338 then generates, using the time map generation module 3360, at least a portion of a time map of at least one portion of the data store 3343 (e.g., of the current store 3344 or some sub-portion thereof) for a past time (step 3424), and/or responds, using the I/O module 3362, to a read request for data stored in at least one specified unit of storage located within at least one portion of the data store at a past time (step 3428).

Figure 43:
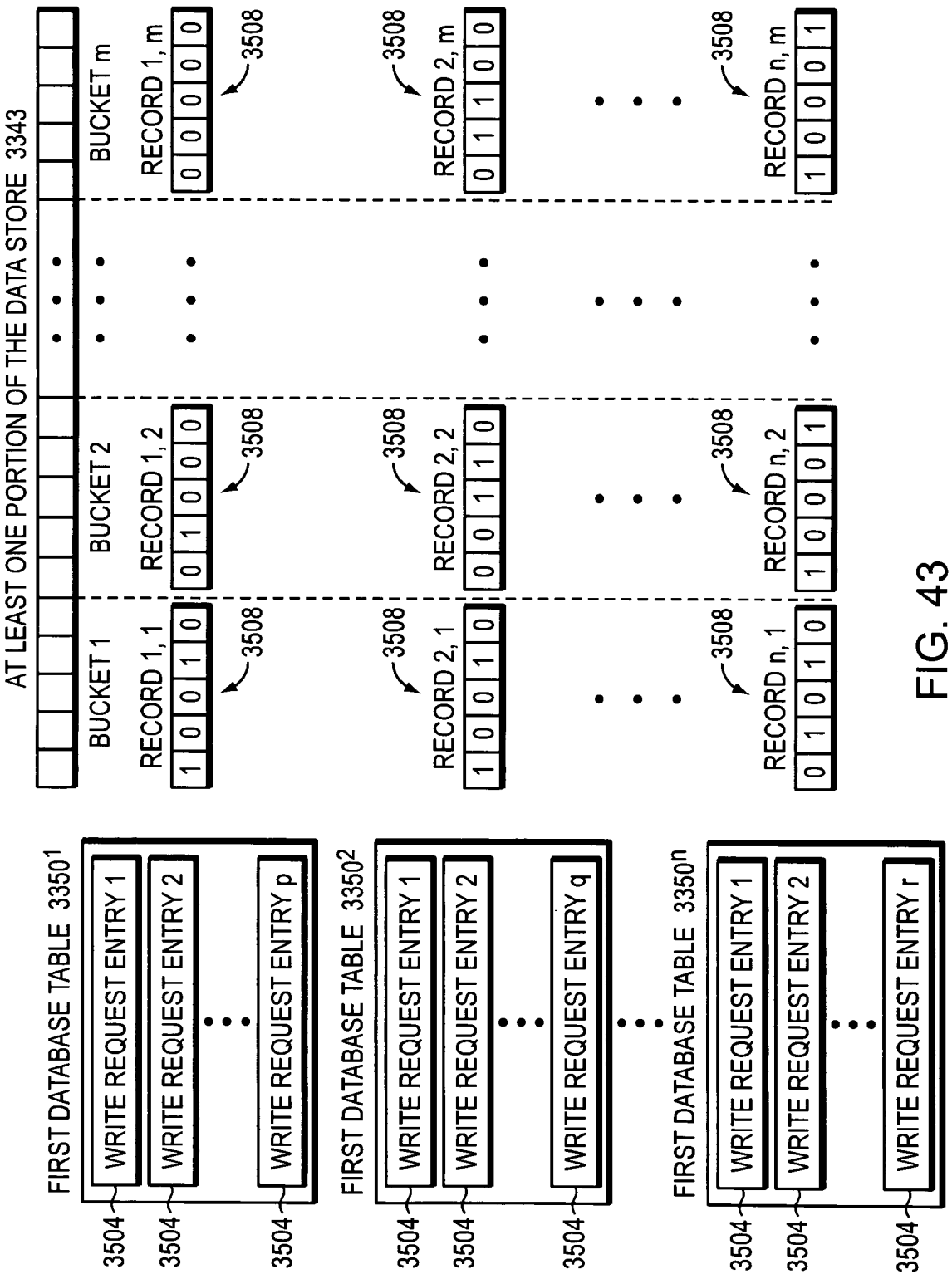
FIG. 43 is an exemplary block diagram for explaining the illustrative embodiment of the method for recording write requests directed to a data store and for enabling the generation of at least a portion of a time map of at least one portion of the data store for a past time depicted in FIG. 42.

In greater detail, and with reference now to both FIGS. 42 and 43, in one embodiment, following receipt by the storage management device 3338 of a write request directed to the data store 3343, the storage management device 3338 records, at step 3404, a write request entry 3504 in a first database table 3350. Each write request entry 3504 includes information relating to the write request. For example, the write request entry 3504 may include an identification of at least one unit of storage located within the data store 3343 (e.g., within the current store 3344) to which the write request was directed and/or a time at which the write request was received by the storage management device 3338.

In one embodiment, each received write request results in the performance of a copy on write operation as described above. In such an embodiment, each write request results in previous data, previously stored at at least one unit of storage located within the data store 3343 (e.g., within the current store 3344), being copied to a new location, such as within the time store 3346 of the data store 3343. The data included in the write request is then written to the at the at least one unit of storage located within data store 3343 (e.g., within the current store 3344) from which the previous data was copied. Accordingly, the write request entry 3504 may also include the new location (e.g., the location within the time store 3346) to which the previous data was copied.

As illustrated in FIG. 43, when the storage management device 3338 receives more than one write request directed to the data store 3343, the storage management device 3338 records a plurality of write request entries 3504 in a first database table 3350. In one embodiment, the storage management device 3338 records all write request entries 3504 in a single first database table 3350, for example the first database table $3350^1$, until a maximum number of write request entries 3504 is reached. Typically, the maximum number of write request entries 3504 for the first database table $3350^1$ is set for efficiency or because of the memory capacity allocated to the first database table $3350^1$. Once the number of write request entries 3504 in the first database table $3350^1$ reaches a maximum, the storage management device 3338 employs a new first database table $3350^2$ and records write request entries 3504 therein each time that write requests are received. Again, when the write request entries 3504 recorded in the first database table $3350^2$ reach a maximum, the storage management device 3338 employs a new first database table $3350^3$ (not shown), and so on.

At step 3408, the storage management device 3338 maintains, for each first database table 3350, at least one record 3508 in the second database table 3352. Referring to FIG. 43, at least one portion of the data store 3343 (e.g., the current store 3344 of the data store 3343 or some sub-portion thereof) may be conceptually organized by the storage management device 3338 into a number m of "buckets," where m>1 and each one of the m buckets relates to a fixed number of storage units located within the at least one portion of the data store 3343. In one such embodiment, for each first database table 3350, the storage management device 3338 maintains in the second database table 3352, as illustrated, a record 3508 for each one of the m buckets. Alternatively, in another embodiment, the storage management device 3338 does not divide the at least one portion of the data store 3343 into buckets. In such an embodiment (not shown), the storage management device 3338 maintains a single record 3508 in the second database table 3352 for each one of the first database tables 3350.

Referring still to FIG. 43, each record 3508 includes a plurality of bit entries, with each bit entry being set (i.e., "1") or unset (i.e., "0"). Moreover, in one embodiment, as illustrated by the vertical alignment in FIG. 43 for the purposes of explanation, each bit entry in a record 3508 corresponds to at least one unit of storage located within the at least one portion of the data store 3343.

Initially, in one embodiment, when a first database table 3350 is empty (i.e., when no write request entry 3504 has yet been recorded in the first database table 3350), all the bit entries in each record 3508 associated with that first database table 3350 are unset (i.e. "0"). Thereafter, each time that the storage management device 3338 records a write request entry 3504 in that first database table 3350, the storage management device 3338 updates, at step 3412, at least one record 3508 (associated with that first database table 3350) in the second database table 3352. In one embodiment, the storage management device 3338 updates the at least one record 3508 by using the updating module 3354 to set each bit entry in the at least one record 3508 that is unset and that corresponds to a unit of storage located within the at least one portion of the data store 3343 that is overwritten by the write request associated with the instant write request entry. Accordingly, each bit entry that is set (i.e., "1") in a record 3508 associated with a first database table 3350 indicates that the at least one unit of storage located within the at least one portion of the data store 3343 to which that bit entry corresponds has been overwritten at least once during the development of that first database table 3350. On the other hand, each bit entry that is unset (i.e., "0") in a record 3508 associated with a first database table 3350 indicates that the at least one unit of storage located within the at least one portion of the data store 3343 to which that bit entry corresponds has not been overwritten at least once during the development of that first database table 3350. As such, the data (i.e., the bit entries) of the one or more records 3508 in the second database 3352 represents the effects of the write requests on a state of the at least one portion of the data store 3343 (i.e., the data identifies at least one unit of storage located within the at least one portion of the data store 3343 that was overwritten by a write request).

Those skilled in the art will recognize that the five bit entries of each record 3508 illustrated in FIG. 43 are merely illustrative and used for the purposes of explaining the present aspect of the invention. In practice, each record 3508 could include, for example, one or more bytes of bit entries or one or more words (of any length) of bit entries. Moreover, while the data of each record 3508 is illustrated in FIG. 43 as having a binary representation, each record 3508 could alternatively store its data in a decimal, hexadecimal, or other representation. Furthermore, each record 3508 could include, in addition to the bit entries representing the effects of the write requests on a state of the at least one portion of the data store 3343, an identifier for identifying the first database table 3350 with which that record 3508 is associated.

Having stored and indexed the data as just described, for example using the database tables 3350, 3352 as above, the storage management device 3338 can efficiently determine whether the write request entries 3504 of the first database tables 3350 are associated with writes to a particular unit of storage in the data store 3343. So, in response to a request, for example from a user, for data stored in the at least one portion of the data store 3343 (e.g., in the current store 3344 or in some sub-portion thereof) at a past time, the identification module 3356 of the storage management device 3338 first identifies, at step 3416, at least one first database table 3350 to search for relevant write request entries 3504. In one embodiment, to identify which first database table(s) 3350 to search, the identification module 3356 of the storage management device 3338 determines which units of storage located within the at least one portion of the data store 3343 have been overwritten. In one such embodiment, the identification module 3356 of the storage management device 3338 determines, for each unit of storage located within the at least one portion of the data store 3343 that has a corresponding bit entry, whether at least one of the records 3508 in the second database table 3352 has a bit entry for that unit of storage that is set (i.e., "1").

More specifically, in one embodiment, for each particular unit of storage within the at least one portion of the data store 3343, the identification module 3356 of the storage management device 3338 performs a Boolean "OR" operation on the bit entries of the data in each record 3508 that correspond to that particular unit of storage. For ease of explanation, and with reference still to FIG. 43, when the storage management device 3338 has employed more than one first database table 3350, this visually translates to performing a Boolean "OR" operation on the columns of the data in the records 3508 that are vertically aligned. If the Boolean "OR" operation returns a "1" for a particular column, the particular unit of storage that corresponds to that column has been overwritten, and there is in at least one first database table 3350 one or more write requests entries 3504 associated with on or more write requests directed to that particular unit of storage. Otherwise, if the Boolean "OR" operation returns a "0" for a particular column, the particular unit of storage that corresponds to that column was not overwritten at any time covered by the records 3508 in the second database table 3352.

Taking, for example, the exemplary data in the three records for bucket 1 of the at least one portion of the data store 3343 illustrated in FIG. 43 (i.e., Record 1,1; Record 2,1; and Record n,1), performing the aforedescribed Boolean "OR" operation on the vertically aligned bit entries of these records (i.e., 10010 OR 10010 OR 01010) produces 11010 as a result. This result indicates that the first, second, and fourth units of storage located within the at least one portion of the data store 3343 represented in FIG. 43 have been overwritten at some point in time and that, for each one of those units of storage, at least one record 3508 for bucket 1 has a bit entry that corresponds to that unit of storage that is set (i.e., "1"). The result also indicates that the third and fifth units of storage located within the portion of the data store 3343 represented in FIG. 43 have not been overwritten at a point in time covered by this data and that, for each one of those units of storage, every bit entry in the records 3508 for bucket 1 that corresponds to that unit of storage is unset (i.e., "0").

The identification module 3356 of the storage management device 3338, upon determining, for a particular unit of storage located within the at least one portion of the data store 3343, that at least one record 3508 has a bit entry for that particular unit of storage that is set (i.e., "1"), identifies those one or more records 3508 that have a bit entry that is set for that particular unit of storage. The identification module 3356 then also identifies the one or more first database tables 3350 for which those identified records 3508 are maintained. In one embodiment, to accomplish these steps, the identification module 3356 of the storage management device 3338 first simply scans the relevant bit entries to determine which have been set to "1." Returning to our example involving the three records 3508 for bucket 1 of the at least one portion of the data store 3343 illustrated in FIG. 43 (i.e., Record 1,1; Record 2,1; and Record n,1), the identification module 3356 of the storage management device 3338 scans the bit entries of those records that correspond to the first, second, and fourth units of storage located within the at least one portion of the data store 3343 illustrated in FIG. 43. The identification module 3356 of the storage management device 3338 need not, and does not, scan, however, the bit entries of these records that correspond to the third and fifth units of storage located within the at least one portion of the data store 3343 illustrated in FIG. 43, because the identification module 3356 knows, as a result of performing the aforedescribed Boolean "OR" operation, that they are all unset (i.e., "0").

As a result of so scanning the bit entries of those records 3508, the identification module 3356 of the storage management device 3338 will then, according to the invention, identify the following first database tables 3350 to search for write request entries 3504 that relate to write requests that were made to the first, second, and fourth units of storage located within the at least one portion of the data store 3343 illustrated in FIG. 43:

| Unit of Storage | First Database Tables to Search |
|---|---|
| First | $3350^1$, $3350^2$ |
| Second | $3350^n$ |
| Fourth | $3350^1$, $3350^2$, $3350^n$ |

After the identification module 3356 has identified, at step 3416, the one or more first database tables 3350 to search, the searching module 3358 of the storage management device 3338 searches, at step 3420, those identified first database tables 3350. At this point, it should be recalled that the storage management device 3338 will have been requested, for example by a user, for the data stored in at least one portion of the data store 3343 (e.g., in the current store 3344 or in some sub-portion thereof) at a past time. Accordingly, in one embodiment, for each at least one unit of storage located within the at least one portion of the data store 3343 that has a corresponding bit entry in a record 3508 that is set (e.g., returning to our example above, for each of the first, second, and fourth units of storage in the at least one portion of the data store 3343 illustrated in FIG. 43), the searching module 3358 of the storage management device 3338 performs the following steps. First, the searching module 3358 searches the write request entries 3504 of the first database tables 3350 identified, as described above, by the identification module 3356. The searching module 3358 then determines from those write request entries 3504 a first time following the past time at which previous data stored at that at least one unit of storage was copied to a new location (such as within the time store 3346 of the data store 3343) as a result of performing the aforedescribed copy on write operation, and was overwritten at that at least one unit of storage. Having determined that first time, the searching module 3358 then determines from a write request entry 3504 the new location, for example within the time store 3346, to which the previous data was copied at that first time. It is at this new location that the previous data is now currently stored. The new location is used to generate at least a portion of a time map of the at least one portion of the data store 3343 for the past time, and/or to respond to a user's read request for data stored in the at least one portion of the data store 3343 at the past time, each as described below.

Of course, in some embodiments, even though a unit of storage located within the at least one portion of the data store 3343 has a corresponding bit entry in a record 3508 that is set, the searching module 3358 will be unable to determine a first time following the past time at which previous data stored in that unit of storage was copied to a new location (e.g., within the time store 3346) and was overwritten at that unit of storage. One example of where the searching module 3358 will be unable to make this determination is where the unit of storage located within the at least one portion of the data store 3343 was overwritten at a time prior to the past time, but was not overwritten at a time following the past time. In such a case, the data stored in that unit of storage at the past time will not have been copied to a new location, but will instead still be, at the present time, stored in that unit of storage.

As explained above, where the Boolean "OR" operation returns a "0" for a particular column of vertically aligned bit entries in FIG. 43, the particular unit of storage in the at least one portion of the data store 3343 that corresponds to that column was not overwritten at any time covered by the records in the second database table 3352. Accordingly, in such a case, the data stored in that particular unit of storage at the past time will also not have been copied to a new location, but will instead still be, at the present time, stored in that unit of storage.

In one embodiment, after the searching module 3358 has identified, for each unit of storage located within the at least one portion of the data store 3343, the location at which the data stored in that unit of storage at the past time is now currently stored (whether, as explained, it is still in that unit of storage or it is in a new location, such as within the time store 3346), the time map generation module 3360 of the storage management device 3338 generates, at step 3424, at least a portion of a time map of the at least one portion of the data store 3343 for the past time. In one embodiment, the time map generation module 3360 generates the time map by mapping each unit of storage located within the at least one portion of the data store 3343 to the location at which the data stored in that unit of storage at the past time is now currently stored. The mapping may be, for example, as simple as recording in a database, for each unit of storage located within the at least one portion of the data store 3343, an identification of the location at which the data stored in that unit of storage at the past time is now currently stored.

In another embodiment, the storage management device 3338 receives a read request, for example from a host as described above, for data stored in at least one specified unit of storage located within the at least one portion of the data store 3343 at a past time. In one embodiment, the read request is received after the time map generation module 3360 of the storage management device 3338 has begun to generate a time map for the same past time, but before it has completed the time map. In such a case, if the portion of the time map that is complete covers the at least one unit of storage specified in the read request, the I/O module 3362 of the storage management device 3338 determines, at step 3428, the location of the data from the time map (which may be, as explained, the specified unit of storage located within the at least one portion of the data store 3343 if the requested data has not been overwritten, or a new location, such as within the time store 3346, if the requested data has been overwritten). Alternatively, if, in such a case, the portion of the time map that is complete does not cover the at least one unit of storage specified in the read request, or if, in other embodiments, the storage management device 3338 is not, for example, configured to produce a time map or has only produced or begun to produce a time map for a past time that is different from that specified in the read request, the storage management device 3338 performs step 3416 and 3420 of the method 3400 described above. In so performing steps 3416 and 3420 of the method 3400, the storage management device 3338 need not, however, perform the aforedescribed operations for each unit of storage located within the at least one portion of the data store 3343. Rather, the storage management device 3338 need only perform the aforedescribed operations of steps 3416 and 3420 of the method 3400 for each unit of storage specified in the read request. In other words, the storage management device 3338 need only determine the new location(s) to which the data previously stored at each unit of storage specified in the read request was copied and is now located.

Having determined the new location, the I/O module 3362 of the storage management device 3338, in responding to the read request at step 3428, reads the data from the new location and transmits it to the requesting party, for example a host as described above. Moreover, in the case where the time map generation module 3360 of the storage management device 3338 had begun to generate a time map for a past time that is the same as that specified in the read request, but had not completed the time map at the time that the read request was received, and where the portion of the time map that had been completed did not cover the at least one unit of storage specified in the read request, the work done by the storage management device 3338 in generating the response to the read request (i.e., performing steps 3416 and 3420 of the method 3400 to determine the new location(s) to which data previously stored at each unit of storage specified in the read request was copied and is now located) may be used by the time map generation module 3360 of the storage management device 3338 in completing the time map.

Those skilled in the art will recognize that the implementation of the method 3400 described above could be varied or modified in a variety of ways, while still employing the described principles and without affecting methods' results. For example, in one embodiment, each bit entry in a record 3508 that is set could be represented by a "0", as opposed to a "1", and each bit entry that is unset could be represented by a "1", as opposed to a "0". In such an embodiment, in determining, for a particular unit of storage located within the at least one portion of the data store 3343, whether at least one record 3508 has a bit entry for that particular unit of storage that is set, the identification module 3356 performs a Boolean "AND" operation, as opposed to the Boolean "OR" operation described above, on the bit entries of each record 3508 that correspond to that particular unit of storage. In such a case, if the Boolean "AND" operation returns a "0" for a particular column, the particular unit of storage that corresponds to that column has been overwritten, and there is in at least one first database table 3350 one or more write requests entries 3504 associated with on or more write requests directed to that particular unit of storage. Otherwise, if the Boolean "AND" operation returns a "1" for a particular column, the particular unit of storage that corresponds to that column was not overwritten at any time covered by the records 3508 in the second database table 3508. Moreover, as another example, a bit entry can be used to represent any number of units of storage, as long as the translation is applied consistently when data is written and read.

The present invention may be provided as one or more modules of one or more computer-readable programs embodied on or in one or more articles of manufacture. The article of manufacture may be, as non-limiting examples, a floppy disk, a hard disk, a CD ROM, a flash memory card, a PROM, a RAM, a ROM, or a magnetic tape. In general, the computer-readable programs may be implemented in any programming language. Some examples of languages that can be used include C, C++, or JAVA. The software programs may be stored on or in one or more articles of manufacture as object code.

Variations, modification, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A method of checkpointing a copy-on-write operation sequence, the method comprising:
 (a) receiving a first write request identifying payload data to be written beginning at a first address of a first data store;
 (b) reading original data associated with the first address of the first data store;
 (c) copying the original data to a second data store beginning at a second address;

(d) recording transactional information associated with the first write request, the transactional information including indicia associated with the second address;

(e) generating a first checkpoint confirming the successful recordation of the transactional information and the successful copying of the original data to the second data store;

(f) writing the payload data to the first data store beginning at the first address;

(g) in response to successfully writing the payload data to the first data store, generating a second checkpoint confirming the successful completion of the copy-on-write operation sequence; and (h) removing information associated with a second write request from at least one queue of a processor module based on finding the second checkpoint in the transactional information.

2. The method of claim 1, wherein the transactional information further includes indicia associated with a time that the first write request was received.

3. The method of claim 1, wherein recordation of the transactional information comprises storing the first address, the second address, and a time that the first write request was received in at least one data structure.

4. The method of claim 1, further comprising:
based on at least one of the first and second checkpoints, forming a representation of at least one storage unit as it existed prior to a storage transaction failure.

5. The method of claim 4, wherein the storage transaction failure corresponds to at least one of a hardware failure and a power failure.

6. The method of claim 1, further comprising:
loading information associated with the first write request into at least one queue of a processor module based on finding the first checkpoint in the transactional information.

7. A method of recovering from a failure associated with a copy-on-write operation sequence, the method comprising:
identifying at least one write request queued prior to a failure, the write request corresponding to a plurality of operations in a copy-on-write operation sequence;
determining whether a first checkpoint was formed in response to completing a first portion of the copy-on-write operation sequence;
determining whether a second checkpoint was formed in response to completing at least a second portion of the copy-on-write operation sequence; and
based on at least one of the first and second checkpoints, processing the queued write request to at least partially recover from the failure, the write-request processing including:
upon failing to locate the first checkpoint, queuing the plurality of operations in the copy-on-write operation sequence for execution,
upon locating the first checkpoint and failing to locate the second checkpoint, queuing a subset of the plurality of operations for execution, the queued subset of operations including operations associated with the second portion, but not the first portion, of the copy-on-write operation sequence, and
upon locating the first and second checkpoints, removing the plurality of operations in the copy-on-write operation sequence from at least one operation queue.

8. The method of claim 7, wherein the failure corresponds to a hardware failure associated with a processor module.

9. The method of claim 7, wherein the first portion of the copy-on-write operation sequence includes at least one operation associated with copying original data stored at a location within a first data store to a second data store, the location within the first data store being identified by the queued write request.

10. The method of claim 7, wherein the second portion of the copy-on-write operation sequence includes at least one operation associated with writing payload data specified by the queued write request to a location within a first data store.

11. A method of recovering from a storage transaction failure, wherein the storage transaction failure corresponds to at least one of a hardware failure and a power failure of a primary processor module, the method comprising:
receiving a write request identifying payload data to be written beginning at a first address of a first data store;
copying original data associated with the first address of the first data store to a second data store beginning at a second address;
recording transactional information associated with the write request, the transactional information including indicia associated with the first and second addresses and a time that the write request was received;
generating a first indicator confirming the recordation of the transactional information;
continuing, upon generation of the first indicator, writing the payload data to the first data store beginning at the first address; and
in response to a storage transaction failure that prevents the successful writing of the payload data to the first data store, using the first indicator and at least some of the transactional information to, at least partially, finish writing the payload data to the first data store;
generating a second indicator confirming that the payload data was written to the first data store; and
removing information associated with a second write request from at least one queue of a standby processor module based on finding the second indicator in the transactional information, wherein the standby processor module assumes the tasks of the primary processor module in response to the storage transaction failure.

12. The method of claim 11, further comprising:
generating a second indicator confirming that the payload data was written to the first data store.

13. The method of claim 11, wherein the first indicator further confirms that the original data associated with the first address of the first data store is successfully copied to the second data store.

14. The method of claim 11, further comprising:
forming a representation of at least one storage unit as it existed prior to the storage transaction failure, based on at least some of the copied original data in the second data store.

15. The method of claim 11, further comprising:
loading information associated with a third write request into the at least one queue of the standby processor module based on finding the first indicator in the transactional information.

16. A method of recovering from a storage transaction failure, the method comprising:
detecting a storage transaction failure occurring at time T1;
identifying at least one indicator associated with a first write request that was received prior to time T1, the at least one indicator confirming that a portion of a copy-on-write sequence associated with the first write request has been completed, the portion being indicated by the at least one indicator;
forming a representation of at least one storage unit as it existed prior to the storage transaction failure based at least in part on the at least one indicator and data recorded in the partially completed copy-on-write sequence; and loading information associated with the first write request into at least one queue of a standby processor module based on the at least one indicator.

17. The method of claim 16, wherein the storage transaction failure corresponds to at least one of a hardware failure and a power failure of a primary processor module.

18. A method of recovering from a storage transaction failure, the method comprising:

detecting a storage transaction failure occurring at time T1;

identifying at least one indicator associated with a first write request that was received prior to time T1, the at least one indicator confirming that a portion of a copy-on-write sequence associated with the first write request has been completed, the portion being indicated by the at least one indicator;

forming a representation of at least one storage unit as it existed prior to the storage transaction failure based at least in part on the at least one indicator and data recorded in the partially completed copy-on-write sequence;

identifying a release indicator confirming that payload data specified by the first write request was written to a data store beginning at a first address; and removing information associated with a second write request from at least one queue of a standby processor module based on the release indicator, wherein the standby processor module assumes the tasks of a primary processor module in response to the storage transaction failure.

* * * * *